(12) United States Patent
Kagami et al.

(10) Patent No.: US 7,231,705 B2
(45) Date of Patent: Jun. 19, 2007

(54) METHOD FOR FORMING A RESIST PATTERN OF MAGNETIC DEVICE

(75) Inventors: Takeo Kagami, Tokyo (JP); Kazuki Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 377 days.

(21) Appl. No.: 10/773,234

(22) Filed: Feb. 9, 2004

(65) Prior Publication Data
US 2004/0160700 A1 Aug. 19, 2004

(30) Foreign Application Priority Data
Feb. 18, 2003 (JP) ............................ 2003-039400

(51) Int. Cl.
*G11B 5/127* (2006.01)
*G11B 5/33* (2006.01)
*B44C 1/22* (2006.01)

(52) U.S. Cl. ................ 29/603.15; 29/603.12; 29/603.13; 29/603.14; 29/603.18; 29/603.23; 360/324; 216/22

(58) Field of Classification Search ........... 29/603.15, 29/603.12, 603.14, 603.16, 603.23, 603.18; 360/244, 324, 324.11, 324.12, 324.2; 428/692; 216/22, 39, 41, 49; 430/311, 313, 323, 322
See application file for complete search history.

(56) References Cited

U.S. PATENT DOCUMENTS

| 6,174,736 B1 * | 1/2001 | Tsukamoto et al. ............ 438/3 |
| 6,315,875 B1 | 11/2001 | Sasaki |
| 6,335,081 B1 | 1/2002 | Araki et al. |
| 6,381,107 B1 * | 4/2002 | Redon et al. ............ 360/324.2 |
| 6,473,257 B1 | 10/2002 | Shimazawa et al. |
| 6,537,732 B2 * | 3/2003 | Kamijima ................... 430/311 |
| 6,587,316 B2 * | 7/2003 | Hasegawa ................ 360/324.1 |
| 6,669,983 B2 * | 12/2003 | Kagami et al. ............. 427/130 |
| 2002/0044394 A1 | 4/2002 | Hasegawa |
| 2002/0187430 A1 | 12/2002 | Watanabe |

FOREIGN PATENT DOCUMENTS

| JP | A 2000-99926 | 4/2000 |
| JP | A-2001-036165 | 2/2001 |
| JP | A-2001-084535 | 3/2001 |
| JP | A-2002-076472 | 3/2002 |
| JP | A-2002-204003 | 7/2002 |
| JP | A-2002-363730 | 12/2002 |

* cited by examiner

Primary Examiner—A. Dexter Tugbang
Assistant Examiner—Tai Van Nguyen
(74) Attorney, Agent, or Firm—Oliff & Berridge, PLC

(57) ABSTRACT

A pattern forming method includes forming a resist pattern for lift off of a first film disposed on a surface side of a base, patterning the first film by dry etching using the resist pattern as a mask, depositing a second film after patterning, removing the resist pattern to remove a portion of the second film on the resist pattern, and etching the surface side of the base after removing the resist pattern. The etching includes dry-etching the surface side of the base using etching particles with a main incident angle of the etching particles to the surface side of the base being set in a range of 60° to 90° relative to a normal direction of the one surface of the base. The dry etching is performed while rotating the base about an axis substantially parallel with the normal direction.

9 Claims, 33 Drawing Sheets

METHOD FOR FORMING A RESIST PATTERN OF MAGNETIC DEVICE

BACKGROUND OF THE INVENTION

The present invention relates to a pattern forming method using a lift-off method, a method of manufacturing a magneto-resistive device and a magnetic head using the pattern forming method, and a head suspension assembly and a magnetic disk apparatus.

With the trend to a larger capacity and a smaller size of hard disk drives (HDD), heads are required to have a higher sensitivity and a larger output. To meet these requirements, strenuous efforts have been made to improve the characteristics of GMR heads (Giant Magneto-Resistive Head) currently available on the market. On the other hand, intense development is under way for a tunnel magneto-resistive head (TMR head) which can be expected to have a resistance changing ratio twice or more higher than the GMR head.

Generally, the GMR head differs from the TMR head in the head structure due to a difference in a direction in which a sense current is fed. A head structure adapted to feed a sense current in parallel with a film surface, as in a general GMR head, is referred to as a CIP (Current In Plane) structure, while a head structure adapted to feed a sense current perpendicularly to a film surface, as in the TMR head, is referred to as a CPP (Current Perpendicular to Plane) structure. Since the CPP structure can use a magnetic shield itself as an electrode, it is essentially free from short-circuiting between the magnetic shield and a device (defective insulation) which is a serious problem in reducing a lead gap in the CIP structure. For this reason, the CPP structure is significantly advantageous in providing a higher recording density.

Other than the TMR head, also known as a head in CPP structure is, for example, a CPP-GMR head which has the CPP structure, though a spin valve film (including a specular type and dual spin valve type magnetic multilayer films) is used for a magneto-resistive device.

Any type of CPP-based heads has an upper electrode and a lower electrode for supplying a current to a magneto-resistive layer formed on a base, formed on the top (opposite to the base) and on the bottom (close to the base) of the magneto-resistive layer, respectively. The CPP-based head comprises an insulating layer for limiting a current path between the upper electrode and lower electrode is arranged around a main layer (for example, a tunnel barrier layer in a TMR head) of the magneto-resistive layer. The limited current path substantially matches an effective region for detecting a magnetic field from a magnetic recording medium. A TMR head is disclosed as an example of the CPP-based head in JP-A-2001-23131 corresponding to U.S. Pat. No. 6,473,257. Generally, $Al_2O_3$ or $SiO_2$ is used as a material for the insulating layer. Also, it is often the case that a magnetic head is generally provided with magnetic domain control layers on both sides of a magneto-resistive layer in the track width direction, irrespective of whether the magnetic head is in CPP structure or in CIP structure (including an LOL structure, later described). The magnetic domain control layers apply a biasing magnetic field (a so-called vertical bias) to a free layer, which forms part of the magneto-resistive layer, for controlling magnetic domains.

For manufacturing a conventional CPP-based head as disclosed in JP-A-2001-23131, a lift-off method is typically used. Specifically, a resist pattern for lift-off is formed on constituent layers, which make up a magneto-resistive layer, formed on a substrate, and the constituent layers are patterned by dry etching such as ion milling or the like using the resist pattern as a mask. Then, with the presence of the resist pattern, an insulating layer (or a laminate of an insulating layer and a metal layer (magnetic domain control layer)) is deposited, followed by removal of the resist pattern and the overlying insulating layer (or the laminate of the insulating layer and metal layer (magnetic domain control layer)), thereby forming the insulating layer around the constituent layers as well as forming the magnetic domain control layers on both sides of the constituent layers in the track width direction.

Subsequently, the upper electrode is formed. Generally, for reasons of the manufacturing process, the base formed with the magneto-resistive layer is placed in the atmosphere after the magneto-resistive layer is formed and before the upper electrode is formed. In this event, for preventing the top surface of the magneto-resistive layer from being oxidized in the air to damage the characteristics of the magneto-resistive layer such as an MR ratio, a non-magnetic metal layer, referred to as a cap layer, is previously formed as a protection film on the top surface of the magneto-resistive layer. For example, Ta, Ru, Rh, Au, Pt, Ag, Pd, Ir, Cu or the like is used for the non-magnetic metal layer. In the CPP-based head, the upper electrode is electrically connected to the magneto-resistive layer through the non-magnetic metal layer. The non-magnetic metal layer is formed on the top of the constituent layers, and is patterned by the ion milling or the like together with the other constituent layers.

In the CPP-based head, since a current is applied to the magneto-resistive layer through the upper electrode and non-magnetic metal layer, it is necessary to maintain a good electrical contact between the upper electrode and non-magnetic metal layer to provide a lower resistance. However, since Ta, Ru, Rh, Au, Pt, Ag, Pd, Ir, Cu, or the like may be used for the non-magnetic metal layer, the surface of the non-magnetic metal layer is oxidized in the air, or $O_2$, $H_2O$ and the like adsorb on the surface of the non-magnetic metal layer when the base, formed with the magneto-resistive layer and non-magnetic metal layer, is placed in the atmosphere. Thus, if another layer such as the upper electrode is formed on the non-magnetic metal layer as it is, a good electrical contact cannot be maintained between the upper electrode and the non-magnetic metal layer. To address this problem, the surface oxide film is removed from the non-magnetic metal layer by dry etching (including general dry processes such as sputter etching, ion beam etching or the like) within the same vacuum chamber in which the upper electrode and the like are deposited, prior to the formation of another layer such as the upper electrode on the non-magnetic metal layer. Conventionally, the dry etching has been performed using etching particles which do not form clusters, with an incident angle of the etching particles being set in a direction normal to the surface of the base.

Another known CIP-based head has an LOL (lead overlay) structure (for example, see JP-A-2000-99926). The LOL structure comprises a magneto-resistive layer such as a spin valve film, and two upper electrodes formed on the side of the top surface of the magneto-resistive layer for applying a current to the magneto-resistive layer, wherein one of the upper electrodes has a portion overlapping with a portion of the magneto-resistive layer on one side in a plane direction, while the other of the upper electrodes has a portion overlapping with a portion of the magneto-resistive layer on the other side in the plane direction, so that the two electrodes are spaced away from each other in the plane direction. In other words, the LOL structure comprises a pair of lead layers for applying a current to an effective region of the magneto-resistive layer in a direction substantially parallel with a film surface thereof, wherein the pair of lead layers include an overlay which extends onto a portion of the magneto-resistive layer on the top surface side (opposite to the base) of the magneto-resistive layer.

A lift-off method is typically used as well for manufacturing such an LOL-based head, as is the case with the CPP-based head. Specifically, a resist pattern for lift-off is formed on constituent layers, which make up a magneto-resistive layer, formed on a substrate, and the constituent layers are patterned by dry etching such as ion milling or the like using the resist pattern as a mask. Then, with the presence of the resist pattern, an insulating layer (or a metal layer (magnetic domain control layer)) is deposited, followed by removal of the resist pattern and the overlying insulating layer (or the metal layer (magnetic domain control layer)), thereby forming the insulating layer around the constituent layers (in the LOL structure, around an end opposite to the rear end (end opposite to ABS (air baring surface) in the height direction) as well as forming the magnetic domain control layers on both sides of the constituent layers in the track width direction.

Subsequently, the lead layers are formed. Generally, for reasons of the manufacturing process, the base formed with the magneto-resistive layer is placed in the atmosphere after the magneto-resistive layer is formed and before the lead layers are formed. In this event, for preventing the top surface of the magneto-resistive layer from being oxidized in the air to damage the characteristics of the magneto-resistive layer such as an MR ratio, a non-magnetic metal layer, referred to as a cap layer, is previously formed as a protection film on the top surface of the magneto-resistive layer, as is the case with the CPP-based head. For example, Ta, Ru, Rh, Au, Pt, Ag, Pd, Ir, Cu or the like is used for the non-magnetic metal layer. In the LOL-based head, the lead layers are electrically connected to the magneto-resistive layer through the non-magnetic metal layer. The non-magnetic metal layer is formed on the top of the constituent layers, and is patterned by the ion milling or the like together with the other constituent layers.

In the LOL-based head, since a current is applied to the magneto-resistive layer through the lead layers and non-magnetic metal layer, it is necessary to maintain a good electrical contact between the lead layers and non-magnetic metal layer to provide a lower resistance. However, since Ta, Ru, Rh, Au, Pt, Ag, Pd, Ir, Cu, or the like may be used for the non-magnetic metal layer, the surface of the non-magnetic metal layer is oxidized in the air, or $O_2$, $H_2O$ and the like adsorb on the surface of the non-magnetic metal layer when the base, formed with the magneto-resistive layer and non-magnetic metal layer, is placed in the atmosphere. Thus, if other layers such as the lead layers are formed on the non-magnetic metal layer as it is, a good electrical contact cannot be maintained between the lead layers and the non-magnetic metal layer. To address this problem, the surface oxide film is removed from the non-magnetic metal layer by dry etching (including general dry processes such as sputter etching, ion beam etching or the like) within the same vacuum chamber in which the lead layers and the like are deposited, prior to forming other layers such as the lead layers on the non-magnetic metal layer. Conventionally, the dry etching has been performed using etching particles which do not form clusters, with an incident angle of the etching particles being set in a direction normal to the surface of the base, as is the case with the CPP-based head.

In a variety of applications other than the manufacturing of magnetic heads, a lift-off based pattern forming method is used.

However, in the conventional manufacturing method for manufacturing the aforementioned CPP-based head and LOL-based head, the surface oxide film on the non-magnetic metal layer, redeposits produced during the dry etching such as ion milling, and the insulating layer (or the laminate of the insulating layer and metal layer (magnetic domain control layer)) remain on a peripheral region and the like of the non-magnetic metal layer due to the resist pattern for lift-off which has a shape at cross section including an undercut or an inverse tapered shape at cross section, thereby limiting a path for a current which flows into the magneto-resistive layer to reduce an area which has a good electrical contact. As a result, the magnetic head manufactured by the conventional manufacturing method experiences an increase in a series resistance component of the magneto-resistive device, degraded MR characteristics, degraded frequency characteristics due to a higher resistance of the head, and the like. It is difficult to reduce the dimensions of the undercut or the like of the resist pattern for lift-off to predetermined dimensions or less in order to avoid producing burrs and the like during the lift-off. Thus, when a magneto-resistive device is reduced in size for increasing a recording density, the resulting magneto-resistive device has a significantly reduced area which makes an electrically good contact to strictly limit a path for a current which flows into a magneto-resistive layer, thereby notably affecting the magneto-resistive device due to the degraded MR characteristics, degraded frequency characteristics associated with a higher resistance of a head, and the like. These aspects will be described later in greater detail in the description of a comparative example which is compared with the present invention.

Also, as mentioned above, the magnetic domain control layer remains as well on peripheral regions (here, peripheral regions on both sides in the track width direction) of the non-magnetic metal layer due to the undercut or the like of the resist pattern for lift-off. This causes a portion of the magnetic domain control layer to also be piled on the magneto-resistive layer. Consequently, part of a biasing magnetic field from the magnetic domain control layer passes through the piled portions of the magnetic control layers on both sides to bypass the free layer without entering the free layer. This results in a lower vertical biasing effect to the free layer by the magnetic domain control layer, thereby failing to sufficiently control the magnetic domains of the free layer. Since it is difficult to reduce the dimensions of the undercut or the like of the resist pattern for lift-off to predetermined dimensions or less as mentioned above, a reduction in the dimensions of the magneto-resistive device for a higher recording density would significantly narrow down the distance between the piled portions of the magnetic domain control layers on both sides, thereby notably affecting the control for the magnetic domains of the free layer. This aspect will also be described later in greater detail in the description on a comparative example which is compared with the present invention.

While a magnetic head manufacturing method has been given as an example for purposes of description, troubles can be also caused by the resist pattern for lift-off having the undercut or the like in a lift-off based pattern forming method which is used in a variety of applications other than the manufacturing of magnetic heads. Specifically, troubles may be caused by unwanted products, which can be redeposits during ion milling, a second film formed around a first film, and the like, remaining on a peripheral region an the like of the first film patterned by ion milling or the like using the resist pattern for lift-off as a mask.

SUMMARY OF THE INVENTION

It is an object of the invention to provide a pattern forming method which is capable of removing or reducing unwanted products remaining on a peripheral region of a film which is patterned by dry etching using a resist pattern for lift-off as a mask.

It is another object of the present invention to provide a method of manufacturing a magneto-resistive device, which is capable of reducing unwanted products remaining on a peripheral region of a film which is patterned by dry etching using a resist pattern for lift-off as a mask, to advantageously reduce a series resistance component and/or more effectively apply a vertical bias to a free layer.

It is still another object of the present invention to provide a method of manufacturing a magnetic head, which can provide the same advantages as above.

It is a further object of the present invention to provide a magnetic disk apparatus which is capable of increasing a recording density, and a head suspension assembly which can use in the magnetic disk apparatus.

A pattern forming method according to a first aspect of the present invention includes: the step of forming a resist pattern for lift-off on a first film composed of one or more layers deposited on one surface side of a base; the step of patterning the first film by dry etching the first film using the resist pattern for lift-off as a mask; the step of depositing a second film composed of one or more layers on the one surface side of the base after the step of patterning with the presence of the resist pattern for lift-off on the first film; the step of removing the resist pattern for lift-off to remove a portion of the second film on the resist pattern for lift-off; and the step of etching the one surface side of the base after the step of removing, the step of etching including dry-etching the one surface side of the base using etching particles which do not substantially form clusters, with a main incident angle of the etching particles to the one surface side of the base being set in a range of 60° to 90° relative to a normal direction of the one surface of the base.

According to the first aspect, redeposits are formed in a region on the first film corresponding to an undercut or the like of the resist pattern for lift-off during the dry etching which is performed in the step of patterning. Also, a portion of the second film is piled on the redeposits in the step of depositing. Consequently, products made up of the redeposits and the piled portion of the second film on the redeposits are formed in the region on the first film corresponding to the undercut or the like of the resist pattern for lift-off after the step of removing. However, according to the first aspect, since the dry etching is performed in the step of etching, the products are removed or reduced by the dry etching. The dry etching in the step of etching may be performed to a desired extent (just enough to remove or reduce the products).

It has been confirmed by an experiment and the like, later described, that a tendency of selectively removing or reducing the products (hereinafter referred to as the "selectivity for the removal or reduction of products") can be increased by setting the dry etching at the aforementioned incident angle in the etching step. It is thought that etching particles laterally hitting the products can contribute to a higher selectivity for the removal or reduction of the products (in other words, the ability to flatten a protrusion). The products can be removed or reduced by performing dry etching with the incident angle of etching particles set in the direction normal to the surface of the base in a manner similar to the aforementioned prior art, in which case, however, the selectivity for the removal or reduction of the products is lower. Therefore, an attempt to sufficiently reduce the products would cause an increased amount of etched first film, giving rise to such troubles as an inhibited essential function of the first film. In contrast, since the manufacturing method according to the first aspect can increase the selectivity for the removal or reduction of the products, the resulting device is free from such troubles. For further increasing the selectivity for the removal or reduction of the products, the incident angle of the dry etching is preferably set in a range of 75° to 90° in the etching step, more preferably in a range of 80° to 90° and further preferably in a range of 85° to 90°. These preferable ranges have been revealed from an experiment or the like, later described.

In the manufacturing method according to the first aspect, for example, the step of etching may include dry etching using etching particles which substantially do not form clusters, with an incident angle of the etching particles set at another angle (for example, approximately 0°), before or after the dry etching with the incident angle set in a range of 60° to 90°. Even in this case, the selectivity for the removal or reduction of the products is increased in the overall etching step as compared with the dry etching alone with the incident angle set at 0°.

When the first film includes a metal layer on the top which has been oxidized so that the surface oxide film must be removed from the metal layer, the surface oxide film may be removed in the etching step.

A pattern forming method according to a second aspect of the present invention is arranged in a manner that, in the first aspect, the dry etching in the step of etching is ion beam etching using a simple gas or a mixed gas composed of one or more selected from a group consisting of He, Ne, Ar, Kr, and Xe.

The second aspect merely enumerates specific examples of the dry etching in the etching step. However, in the first aspect, the dry etching is not necessarily limited to the examples.

A pattern forming method according to a third aspect includes: the step of forming a resist pattern for lift-off on a first film composed of one or more layers deposited on one surface side of a base; the step of patterning the first film by dry etching the first film using the resist pattern for lift-off as a mask; the step of depositing a second film composed of one or more layers on the one surface side of the base after the step of patterning with the presence of the resist pattern for lift-off on the first film; the step of removing the resist pattern for lift-off to remove a portion of the second film on the resist pattern for lift-off; and the step of etching the one surface side of the base after the step of removing, the step of etching including dry-etching the one surface side of the base with a gas cluster ion beam.

According to the third aspect, like the first aspect, products made up of the redeposits and the piled portion of the second film on the redeposits are formed in the region on the first film corresponding to the undercut or the like of the resist pattern for lift-off after the step of removing. According to the third aspect, however, since the dry etching using a gas cluster ion beam is performed in the step of etching, the products are removed or reduced by the dry etching. Specifically, with the use of the gas cluster ion beam, after the clusters collide with the base, a multiple collision effect produced by atoms or molecules making up the clusters provides the atoms or molecules with a momentum component parallel with the surface of the base, so that the products are removed or reduced by a flattening action. An incident angle of the gas cluster ion beam is not particularly limited, and for example, may be set at substantially 0° relative to a direction normal to the one surface of the base. When using the gas cluster ion beam, the first film may not be substantially etched, or may be etched to a desired extend by appropriately setting the conditions therefor.

In the manufacturing method according to the third aspect, for example, the step of etching may include dry etching using etching particles which substantially do not form clusters, with an incident angle of the etching particles set at another angle (for example, approximately 0°), before or after the dry etching using the gas cluster ion beam. Even in this case, the selectivity for the removal or reduction of the products is increased in the overall etching step as compared with the dry etching alone using the etching particles which do not form clusters, with the incident angle set at 0°.

A pattern forming method according to a fourth aspect of the present invention is arranged in a manner that, in any of the first to the third aspects, the resist pattern for lift-off has a shape at cross section including an undercut or an inverse tapered shape at cross section.

The fourth aspect merely enumerates specific examples of the cross-sectional shape of the resist pattern for lift-off. However, in the first to third aspects, the cross-sectional shape of the resist pattern for lift-off is not necessarily limited to the examples.

A pattern forming method according to a fifth aspect of the present invention is arranged in a manner that, in any of the first to the fourth aspects, the dry etching in the step of etching is performed while rotating the base about an axis substantially parallel with the normal.

According to the fifth aspect, the base is rotated about the axis substantially parallel with the normal during the dry etching. Therefore, even with the use of etching particles which do not substantially form clusters as in the first and second aspects, the etching particles hit the products from various directions, so that the products formed on sides in various directions can be efficiently reduced. However, for removing the products formed, for example, on a side in a predetermined direction in the first and second aspects, the base may not be rotated, but may instead be linearly swung, by way of example. When using the cluster ion beam as in the third aspect, the products formed on sides in various directions can be efficiently reduced even without rotating the base. Of course, the base may be rotated.

A pattern forming method according to a sixth aspect of the present invention is arranged in a manner that, in any of the first to the fifth aspects, the second film includes an insulating layer.

The sixth aspect enumerates a specific example of the second film. However, in the first to fifth aspects, the second film is not necessarily limited to this example. For example, the second film may include a metal layer. Also, while the material for the insulating layer may be $Al_2O_3$, $SiO_2$, or the like, the material is not either limited to these.

A pattern forming method according to a seventh aspect of the present invention is arranged in a manner that, in any of the first to the sixth aspects, the first film includes a metal layer positioned furthest away from the base.

While the seventh aspect enumerates a specific example of the layer of the first film furthest away from the base, the first film is not necessarily limited to this example in the first to sixth aspects.

A method of manufacturing a magneto-resistive device according to an eighth aspect of the present invention is a method of manufacturing a magneto-resistive device having a magneto-resistive layer formed on one surface side of a base, the method including the pattern forming method according to any of the first to seventh aspects, wherein the first film includes one of constituent layers making up the magneto-resistive layer, and the one layer is positioned furthest away from the base.

According to the eighth aspect, since the pattern forming method according to any of the first to seventh aspects is used, the products can be removed or reduced. Thus, the magneto-resistive device manufactured by the manufacturing method according to the eighth aspect provides the following first advantage and/or second advantage.

The first advantage lies in a reduction in limitations to a path for a current flowing into the magneto-resistive layer due to the products and the like, and a consequent reduction in a series resistance component of the magneto-resistive device. Thus, even if the magneto-resistive device is reduced in dimensions for a higher recording density, the resulting magneto-resistive device is less affected by degraded MR characteristics, degraded frequency characteristics associated with a higher resistance of the head, and the like.

In regard to the second advantage, when the second film includes a magnetic domain control layer as in a ninth aspect, later described, a smaller portion of the magnetic domain control layer is piled on the magneto-resistive layer. Consequently, a more biasing magnetic field enters from the magnetic domain control layer into the free layer. Thus, even if the magneto-resistive device is reduced in dimensions for a higher recording density, the vertical bias can be effectively applied to the free layer, thereby advantageously improving the vertical biasing effect to the free layer by the magnetic domain control layer.

A method of manufacturing a magneto-resistive device according to a ninth aspect of the present invention is arranged in a manner that, in the eighth aspect, the first film includes a free layer, and the second film includes a magnetic domain control layer for controlling magnetic domains of the free layer.

The manufacturing method according to the ninth aspect can provide the first advantage as described in connection with the eighth aspect.

A method of manufacturing a magneto-resistive device according to a tenth aspect of the present invention is arranged in a manner that, in the eighth or ninth aspect, the magneto-resistive device includes a pair of electrodes for applying a current to an effective region of the magneto-resistive layer in a direction substantially perpendicular to a film surface thereof.

The tenth aspect presents an example in which the manufacturing method according to the present invention is applied to the method of manufacturing a magneto-resistive device having the CPP structure.

A method of manufacturing a magneto-resistive device according to a eleventh aspect of the present invention is arranged in a manner that, in the tenth aspect, the magneto-resistive layer includes a free layer, a tunnel barrier layer or a non-magnetic metal layer formed on one surface side of the free layer, a pinned layer formed on one surface side of the tunnel barrier layer or the non-magnetic metal layer opposite to the free layer, and a pin layer formed on one surface side of the pinned layer opposite to the tunnel barrier layer or the non-magnetic metal layer.

The eleventh aspect presents an example in which the manufacturing method according to the present invention is applied to the method of manufacturing a TMR device or a GMR device having the CPP structure.

A method of manufacturing a magneto-resistive device according to a twelfth aspect of the present invention is arranged in a manner that, in the eighth or ninth aspect, the magneto-resistive device includes a pair of lead layers for applying a current to an effective region of the magneto-resistive layer in a direction substantially parallel with a film surface thereof, and the pair of lead layers include an overlay which extends onto a portion of the magneto-resistive layer on one surface side of the magneto-resistive layer opposite to the base.

The twelfth aspect presents an example in which the manufacturing method according to the present invention is applied to the method of manufacturing a magneto-resistive device having the LOL structure.

A method of manufacturing a magnetic head according to a thirteenth aspect of the present invention is a method of manufacturing a magnetic head including a magneto-resistive device having a magneto-resistive layer formed on one side of a base, the method including the manufacturing method according to any of the eighth to twelfth aspects.

According to the thirteenth aspect, the method can produce a magnetic head which has a magneto-resistive device that can provide the first advantage and/or second advantage as described in connection with the eighth aspect. This leads to the ability to manufacture a magnetic head which is less affected by degraded MR characteristics, degraded frequency characteristics associated with a higher resistance of the head, a lower vertical biasing effect to the free layer, and the like even if the recording density is increased.

A method of manufacturing a magnetic head according to a fourteenth aspect of the present invention is arranged in a manner that, in the thirteenth aspect, the step of patterning defines at least an end of the magneto-resistive device on one side in a height direction thereof.

A method of manufacturing a magnetic head according to a fifteenth aspect of the present invention is arranged in a manner that, in the thirteenth or fourteenth aspect, the step of patterning defines at least ends of the magneto-resistive device on both sides in a track width direction thereof.

The fourteenth aspect presents an example in which the step of patterning defines the end of the magneto-resistive device on one side in the height direction thereof, while the fifteenth aspect presents an example in which the step of patterning defines both ends of the magneto-resistive device on both sides in the track width direction thereof. Of course, the step of patterning may simultaneously define all of the end of the magneto-resistive device on one side of the height direction thereof and both ends of the magneto-resistive device on both sides in the track width direction thereof. Alternatively, a step of patterning for defining the end of the magneto-resistive device on one side in the height direction thereof, and the subsequent steps of depositing and removing, and a step of patterning for defining both ends of the magneto-resistive device on both sides of the track width direction thereof, and the subsequent steps of depositing and removing may be performed separately, and these steps may be followed by single dry etching for removing in batch the products formed on the respective sides in the track width direction and height direction, respectively.

A head suspension assembly according to a sixteenth aspect of the present invention includes a magnetic head manufactured by a manufacturing method according to any of the thirteenth to fifteenth aspects, and a suspension for supporting the magnetic head mounted near a leading end thereof.

According to the sixteenth aspect, since the head suspension assembly employs the magnetic head manufactured by the manufacturing method according to any of the thirteenth to fifteenth aspects, it is possible to increase the recording density of a magnetic disk apparatus or the like.

A magnetic disk apparatus according to a seventeenth aspect of the present invention includes a head suspension assembly according to the sixteenth, an arm for supporting the head suspension assembly, and an actuator for moving the arm to position the magnetic head.

According to the seventeenth aspect, since the magnetic disk apparatus employs the head suspension assembly according to the sixteenth aspect, it is possible to increase the recording density.

DETAILED DESCRIPTION OF THE EMBODIMENTS

In the following, a pattern forming method, a method of manufacturing a magneto-resistive device and a magnetic head using the pattern forming method, and a head suspension assembly and a magnetic disk apparatus according to the present invention will be described with reference to the accompanying drawings.

First, a magnetic head manufactured by a magnetic head manufacturing method according to a first embodiment of the present invention will be described with reference to FIGS. 1 to 5.

Figure 1:
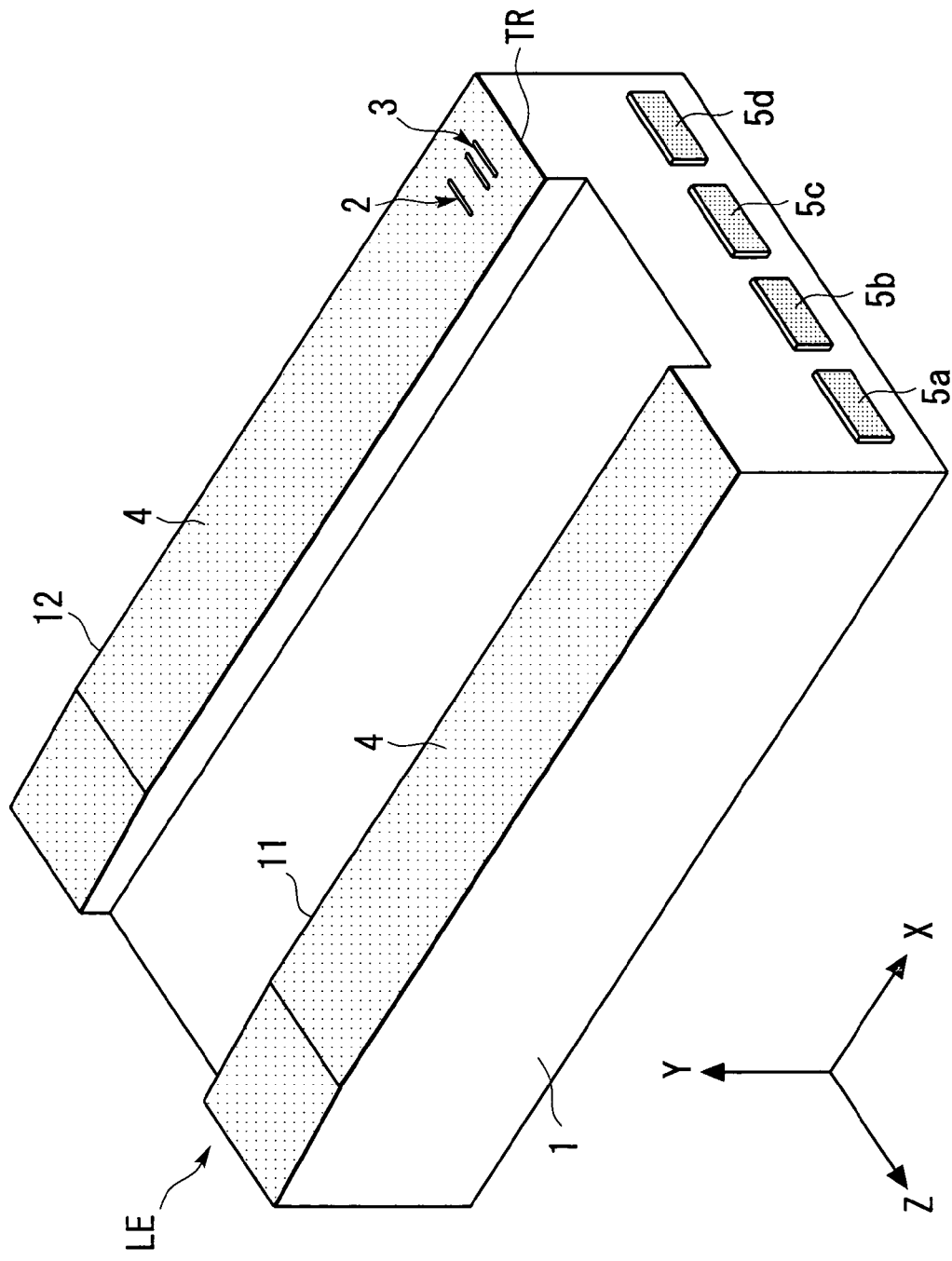
FIG. 1 is a general perspective view schematically illustrating a magnetic head manufactured by a magnetic head manufacturing method according to a first embodiment of the present invention.
Figure 2:
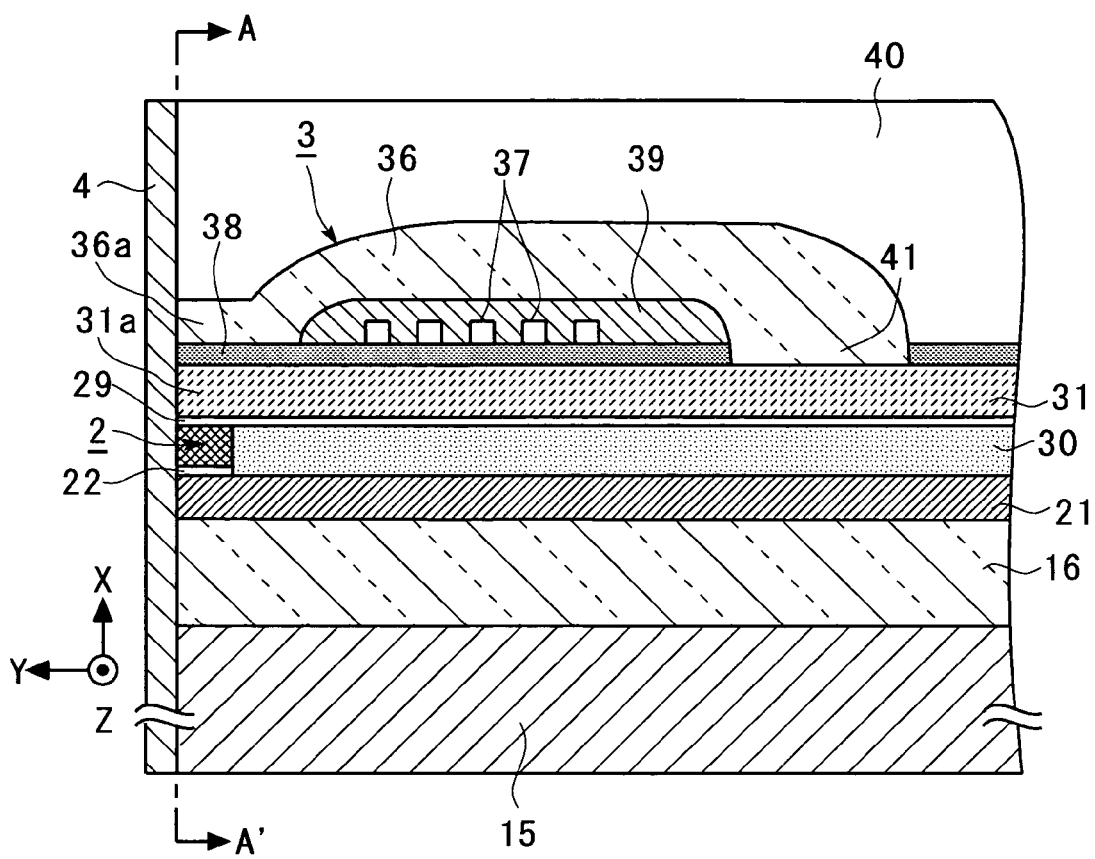
FIG. 2 is an enlarged cross-sectional view schematically illustrating a portion of a TMR device and an inductive magnetic transducing device in the magnetic head illustrated in FIG. 1.
Figure 3:
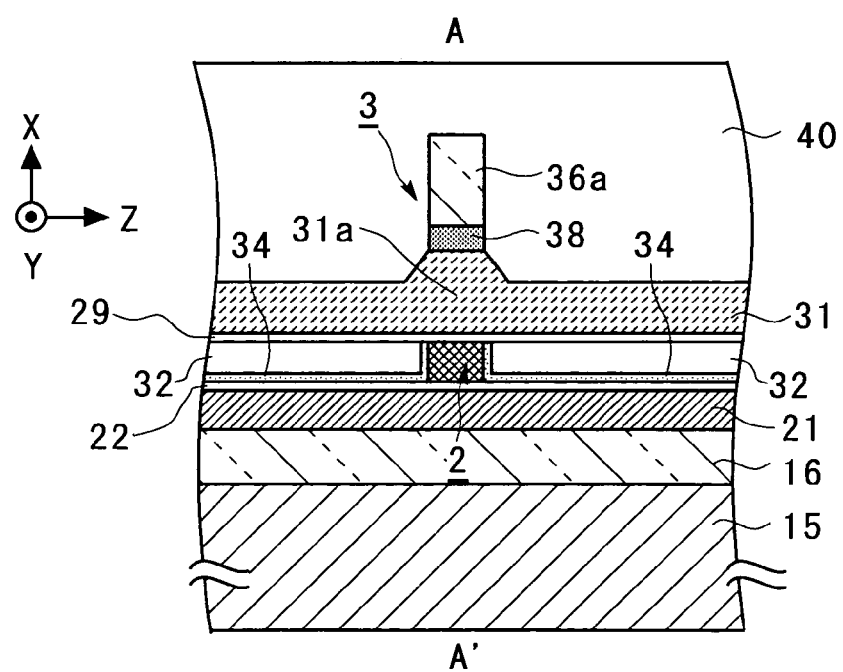
FIG. 3 is a general sectional view taken along a line A–A' indicated by arrows in FIG. 2.
Figure 4:
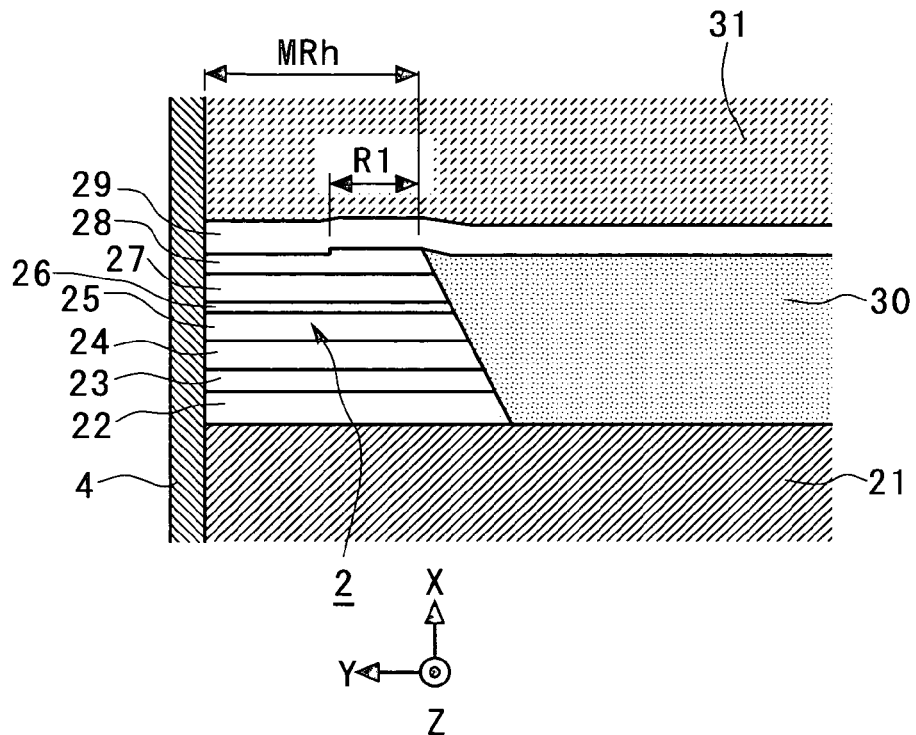
FIG. 4 is a further enlarged view around the TMR device in FIG. 2.
Figure 5:
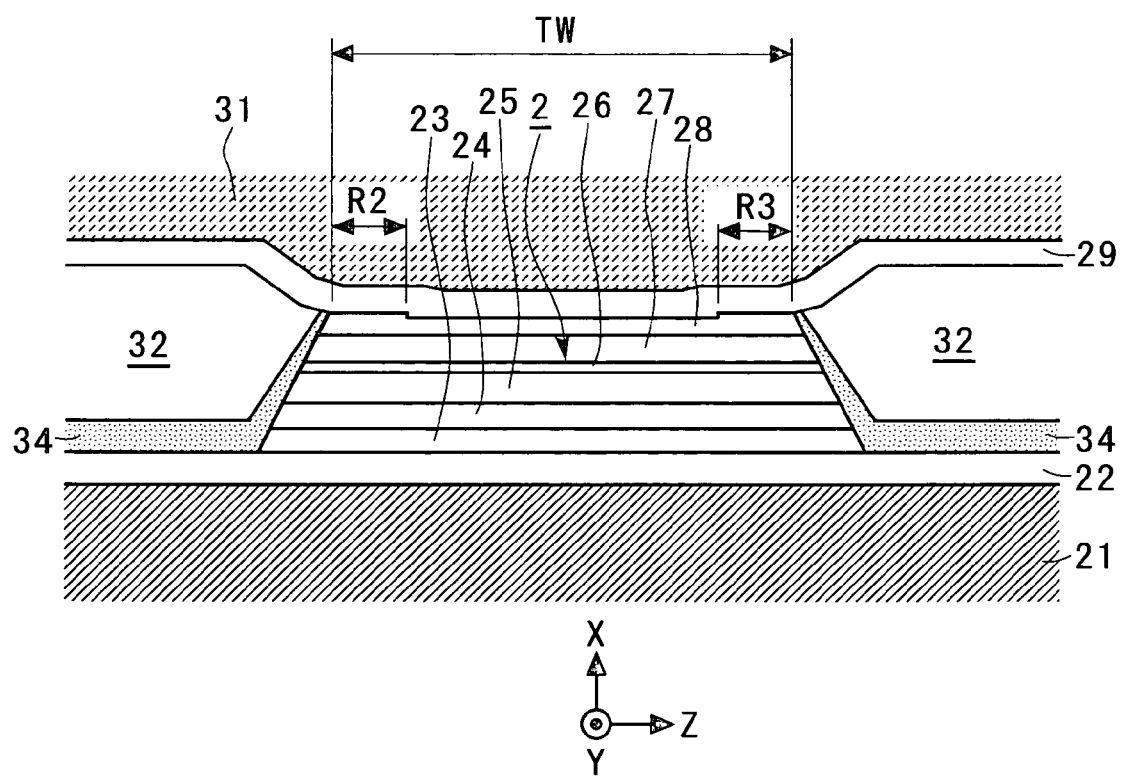
FIG. 5 is a further enlarged view around the TMR device in FIG. 3.

FIG. 1 is a general perspective view schematically illustrating the magnetic head manufactured by the magnetic head manufacturing method according to the first embodiment of the present invention. FIG. 2 is an enlarged cross-sectional view schematically illustrating a portion of a TMR device 2 and an inductive magnetic transducing device 3 in the magnetic head illustrated in FIG. 1. FIG. 3 is a general sectional view taken along a line A–A' indicated by arrows in FIG. 2. FIG. 4 is a further enlarged view illustrating around the TMR device 2 in FIG. 2. FIG. 5 is a further enlarged view around the TMR device 2 in FIG. 3. For facilitating the understanding, an X-axis, a Y-axis and a Z-axis, orthogonal to one another, are defined as shown in FIGS. 1 to 5 (the same applies to figures later described). The Z-axis direction indicated by the arrow is referred to as the "+Z-direction" or "+Z-side," and the opposite direction is referred to as the "–Z-direction" or "–Z-side". The same is applied to the X-axis direction and Y-axis direction. The X-axis direction is the same as a direction in which a magnetic recording medium is moved. The Z-axis direction is the same as a track width direction of the TMR device 2.

As illustrated in FIG. 1, the magnetic head manufactured by the magnetic head manufacturing method according to the first embodiment of the present invention includes a slider 1 as a base; the TMR device 2 as a magneto-resistive device for use as a magnetic head device for reproduction; an inductive magnetic transducing device 3 as a magnetic head device for recording; and a protection film 4 made of a DLC (diamond like carbon) film or the like, and is configured as a composite magnetic head. However, the magnetic head manufactured by the present invention may include only the TMR device 2. Also, while the magnetic head of this example includes one each of the devices 2, 3, the numbers of these devices are not limited in any sense.

The slider 1 has rails 11, 12 on a surface opposite to a magnetic recording medium, and the surfaces of the rails 11, 12 define air bearing surfaces (ABS). In the example illustrated in FIG. 1, there are two rails 11, 12, but the number of rails is not limited to two. For example, the slider 1 may have one to three rails, or the ABS may be a flat surface without rails. In addition, the ABS may be formed with a variety of geometric shapes for improving a floating characteristic and the like. The magnetic head according to the present invention may have any type of slider.

In this example, the protection film 4 is applied only on the surfaces of the rails 11, 12, so that the surface of the protection film 4 defines the ABS. Actually, the protection film 4 may be applied on the entire surface of the slider 1 opposite to a magnetic recording medium. While the protection film 4 is preferably provided, the protection film 4 may not be necessarily provided.

The TMR device 2 and inductive magnetic transducing device 3 are disposed on the rail 12 near an air outlet end TR, as illustrated in FIG. 1. A direction in which a recording medium is moved is identical to the X-axis direction in FIG. 1, and also identical to a direction in which air flows when the magnetic recording medium is rapidly moved. Air enters from an air inlet end LE and exits from the air outlet end TR. The slider 1 is provided on an end face of the air outlet end TR with bonding pads 5a, 5b connected to the TMR device 2, and bonding pads 5c, 5d connected to the inductive magnetic transducing device 3.

As illustrated in FIGS. 2 and 3, the TMR device 2 and inductive magnetic transducing device 3 are laminated on an underlying layer 16 deposited on a ceramic base 15 which constitutes the slider 1. The ceramic base 15 is generally made of AlTiC ($Al_2O_3$—TiC), SiC or the like. When $Al_2O_3$—TiC is used, an insulating film made, for example, of $Al_2O_3$ is used for the underlying layer 16 since $Al_2O_3$—TiC is electrically conductive. The underlying layer 16 may not be provided in some cases.

As illustrated in FIGS. 4 and 5, the TMR device 2 includes a lower electrode 21 formed on the underlying layer 16; an upper electrode 31 formed overlying the lower electrode 21 (opposite to the base 15); and a lower metal layer (lower layer) 22, a lower metal layer (upper layer) 23, a pin layer 24, a pinned layer 25, a tunnel barrier layer 26, a free layer 27, and an upper metal layer (cap layer) 28 as a non-magnetic metal layer which serves as a protection layer, and an upper metal layer 29 as an underlying layer of the upper electrode 31 which are laminated in this order from the lower electrode 21 between the electrodes 21, 31. The pin layer 24, pinned layer 25, tunnel barrier layer 26 and free layer 27 constitute a magneto-resistive layer. While the actual TMR device 2 typically has a laminate structure compose of a larger number of layers, rather than the laminate structure composed of the number of layers as illustrated, the illustrated magnetic head represents a laminate structure minimally required for the basic operation of the TMR device 2 for simplifying the description. In FIG. 4, MRh indicates an MR height defined by the TMR device 2. In FIG. 5, TW indicates the width of a track defined by the TMR device 2.

In this example, the lower electrode 21 and upper electrode 31 are additionally used as a lower magnetic shield and an upper magnetic shield, respectively. The electrodes 21, 31 are formed of a magnetic material, for example, NiFe or the like. Though not shown, these electrodes 21, 31 are electrically connected to the aforementioned bonding pads 5a, 5b, respectively. It should be understood that a lower magnetic shield and an upper magnetic shield may be provided in addition to the lower electrode 21 and upper electrode 31.

The lower metal layer 22 is an electrically conductive material which is formed, for example, by Ta, Ru, Rh, Au, Pt, Ag, Pd, Ir, Cu or the like. The lower metal layer 23 is an electrically conductive material which is formed, for example, of an NiFe layer or the like. In this example, the lower metal layer 23 is formed only coextensively to the magneto-resistive layer, while the lower metal layer 22 widely extends over the electrode 21 in the Z-axis direction. Alternatively, the lower metal layer 23 may also be extended widely in the Z-axis direction, or the lower metal layer 22 may be formed only coextensively to the magneto-resistive layer. Alternatively, each of the lower metal layers 22 and 23 may also be extended widely over the electrode 21 in the Y-axis direction as well as the Z-axis direction.

The pin layer 24, which is comprised of an antiferromagnetic layer, is preferably formed, for example, of an Mn-based alloy such as PtMn, IrMn, RuRhMn, FeMn, NiMn, PdPtMn, RhMn, CrMnPt, or the like. The pinned layer 25 and free layer 27 are each comprised of a ferromagnetic layer formed of such a material as Fe, Co, Ni, FeCo, NiFe, CoZrNb, FeCoNi, or the like. The pinned layer 25 has its magnetization direction fixed in a predetermined direction by an exchange bias magnetic field between the pinned layer 25 and the pin layer 24. On the other hand, the free layer 27 freely varies its magnetization direction in response to an external magnetic field which is basically magnetic information. In this example, the pin layer 24, pinned layer 25, tunnel barrier layer 26 and free layer 27 are laminated in this order from the lower electrode 21. Alternatively, the free layer 27, tunnel barrier layer 26, pinned layer 25 and pin layer 24 may be laminated in this order from the lower electrode 21. The tunnel barrier layer 26 is formed, for example, of a material such as $Al_2O_3$, NiO, GdO, MgO, $Ta_2O_5$, $MoO_2$, $TiO_2$, $WO_2$, or the like.

The upper metal layer (non-magnetic metal layer) 28, serving as a cap layer, is formed of a monolayer film or a multilayer film made of simple Ta, Ru, Rh, Au, Pt, Ag, Pd, Ir, or Cu, or an alloy made up of two or more of these elements in combination, by way of example. In this example, the upper metal layer 28 is milled together with the layers 23–27 during the manufacturing, described later, so that the upper metal 28 substantially exactly overlaps with the layers 23–27.

The upper metal layer 29, serving as the underlying layer of the upper electrode 31, is made of an electrically conductive material formed of a non-magnetic metal such as Ta, Ti or the like. In this example, the upper metal layer 29 is provided for holding a magnetic shield gap (a gap between the electrodes 21, 31) of a desired dimension. However, the upper metal layer 29 may not be provided.

As illustrated in FIGS. 3 and 5, magnetic domain control layers 32 for applying a biasing magnetic field to the free layer 27 for magnetic domain control are formed on both sides of the magneto-resistive layer in the Z-axis direction. The magnetic domain control layers 32 are formed, for example, of a hard magnetic material such as Cr/CoPt (cobalt platinum alloy), Cr/CoCrPt (cobalt chromium platinum alloy), TiW/CoPt, TiW/CoCrPt, or the like. Alternatively, each of the magnetic domain control layers 32 may be, for example, a layer using an switched connection in which a soft magnetic layer and an anti-ferromagnetic layer are laminated. An insulating layer 34 made of $Al_2O_3$, $SiO_2$ or the like is formed below each of the magnetic domain control layers 32. The insulating layer 34 also intervenes between end faces of the associated magnetic domain control layer 32 and layers 23–28, such that the layers 23–28 are not electrically short-circuited by the magnetic domain control layer 32.

Also, as illustrated in FIGS. 2 and 4, in a region where the magnetic domain control layers 32 are not formed, an insulating layer 30 made of $Al_2O_3$, $SiO_2$ or the like is formed between the lower metal layer 22 and the upper metal layer 29.

As illustrated in FIGS. 2 and 3, the inductive magnetic transducing device 3 comprises the upper electrode 31 which is additionally used as a lower magnetic layer for the device 3; an upper magnetic layer 36; a coil layer 37; a write gap layer 38 made of alumina or the like; an insulating layer 39 made of an organic resin such as a novolac resin; a protection layer 40 made of alumina or the like, and the like. NiFe, FeN or the like, for example, is used as a material for the upper magnetic layer 36. Leading ends of the upper electrode 31, which is additionally used as the lower magnetic layer, and the upper magnetic layer 36 are formed as a lower pole 31a and an upper pole 36a which oppose each other through the write gap layer 38 made of alumina or the like in an infinitesimal thickness. The lower pole 31a and upper pole 36a write information on a magnetic recording medium. The upper electrode 31, which is additionally used as the lower magnetic layer, and the upper magnetic layer 36 are coupled to each other at a joint 41 at which a yoke is opposite to the lower pole 31a and upper pole 36a so as to complete a magnetic circuit. Within the insulating layer 39, a coil layer 37 is formed such that it is spirally wound around the joint 41 of the yoke. The coil layer 37 has both ends electrically connected to the bonding pads 5c, 5d. The coil layer 37 is arbitrary in the number of turns and the number of layers. Also, the inductive magnetic transducing device 3 may be arbitrary in structure. The upper electrode 31 may be divided into two layers across an insulating layer made of $Al_2O_3$, $SiO_2$ or the like in order to separate the role of the lower magnetic layer in the inductive magnetic transducing device 3 from the role of the upper electrode in the TMR device 2.

Next, description will be made on an example of a method of manufacturing the magnetic head shown in FIGS. 1 to 5 as a magnetic head manufacturing method according to the first embodiment of the present invention.

First, a wafer process is performed. Specifically, a wafer 101 made of $Al_2O_3$—TiC, SiC or the like is provided for making a base 15. Using the thin film forming technology and the like, the aforementioned layers are formed in a large number of magnetic head forming regions in matrix on the wafer 101 to provide the aforementioned structure.

Figure 17:
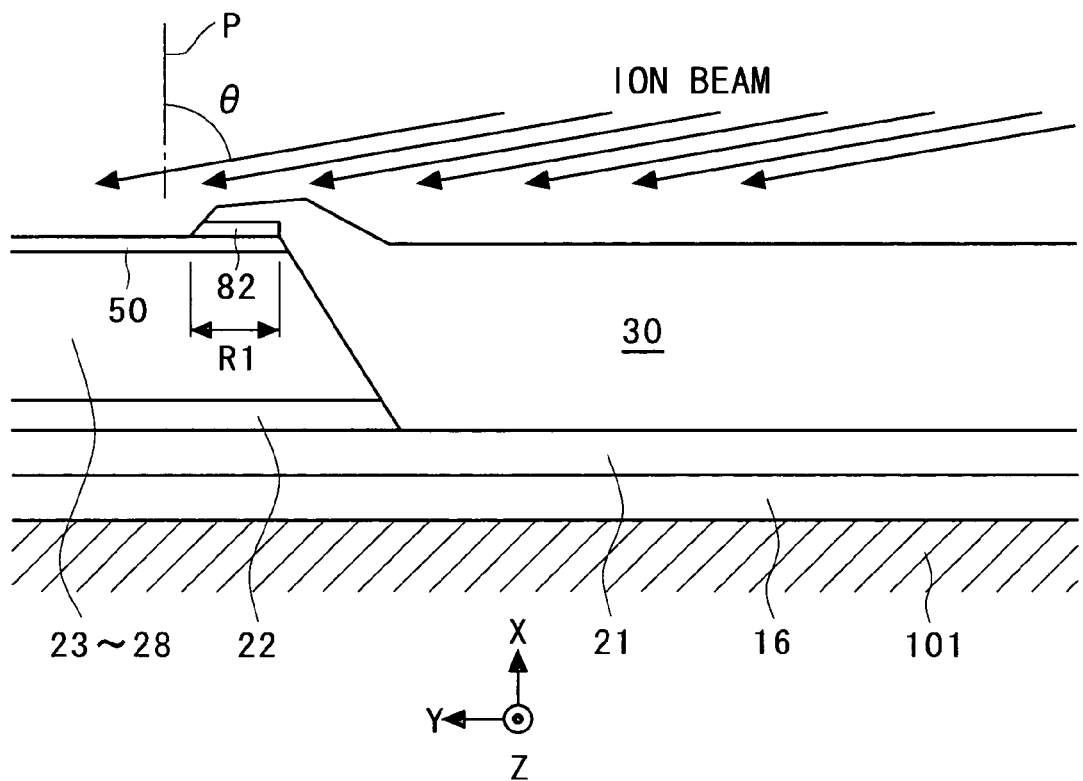
FIG. 17 is a diagram schematically illustrating a further step in the magnetic head manufacturing method according to the first embodiment of the present invention.
Figure 18:
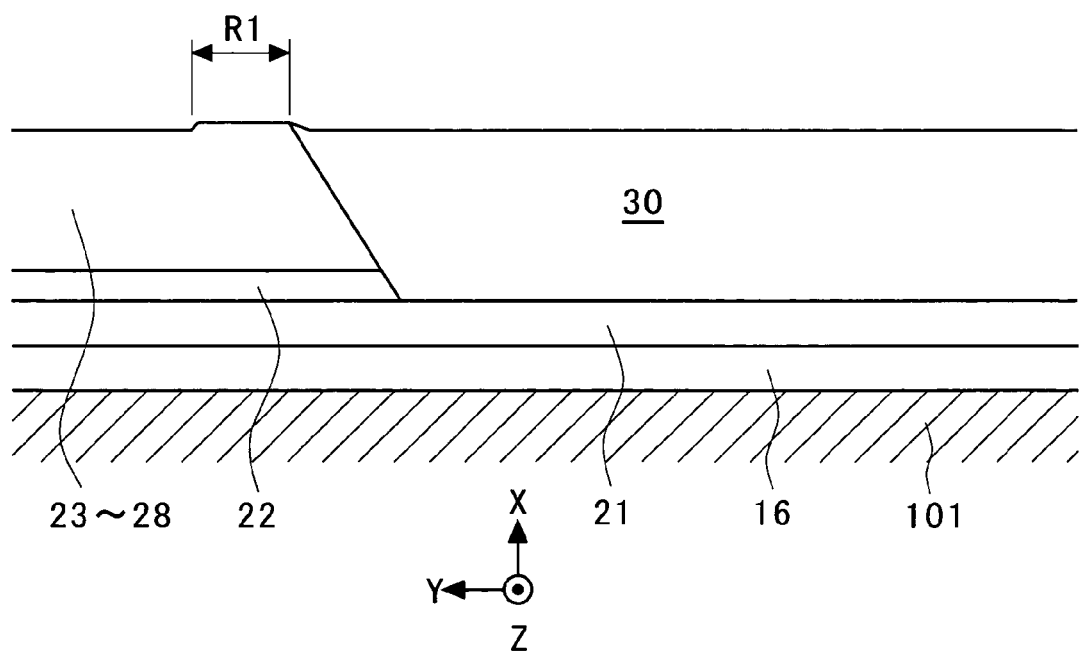
FIG. 18 is a diagram schematically illustrating a further step in the magnetic head manufacturing method according to the first embodiment of the present invention.

The outline of the wafer process will be described with reference to FIGS. 6 to 19. FIGS. 6 to 19 are diagrams schematically illustrating respective steps which make up the wafer process, wherein FIGS. 6A, 7A, 12A and 19A are general plan views, respectively. In FIG. 7A, TW indicates the width of a track defined by the TMR device 2. FIG. 6B is a general cross-sectional view taken along a line C–D in FIG. 6A; FIG. 7B is a general cross-sectional view taken along a line C–D in FIG. 7A; FIG. 12B is a general cross-sectional view taken along a line E–F in FIG. 12A; and FIG. 19B is a general cross-sectional view taken along a line E–F in FIG. 19A. FIGS. 8 to 11 are enlarged cross-sectional diagrams schematically illustrating in detail respective steps from a state shown in FIGS. 6A and 6B to a state shown in FIGS. 7A and 7B. FIGS. 13 to 16 are enlarged cross-sectional diagrams schematically illustrating in detail respective steps from a state shown in FIGS. 7A and 7B to a state shown in FIGS. 12A and 12B. FIGS. 17 and 18 are enlarged cross-sectional diagrams schematically illustrating steps after the states shown in FIGS. 12A and 12B and FIG. 16, respectively.

Figure 6A:
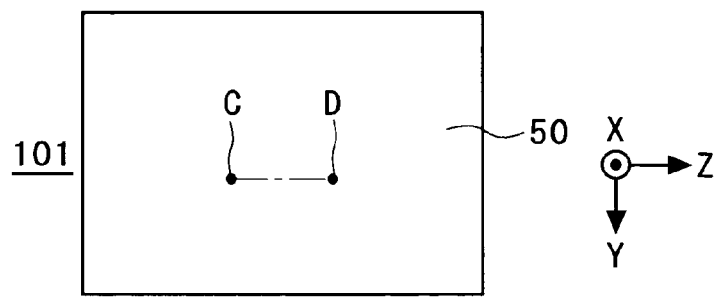
FIGS. 6A and 6B are diagrams schematically illustrating a step in the magnetic head manufacturing method according to the first embodiment of the present invention.
Figure 6B:
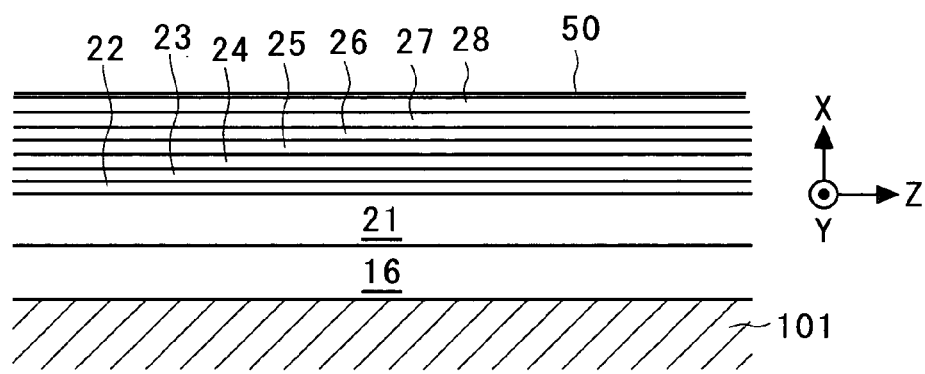
Figure 7A:
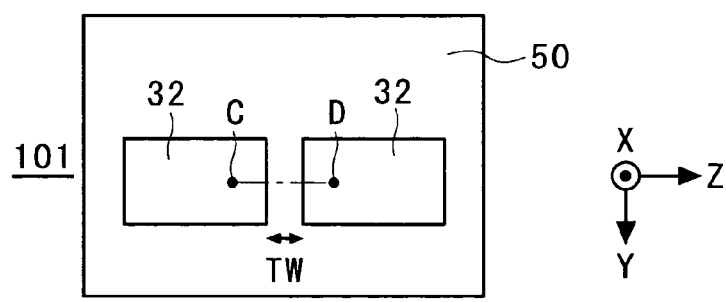
FIGS. 7A and 7B are diagrams schematically illustrating a further step in the magnetic head manufacturing method according to the first embodiment of the present invention.
Figure 7B:
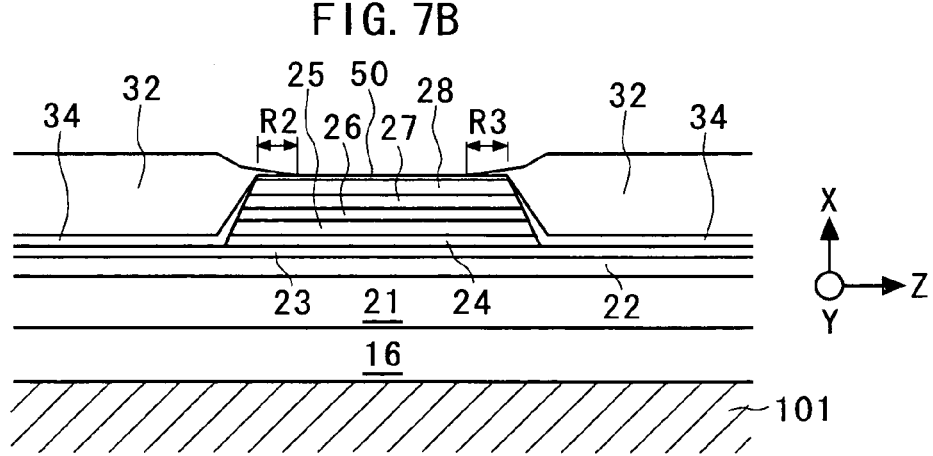

First, in the wafer process, the underlying layer 16, lower electrode 21, lower metal layer 22, lower metal layer 23, pin layer 24, pinned layer 25, tunnel barrier layer 26, free layer 27, and upper metal layer 28 are sequentially laminated on the wafer 101 (FIGS. 6A and 6B). In this event, the lower electrode 21 is formed, for example, by a plating method, while the other layers are formed, for example, by a sputtering method. Subsequently, the substrate in this state is once left in the atmosphere. In this event, the top surface of the magneto-resistive layer (the top surface of the free layer 27 in the first embodiment) is protected by the upper metal layer 28, so that it is not oxidized. However, an oxide film 50 is formed on the top surface of the upper metal layer 28 (FIGS. 6A and 6B).

Next, the lower metal layer 23, pin layer 24, pinned layer 25, tunnel barrier layer 26, free layer 27, upper metal layer 28, and the oxide film 50 are partially removed by ion milling for patterning, conducted as first dry etching. Next, the insulating layers 34 and magnetic domain control layers 32 are formed in the removed portions by a lift-off method (FIGS. 7A and 7B).

Figure 8:
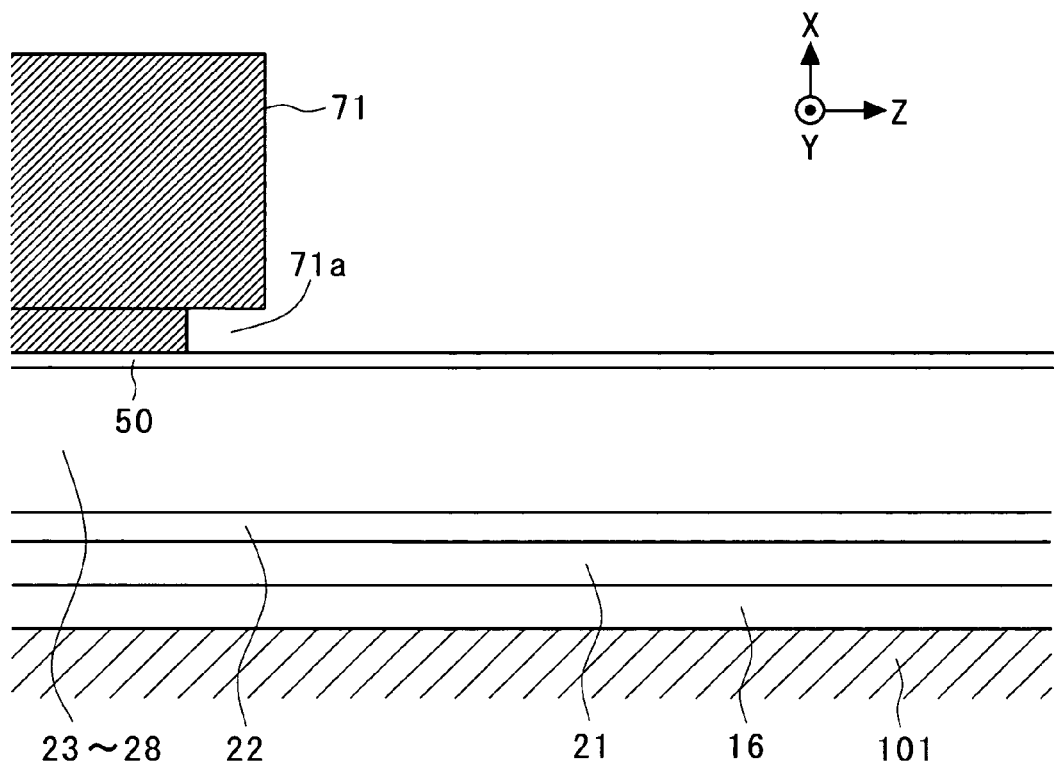
FIG. 8 is a diagram schematically illustrating a further step in the magnetic head manufacturing method according to the first embodiment of the present invention.

This process will be described in greater detail with reference to FIGS. 8 to 11. First, on the substrate as illustrated in FIGS. 6A and 6B (on the surface oxide film 50 in the first embodiment), a resist patter 71 for first lift-off is formed (FIG. 8). In the first embodiment, the resist pattern 71 for first lift-off is a two-layer resist having a shape at cross section including an undercut 71a. Alternatively, the resist pattern 71 for first lift-off may be a resist formed by a monolayer resist method and having a shape at cross section including an undercut, or a resist formed by a monolayer resist method or the like and having an inverse tapered shape at cross section. This aspect is also applied to a resist pattern 81 for second lift-off, later described, and to resist patterns 111, 121 for lift-off used in a third embodiment, later described.

Figure 9:
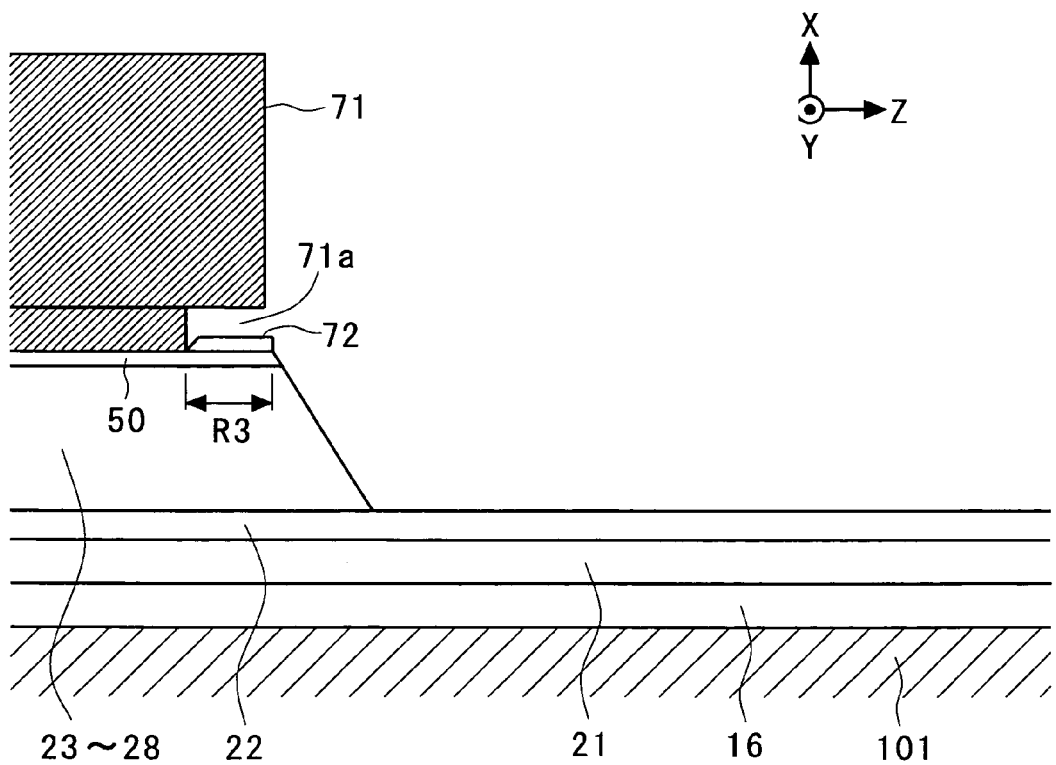
FIG. 9 is a diagram schematically illustrating a further step in the magnetic head manufacturing method according to the first embodiment of the present invention.

Next, with the resist pattern 71 for first lift-off used as a mask, the layers 23–28, 50 are patterned by ion milling (or any other dry etching), conducted as first dry etching (FIG. 9). This patterning defines a track width TW of the TMR device 2, and accordingly the ends of the TMR device 2 on both sides in the track width direction. During the patterning, redeposits 72 resulting from the ion milling of the layers 23–28, 50 are formed in a region on the surface oxide film 50 corresponding to the undercut 71a, as illustrated in FIG. 9. In FIG. 9, a region R3 represents a region on the +Z-side (one side in the track width direction) of the overall region corresponding to the undercut 71a. This aspect is also applied to FIGS. 5, 7B, 10, 11, 19B. In FIGS. 5, 7B, 19B, a region R2 represents a region on the −Z-side (the other side in the track width direction) of the overall region corresponding to the undercut 71a.

Figure 10:
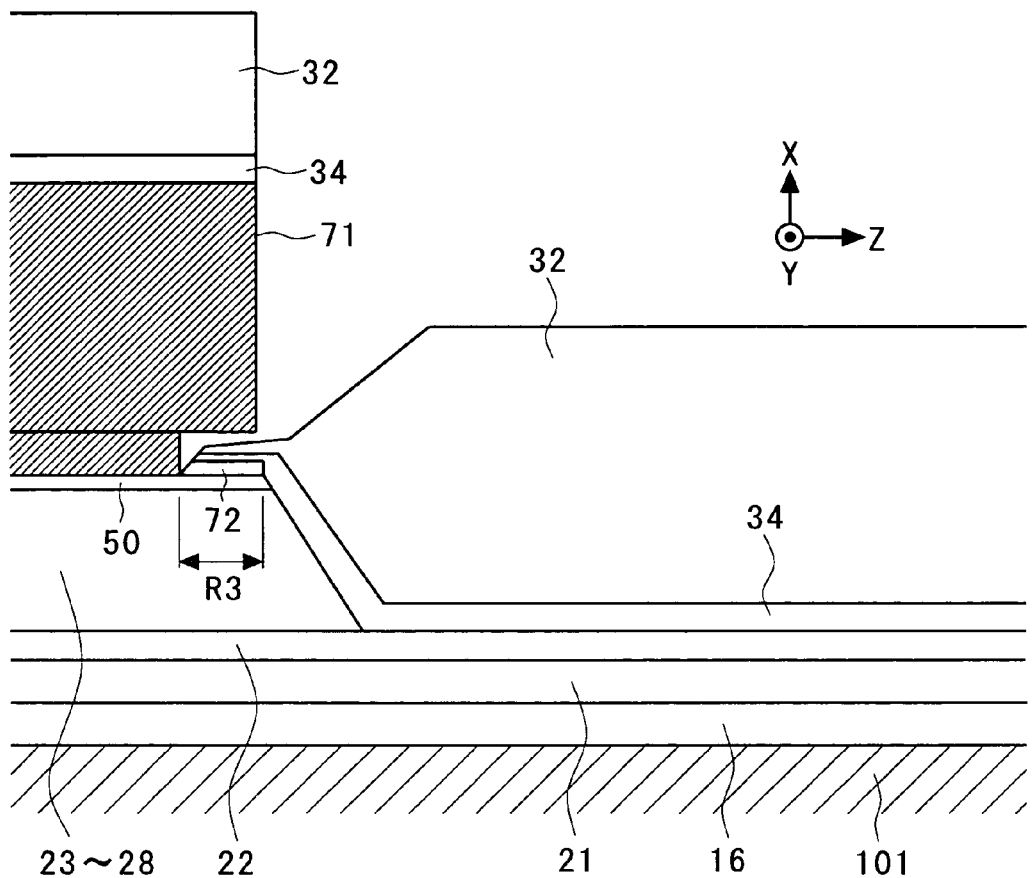
FIG. 10 is a diagram schematically illustrating a further step in the magnetic head manufacturing method according to the first embodiment of the present invention.

Next, with the presence of the resist pattern 71 for first lift-off on the surface oxide film 50, the insulating layer 34 and magnetic domain control layers 32 are deposited in sequence on the substrate 101 by sputtering or the like (FIG. 10). In this event, a portion of the insulating layer 34 and magnetic domain control layer 32 is piled in a region on the surface oxide film 50 corresponding to the undercut 71a (i.e., on redeposits 72), as illustrated in FIG. 10. This portion is hereinafter referred to as a "piled portion".

As described above, products resulting from the redeposits 72 and the piled portion of the insulating layer 34 and magnetic domain control layer 32 are formed in the region on the surface oxide film 50 corresponding to the undercut 71a of the resist pattern 71 for first lift-off.

Figure 11:
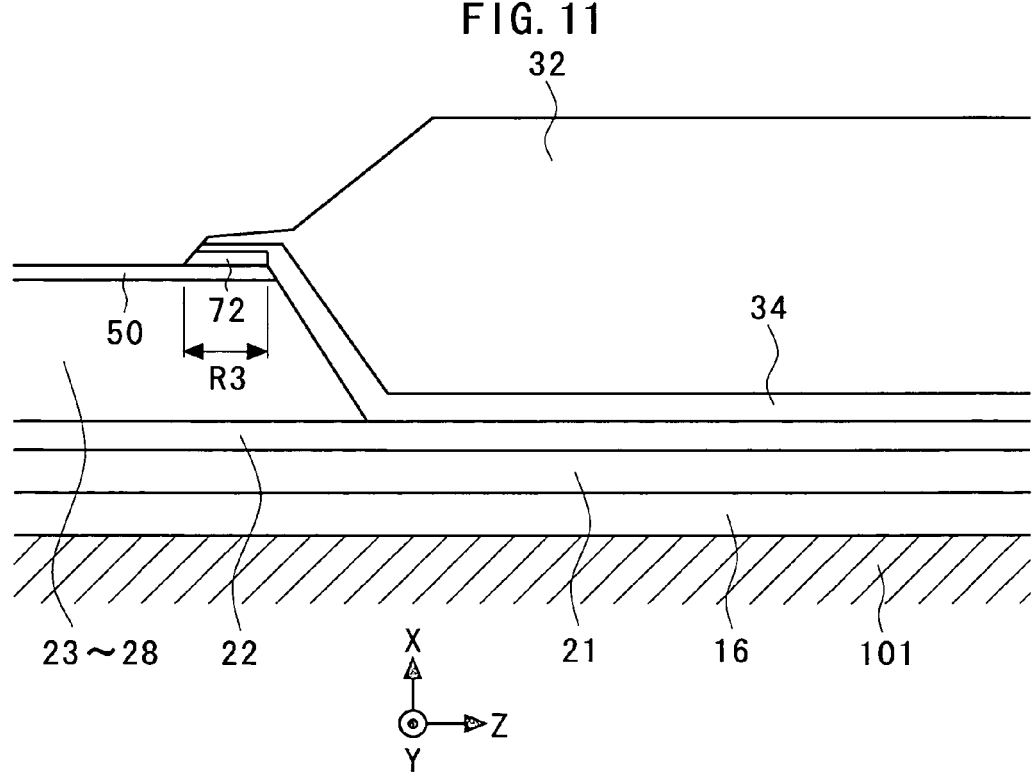
FIG. 11 is a diagram schematically illustrating a further step in the magnetic head manufacturing method according to the first embodiment of the present invention.

Subsequently, the resist pattern 71 for first lift-off is removed to remove a portion of the insulating layer 34 and magnetic domain control layer 32 on the resist pattern 71 for first lift-off (FIG. 11). FIG. 11 represents the same state as that in FIGS. 7A and 7B.

Figure 12A:
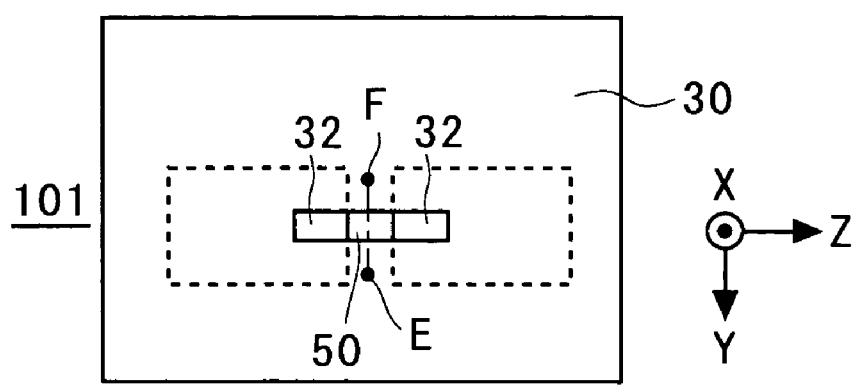
FIGS. 12A and 12B are diagrams schematically illustrating a further step in the magnetic head manufacturing method according to the first embodiment of the present invention.
Figure 12B:
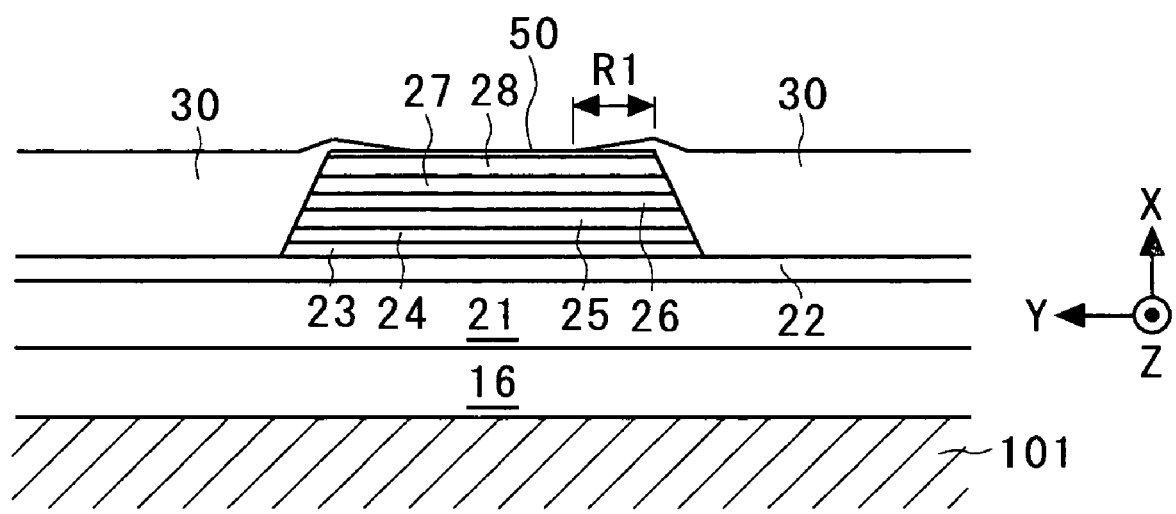

Next, the lower metal layer 23, pin layer 24, pinned layer 25, tunnel barrier layer 26, free layer 27, upper metal layer 28, surface oxide film 50, magnetic domain control layers 32, and insulating layer 34 are partially removed for patterning by ion milling, conducted as second dry etching, while leaving a strip portion which has a necessary width (width in the Y-axis direction) with respect to the height direction of the TMR device 2 and extends in the Z-axis direction by a predetermined distance. Subsequently, the insulating layer 30 is formed in the removed portions by a lift-off method (FIGS. 12A and 12B).

Figure 13:
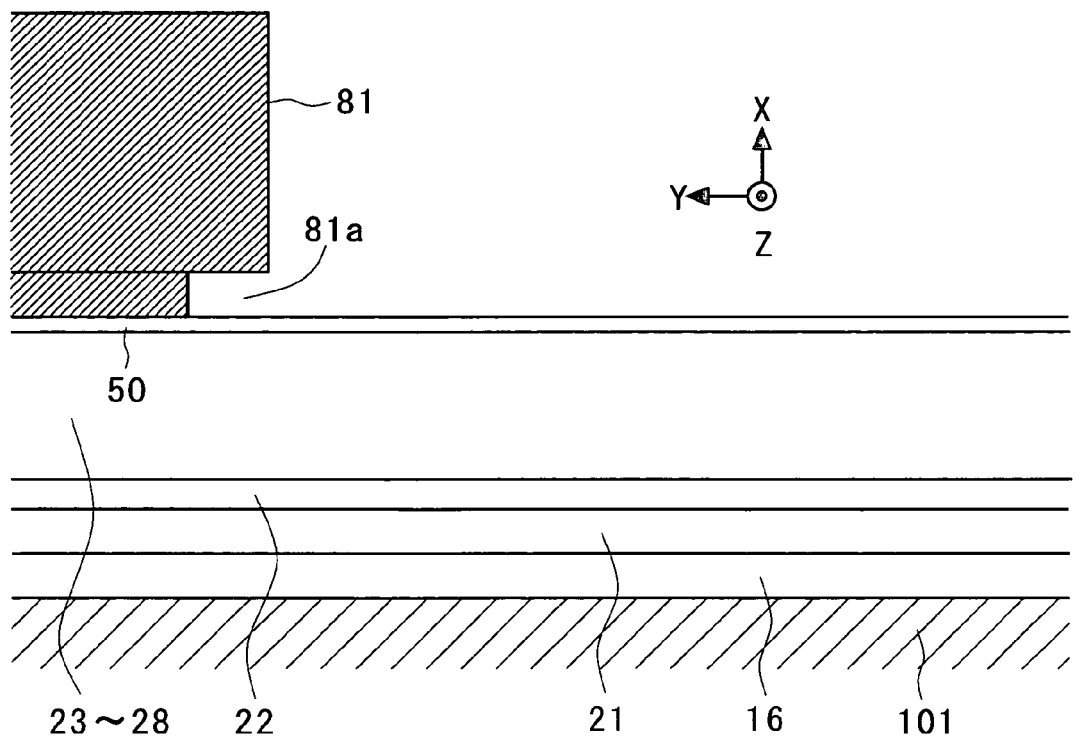
FIG. 13 is a diagram schematically illustrating a further step in the magnetic head manufacturing method according to the first embodiment of the present invention.

This process will be described in greater detail with reference to FIGS. 13 to 16. First, on the substrate as illustrated in FIGS. 7A, 7B and 11, a resist pattern 81 for second lift-off is formed (FIG. 13).

Figure 14:
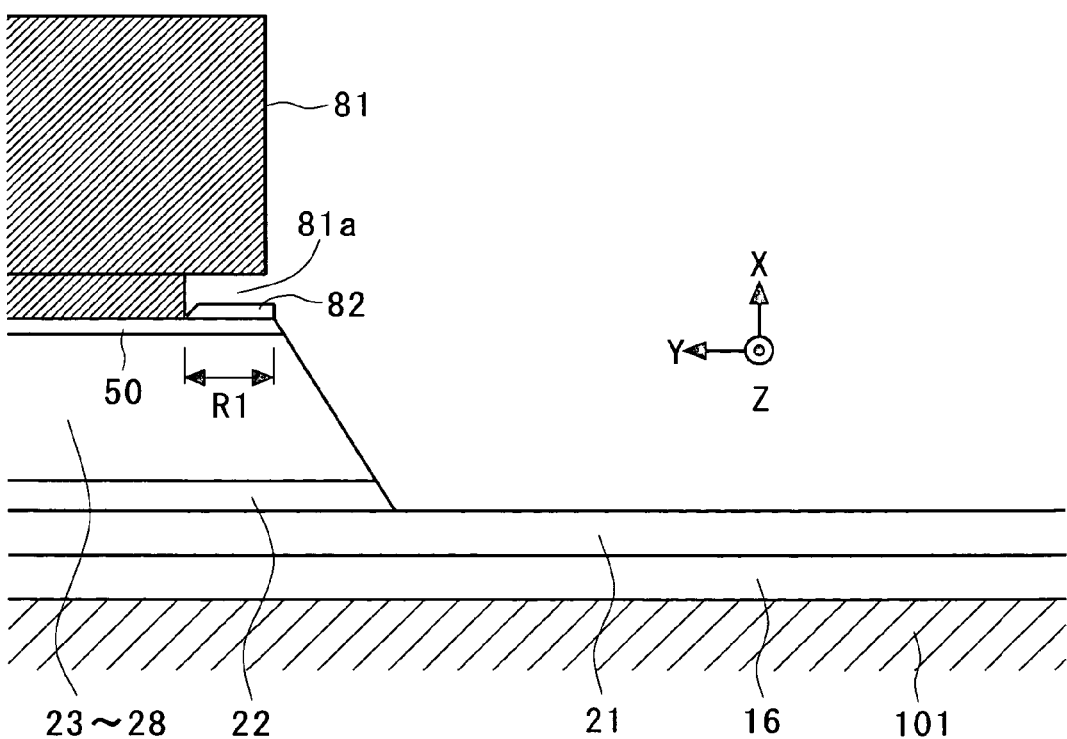
FIG. 14 is a diagram schematically illustrating a further step in the magnetic head manufacturing method according to the first embodiment of the present invention.

Next, with the resist pattern 81 for second lift-off used as a mask, the layers 23–28, 50, 32, 34 are patterned is by ion milling (or any other dry etching), conducted as second dry etching (FIG. 14). This patterning defines one end of the TMR device 2 in the height direction (the end on the −Y-side, i.e., the end opposite to the ABS in the first embodiment). During the patterning, redeposits 82 resulting from the ion milling of the layers 23–28, 50, 32, 34 are formed in a region on the surface oxide film 50 and the like corresponding to an undercut 81a of the resist pattern 81 for second lift-off, as illustrated in FIG. 14. In FIG. 14, a region R1 represents a region on the −Y-side (side opposite to the ABS) of the overall region corresponding to the undercut 81a. This aspect is also applied to FIGS. 4, 12B, 15–18.

Figure 15:
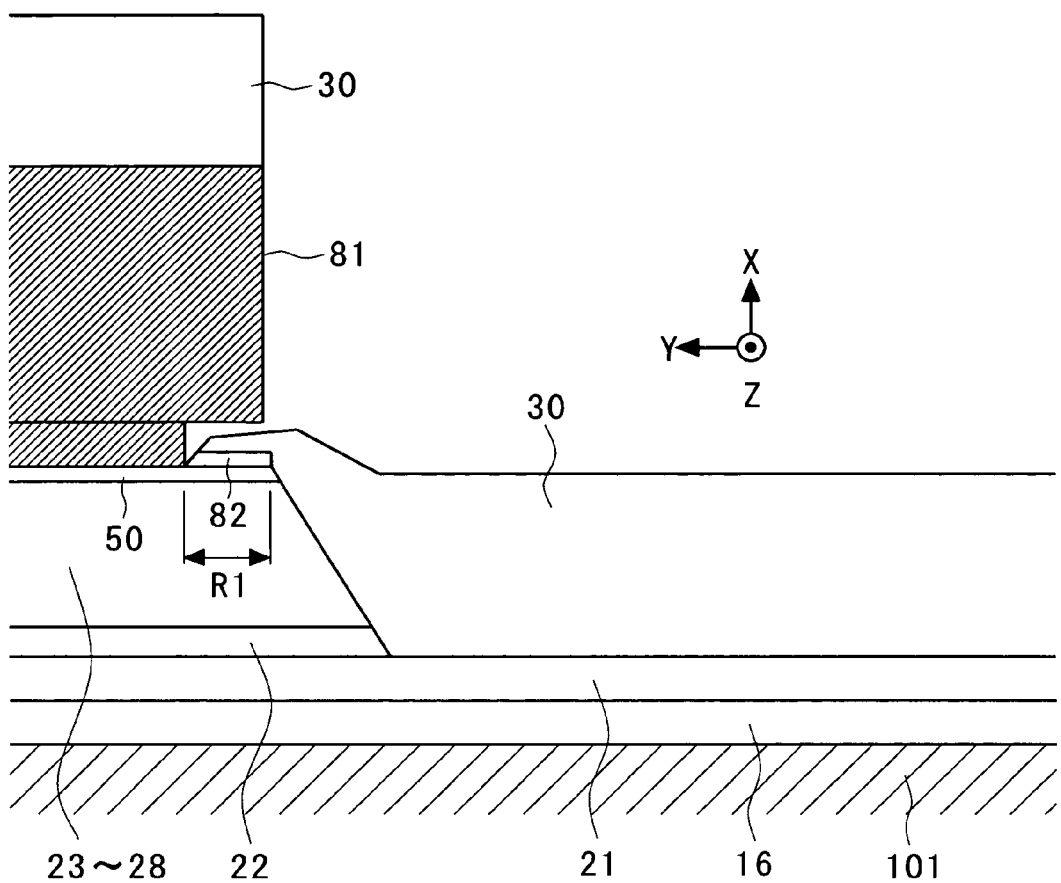
FIG. 15 is a diagram schematically illustrating a further step in the magnetic head manufacturing method according to the first embodiment of the present invention.

Next, with the presence of the resist pattern 81 for second lift-off on the substrate 101, the insulating layer 30 is deposited on the substrate 101 by sputtering or the like (FIG. 15). In this event, a portion of the insulating layer 30 is piled in a region on the surface oxide film 50 and the like corresponding to the undercut 81a (i.e., on redeposits 82), as illustrated in FIG. 15. This portion is hereinafter referred to as a "piled portion".

As described above, products resulting from the redeposits 82 and the piled portion of the insulating layer 30 are formed in the region on the surface oxide film 50 and the like corresponding to the undercut 81a of the resist pattern 81 for second lift-off.

Figure 16:
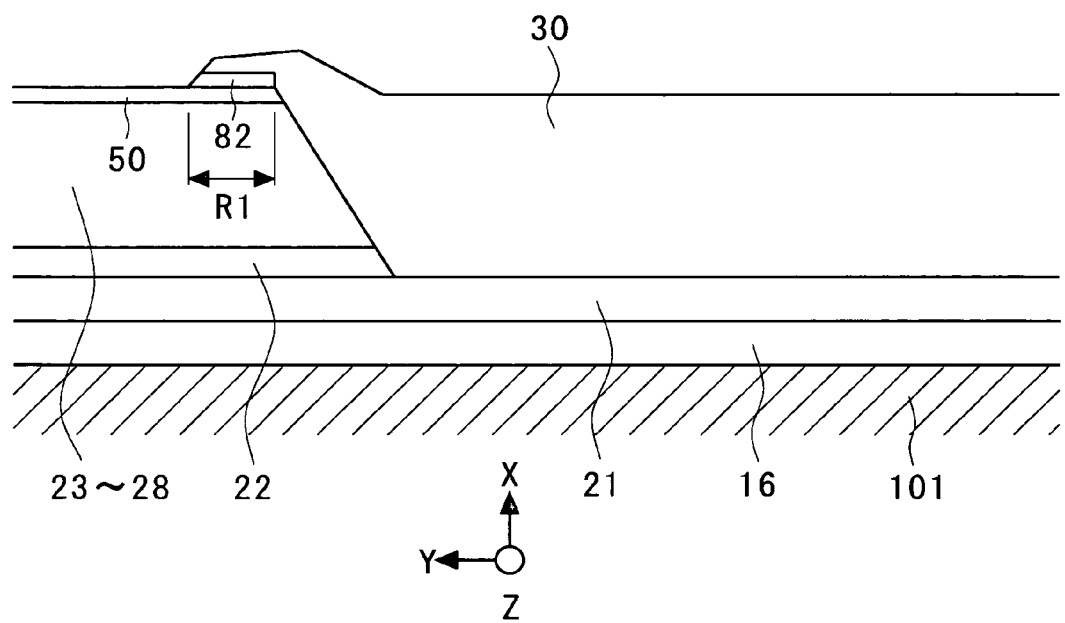
FIG. 16 is a diagram schematically illustrating a further step in the magnetic head manufacturing method according to the first embodiment of the present invention.

Subsequently, the resist pattern 81 for second lift-off is removed to remove a portion of the insulating layer 30 on the resist pattern 81 for second lift-off (FIG. 16). FIG. 16 represents the same state as that in FIGS. 12A and 12B.

Next, an etching process is performed for etching the top surface side of the substrate 101 as illustrated in FIGS. 12A, 12B, 16. The etching process involves dry etching using etching particles which do not substantially form clusters, with a main incident angle θ of the etching particles to the top surface side of the substrate 101 being set in a range of 60° to 90° relative to the direction of the normal P on the top surface of the substrate 101. In the first embodiment, the dry etching performed therein is normal ion beam etching (i.e., ion beam etching using etching particles which do not substantially form clusters). In this event, a simple gas or a mixed gas composed of one or more selected from a group consisting of He, Ne, Ar, Kr, and Xe is preferably used for the dry etching. In the present invention, however, the dry etching using the etching particles which do not substantially form clusters, performed in the etching process, is not limited to ion beam etching. For further increasing the selectivity for removal or reduction of the products (the redeposits 72, 82, piled portion of insulating layer 34 and magnetic domain control layer 32, and piled portion of insulating layer 30) (in other words, the ability to flattening a protrusion), the incident is angle θ is preferably set in a range of 75° to 90°, and more preferably set in a range of 80° to 90°, and further preferably set in a range of 85° to 90°.

The ion beam etching with the incident angle θ set in a range of 60° to 90° is preferably performed while rotating the substrate 101 about an axis substantially parallel with the normal P. However, the substrate 101 need not be necessarily rotated.

In the first embodiment, the ion beam etching with the incident angle θ set in a range of 60° to 90° is performed within the same vacuum chamber in which the upper metal layer 29 is formed, to the extent that the products are removed and the surface oxide film 50 present below the products and in other regions is also removed. Alternatively, the ion beam etching with the incident angle θ set in a range of 60° to 90° may be performed, for example, to the extent that the products are removed, but the surface oxide film 50 below the products remains. In this event, in order to remove the surface oxide film 50, the ion beam etching with the incident angle θ set in a range of 60° to 90° may be followed, for example, by dry etching (for example, ion beam etching) with the main incident angle θ of etching particles set at another angle (for example, approximately 0°). In this event, by performing the dry etching with the main incident angle θ of etching particles set at another angle (for example, approximately 0°) within the same vacuum chamber in which the upper metal layer 29 is formed, the ion beam etching with the incident angle θ set in a range of 60° to 90° can be performed in a vacuum chamber different from that in which the upper metal layer 29 is formed for the reason set forth below. Even if a surface oxide film is formed due to exposure to the atmosphere after the removal or reduction of the products by the ion beam etching with the incident angle θ set in a range of 60° to 90°, the surface oxide film can be removed by the dry etching with the main incident angle θ of etching particles set at another angle (for example, approximately 0°). Alternatively, in the order reverse to the foregoing, the dry etching with the main incident angle θ of etching particles set at another angle (for example, approximately 0°) may be followed by the ion beam etching with the incident angle θ set in a range of 60° to 90°.

In the first embodiment, the ion beam etching with the incident angle θ set in a range of 60° to 90° removes the products (the redeposits 72, 82, piled portion of insulating layer 34 and magnetic domain control layer 32, and piled portion of insulating layer 30) as well as the surface oxide film 50 present below the products and in other regions, as illustrated in FIG. 18. It should be noted that since FIG. 18 illustrates a cross-sectional view taken is along a plane parallel with the XY-plane, it cannot be seen from FIG. 18 how the device appears after the removal of the products (the redeposits 72, 82, and piled portion of insulating layer 34 and magnetic domain control layer 32) on the regions R2, R3. However, the appearance after the removal can be seen in FIGS. 19A and 19B and the like, later described.

In this event, the incident angle θ set in a range of 60° to 90° as mentioned above results in higher selectivity for the removal or reduction of the products. Presumably, the selectivity for the removal or reduction (in other words, the ability to flatten a protrusion) is increased because the etching particles laterally hit the products. In the first embodiment, it is also thought from the following reason that the selectivity for the removal or reduction of the products is increased. Specifically, the incident angle θ of an ion beam set at approximately 0° causes a lower etching rate for insulating films made of $Al_2O_3$, $SiO_2$ or the like than for metal, whereas the incident angle θ of an ion beam set in a range of 60° to 90° causes the etching rate for insulating films not to be so different from the etching rate for metal or to be higher than the etching rate for metal. The products include the piled portion of the insulating layers 34, 30, while the upper metal layer 28 is made of metal. Consequently, it is through that the selectivity for the removal or reduction of the products is increased also from the relationship between the etching rate for insulating materials and the etching rate for metal.

Figure 19A:
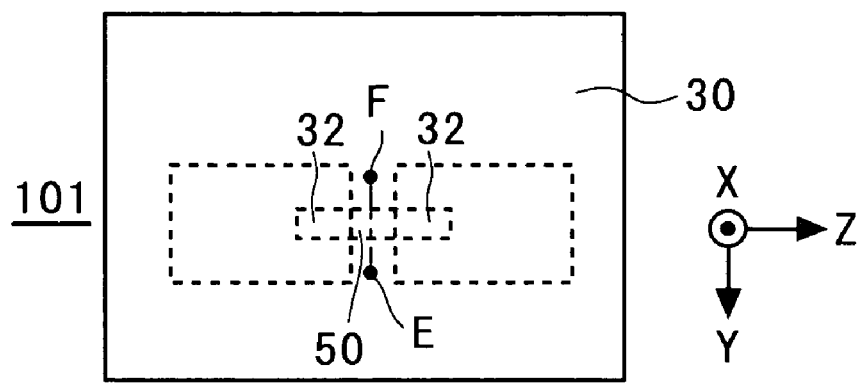
FIGS. 19A and 19B are diagrams schematically illustrating a further step in the magnetic head manufacturing method according to the first embodiment of the present invention.
Figure 19B:
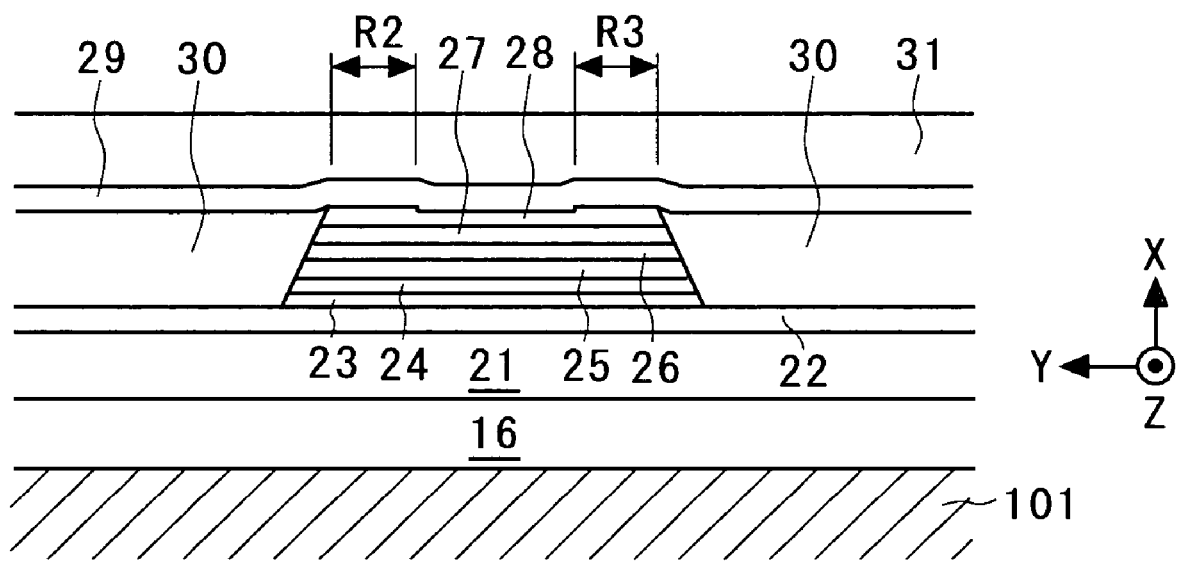

Subsequently, the upper metal layer 29 is formed on the substrate 101 as illustrated in FIG. 18 by a sputtering method or the like, and the upper electrode 31 is formed by a plating method or the like (FIGS. 19A and 19B).

Finally, the gap layer 38, coil layer 37, insulating layer 39, upper magnetic layer 36, and protection layer 40 are formed, and the electrodes 5a–5d and the like are formed. By now, the wafer process is completed.

Next, magnetic heads are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. Next, a protection film 4 is formed on the surface of the ABS side, and rails 11, 12 are formed by etching or the like. Finally, the bar is cut by machining into individual magnetic heads. In this manner, the magnetic heads as illustrated in FIGS. 1 to 5 are completed.

While the first embodiment has shown an example of manufacturing a TMR head, a CPP-GMR head may be manufactured by forming a non-magnetic metal layer made of Cu, Au, Ag or the like instead of the tunnel barrier layer 26 in the first embodiment.

Figure 20:
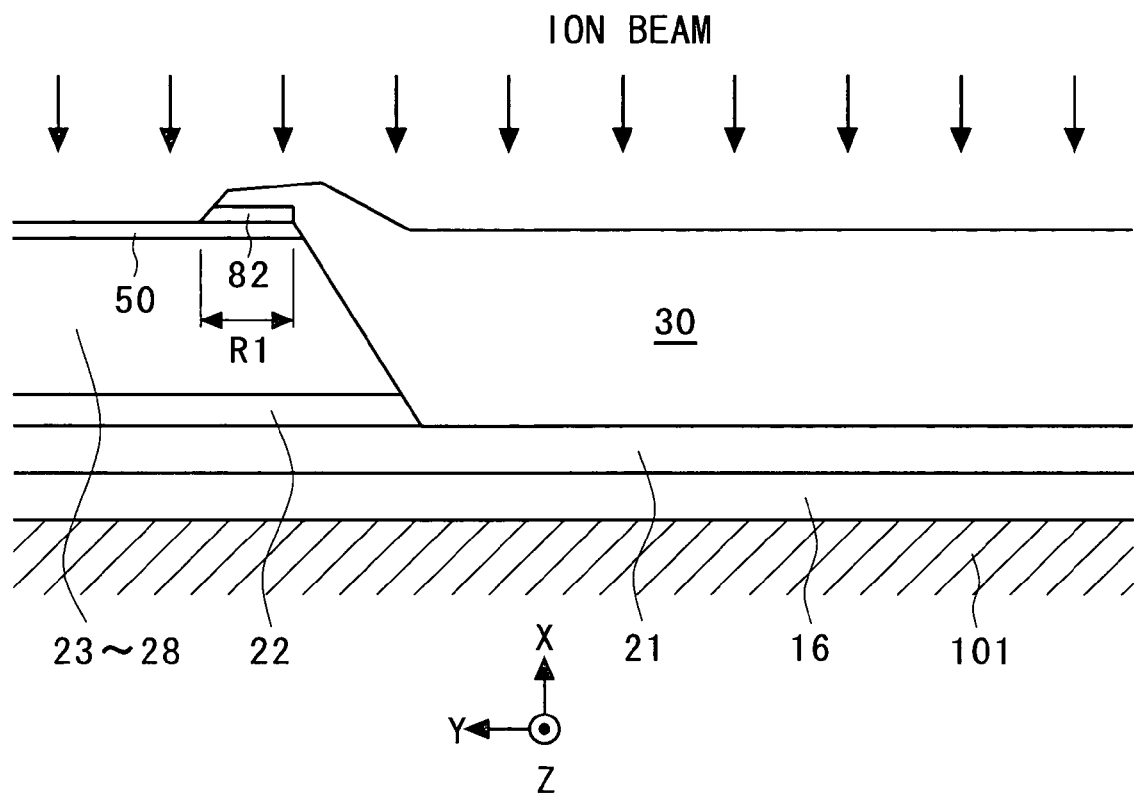
FIG. 20 is a diagram schematically illustrating a step in a magnetic head manufacturing method according to a first comparative example.
Figure 21:
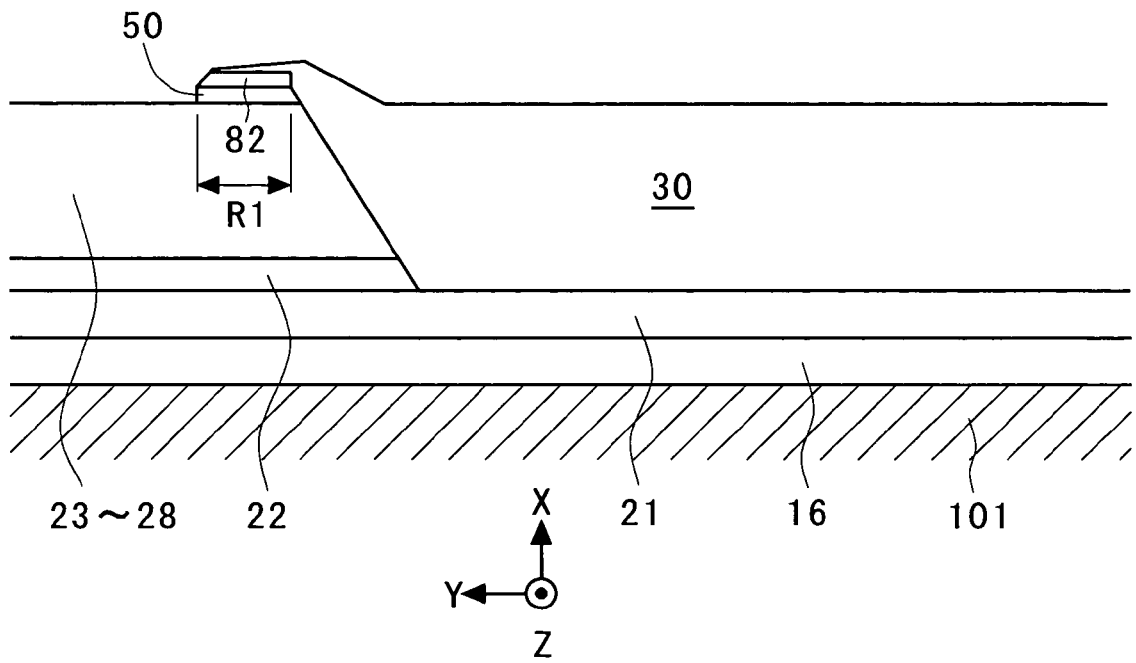
FIG. 21 is a diagram schematically illustrating a further step in the magnetic head manufacturing method according to the first comparative example.
Figure 22A:
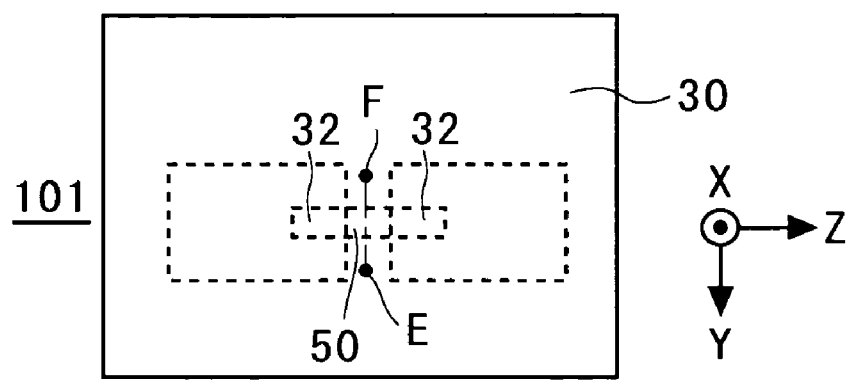
FIGS. 22A and 22B are diagrams schematically illustrating a further step in the magnetic head manufacturing method according to the first comparative example.
Figure 22B:
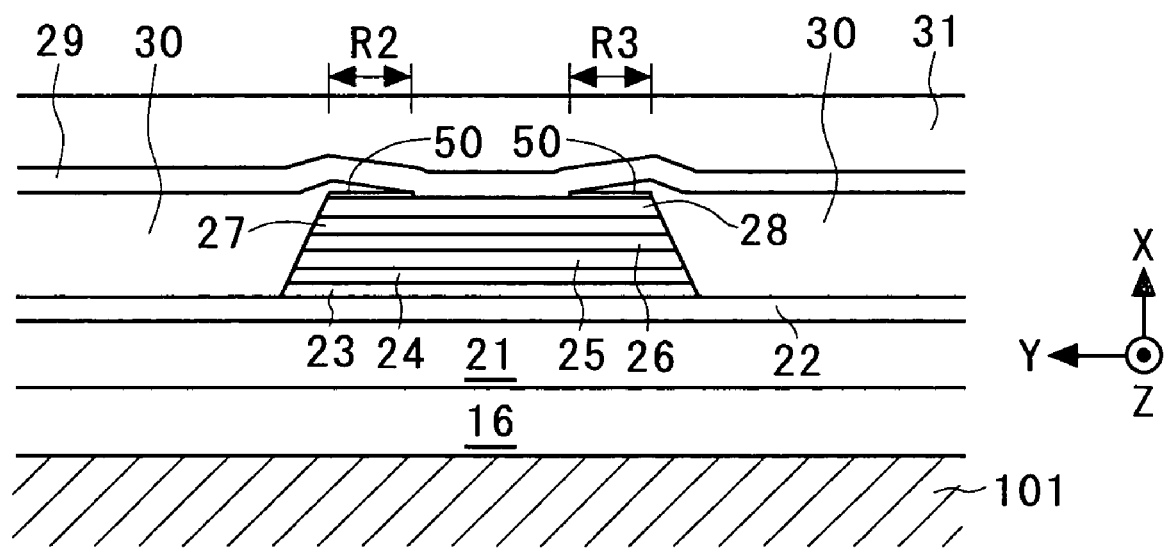
Figure 23:
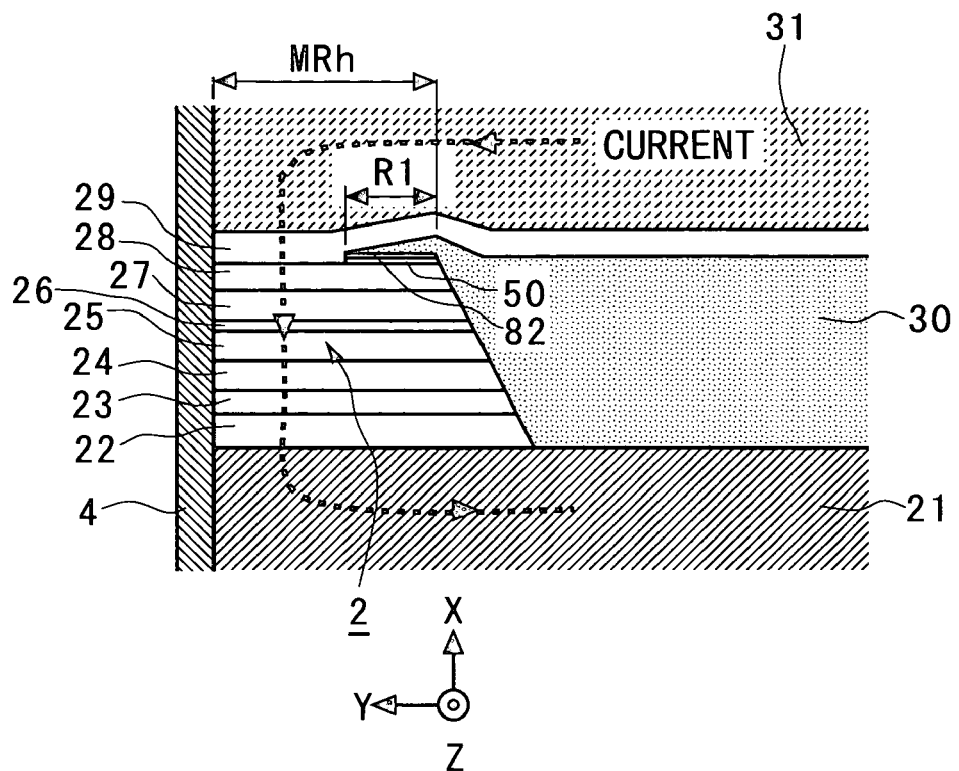
FIG. 23 is an enlarged cross-sectional view schematically illustrating a portion of a TMR device in a magnetic head manufactured by the magnetic head manufacturing method according to the first comparative example.
Figure 24:
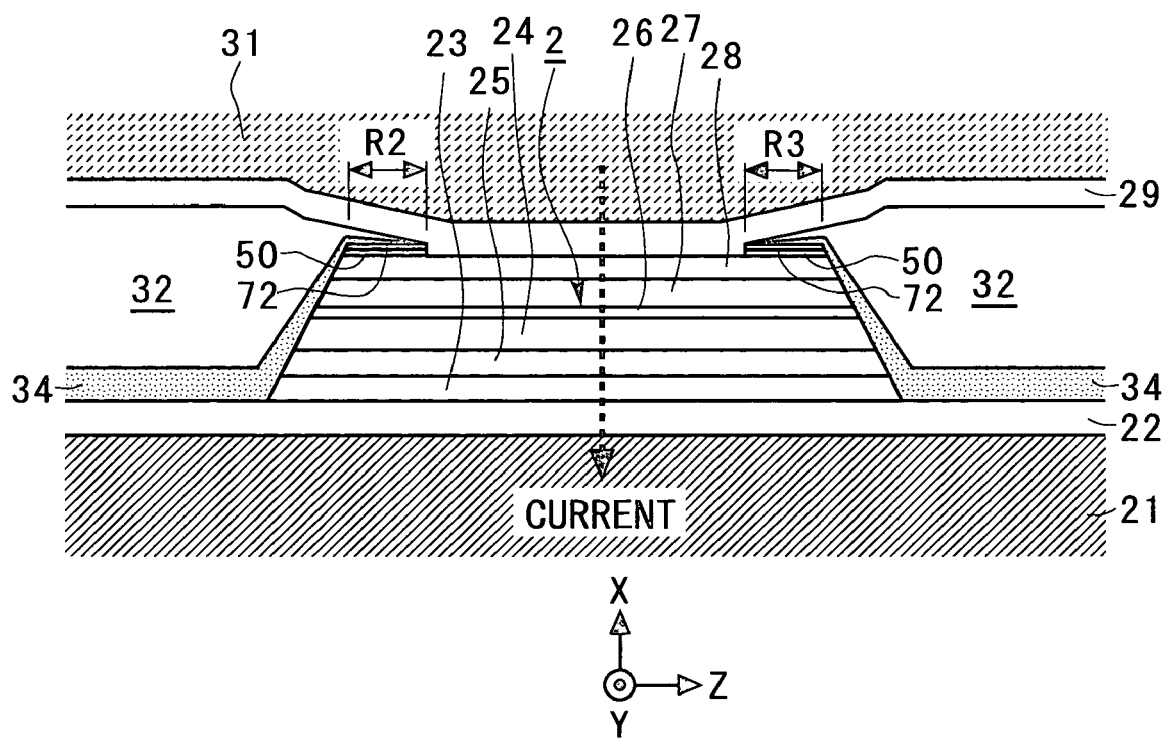
FIG. 24 is another enlarged cross-sectional view schematically illustrating a portion of the TMR device in the magnetic head manufactured by the magnetic head manufacturing method according to the first comparative example.

Now, a first comparative example will be described with reference to FIGS. 20 to 24 for comparison with the manufacturing method according to the first embodiment. FIGS. 20 to 22 are diagrams schematically illustrating respective steps which make up a manufacturing method according to the first comparative example. FIGS. 20 and 21 are general enlarged cross-sectional views corresponding to FIGS. 17 and 18, respectively. FIG. 22A is a general plan view, and FIG. 22B is a general cross-sectional view taken along a line E–F in FIG. 22A. FIGS. 22A and 22B correspond to FIGS. 12A and 12B, respectively. FIGS. 23 and 24 are enlarged cross-sectional views schematically illustrating a portion of a TMR device 2 for a magnetic head manufactured by the manufacturing method according to the first comparative example. FIGS. 23 and 24 correspond to FIGS. 4 and 5, respectively. In FIGS. 20 to 24, elements identical or corresponding to those in FIGS. 1 to 22 are designated by the same reference numerals, and repeated description thereon is omitted.

The manufacturing method according to the first comparative example modifies the manufacturing method according to the first embodiment described above in the following manner in accordance with the prior art. Specifically, the manufacturing method according to the first comparative example differs from the manufacturing method according to the first embodiment of the present invention only in that normal ion beam etching with the incident angle θ set at 0° as illustrated in FIG. 20 is substituted for the normal ion beam etching with the incident angle θ set in a range of 60° to 90° as illustrated in FIG. 17 in the aforementioned etching process.

When the ion beam etching is performed with the incident angle θ set at 0° to the extent that the surface oxide film 50 is exactly removed in a region which is not formed with the aforementioned products (the redeposits 72, 82, piled portion of insulating layer 34 and magnetic domain control layer 32, and piled portion of insulating layer 30), the ion beam etching does remove some of the products, but fails to remove the rest of the products and the surface oxide film 50 below the products, as illustrated in FIG. 21. Presumably, this is because the selectivity for the removal or reduction (in other words, the ability to flatten a protrusion) is low since the etching particles hit the products from above. It is also thought that the incident angle θ of an ion beam set at approximately 0° causes a lower etching rate for insulating films made of $Al_2O_3$, $SiO_2$ or the like than for metal, resulting in a lower selectivity for the removal or reduction of the products as well.

Therefore, when the upper metal layer 29 and upper electrode 31 are formed on the substrate 101 as illustrated in FIG. 21, the resulting device is as illustrated in FIGS. 22A and 22B. Consequently, in a magnetic head manufactured by the manufacturing method according to the first comparative example, the surface oxide film 50, redeposits 72, 82, insulating layers 30, 34, and the like remain in the aforementioned regions R1–R3 to limit a path for a current which flows into the magneto-resistive layer, as illustrated in FIGS. 23 and 24, thereby reducing an area which makes a good electrical contact. This results in an increased series resistance component of the TMR device 2 which causes degraded MR characteristics, degraded frequency characteristics associated with a higher resistance of the head, and the like. The widths of the regions R1–R3 are determined by the dimensions of the undercuts 71a, 81a of the resist patterns 71, 81 for lift-off. It is therefore difficult to reduce the widths of the regions R1–R3 to predetermined dimensions (for example, several tens of nanometers) or less in order to avoid producing burrs during the lift-off. Thus, when the TMR device 2 is reduced in size (for example, the MR height MRh is reduced to 100 nm or less) for increasing a recording density, the resulting TMR device 2 has a significantly reduced area which makes an electrically good contact to strictly limit a path for a current which flows into a magneto-resistive layer, thereby notably affecting the magneto-resistive device due to the degraded MR characteristics, degraded frequency characteristics associated with a higher resistance of a head, and the like.

Also, as illustrated in FIG. 24, a portion of the magnetic domain control layers 32 is piled in the regions R2, R3 in the magnetic head manufactured by the manufacturing method according to the first comparative example. Therefore, part of a biasing magnetic field from the magnetic domain control layer 32 passes through the piled portions of the magnetic control layers 32 on both sides to bypass the free layer 27 without entering the free layer 27. This results in a lower vertical biasing effect to the free layer 27 by the magnetic domain control layers 32, thereby failing to sufficiently control the magnetic domains of the free layer 27. Since it is difficult to reduce the widths of the regions R2, R3 to predetermined dimensions or less as mentioned above, a reduction in the dimensions of the TMR device 2 for a higher recording density would significantly narrow down the distance between the piled portions of the magnetic domain control layers 32 on both sides, thereby notably affecting the control for the magnetic domains of the free layer 27.

In contrast, the manufacturing method according to the first embodiment involves the ion beam etching with the incident angle θ set in a range of 60° to 90° as illustrated in FIG. 17 in the aforementioned etching process. This ion beam etching removes the products (the redeposits 72, 82, piled portion of insulating layer 34 and magnetic domain control layer 32, and piled portion of insulating layer 30) as well as the surface oxide film 50 present below the products and in other regions, as illustrated in FIG. 18. Therefore, the magnetic head illustrated in FIGS. 1 to 5, manufactured by the manufacturing method according to the first embodiment, is free from the limitation to a path for a current which flows into the magneto-resistive layer, and a reduction of the area which makes a good electrical connection. Thus, even with a reduction in the dimensions of the TMR device 2 for a higher recording density, it is possible to prevent the degradation in the MR characteristics and the degradation in the frequency characteristics associated with a higher resistance of the head. Also, since the piled portion of the magnetic domain control layers 32 are removed, a more biasing magnetic field enters from the magnetic domain control layers 32 into the free layer 27. Thus, even if the TMR device 2 is reduced in dimensions for a higher recording density, the vertical bias can be effectively applied to the free layer 27 to improve the vertical biasing effect to the free layer 27 by the magnetic domain control layer 32.

In the first comparative example, even the ion beam etching with the incident angle θ set at 0° as illustrated in FIG. 20 can remove the products as well as the surface oxide film 50 present below the products if it is performed for a sufficiently long duration. In this event, however, the low selectivity for the removal or reduction of the products causes a largely increased amount of etched upper metal layer 28. This would cause a problematic etching distribution, and an increased damage to the magneto-resistive layer (particularly, the tunnel barrier layer 26) by the ion beam to reduce the MR ratio (i.e., inhibiting the essential function of the magneto-resistive layer). In contrast, since the manufacturing method according to the first embodiment increases the selectivity for the removal or reduction of the products, the resulting device is free from the problems as mentioned above.

Next, an example of the modification of the first embodiment will be explained. As described above, in the first embodiment, as the etching process for etching the top surface side of the substrate 101 as illustrated in FIGS. 12A, 12B, 16, a normal ion beam etching is performed in which etching particles which do not substantially form clusters are used and the incident angle θ of the etching particles is set in the aforementioned range. However, the present invention may employ a dry etching using a gas cluster ion beam (GCIB) instead of the normal ion beam etching. Concretely, gas pressurized to about 1 to 5 kg, for example, is blown into a chamber which is depressurized to about $10^{-4}$ to $10^{-1}$ Torr to generate $10^3$ to $10^6$ gas clusters by adiabatic expansion, and the gas clusters are ionize. Then, the gas clusters are accelerated by a predetermined voltage applied to an acceleration electrode and impinged on the top surface side of the substrate 101. The incident angle of the gas cluster ion beam with respect to the top surface side of the substrate 101 can be set to almost the normal line direction of the top surface of the substrate 101, but the incident angle may be appropriately inclined from the normal line direction. The gas used for the gas cluster ion beam may be a simple gas or a mixed gas composed of one or more selected from a group consisting of He, Ne, Ar, Kr, Xe and H. The acceleration voltage may be set in a range of 10 to 20 keV, for example, and the total irradiation amount (total dose amount) may be set in a range of $10^{15}$ to $10^{17}$ ions/cm$^2$, for example.

When the gas cluster ion beam is used in this manner, after the gas clusters impinge on the substrate 101, atoms or molecules constituting the clusters are provided with momentum components in parallel with the surface of the substrate 101 due to the multiple collision effect of the atoms or molecules, whereby the products (the redeposits 72, 82, piled portion of insulating layer 34 and magnetic domain control layer 32, and the piled portion of insulating layer 30) are removed or reduced by a flattening action. Thus, the advantages same as those of the first embodiment can be attained in the case of using the glass cluster ion beam. It was confirmed by the experiment described later that the flattening action can be attained by using the gas cluster ion beam.

It is also possible to simultaneously remove the surface oxide film 50 present below the products and in other regions, or not to substantially remove the surface oxide film 50 by appropriately setting the condition for the dry etching using a gas cluster ion beam. In the latter case, for example, dry etching using etching particles which do not substantially form clusters with a main incident angle θ of the etching particles set at 0° may be performed for removing the surface oxide film 50 before or after the dry etching using the gas cluster ion beam.

Next, a magnetic head manufacturing method according to a second embodiment of the present invention will be described with reference to FIGS. 25 to 27.

Figure 25:
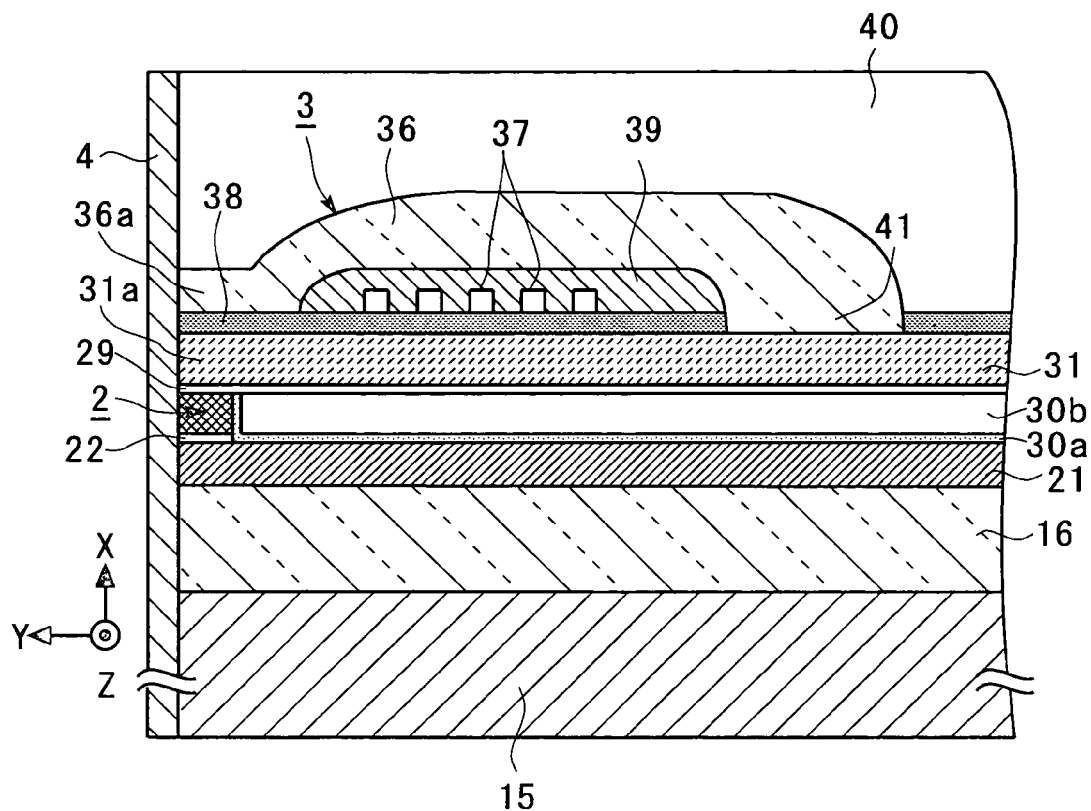
FIG. 25 is an enlarged cross-sectional view schematically illustrating a portion of a TMR device and an inductive magnetic transducing device in a magnetic head manufactured by a magnetic head manufacturing method according to a second embodiment of the present invention.

FIG. 25 is an enlarged cross-sectional view schematically illustrating a portion of a TMR device 2 and an inductive magnetic transducing device 3 in a magnetic head manufactured by the magnetic head manufacturing method according to the second embodiment of the present invention. FIG. 26 is a further enlarged view around the TMR device 2 in FIG. 25. FIGS. 25 and 26 correspond to FIGS. 2 and 4, respectively. FIG. 27 is a cross-sectional view schematically illustrating a step in the magnetic head manufacturing method according to the second embodiment of the present invention, and corresponds to FIG. 17. In FIGS. 25 to 27, elements identical or corresponding to those of FIGS. 1 to 5 and FIG. 17 are designated by the same reference numerals, and repeated description thereon is omitted.

Figure 26:
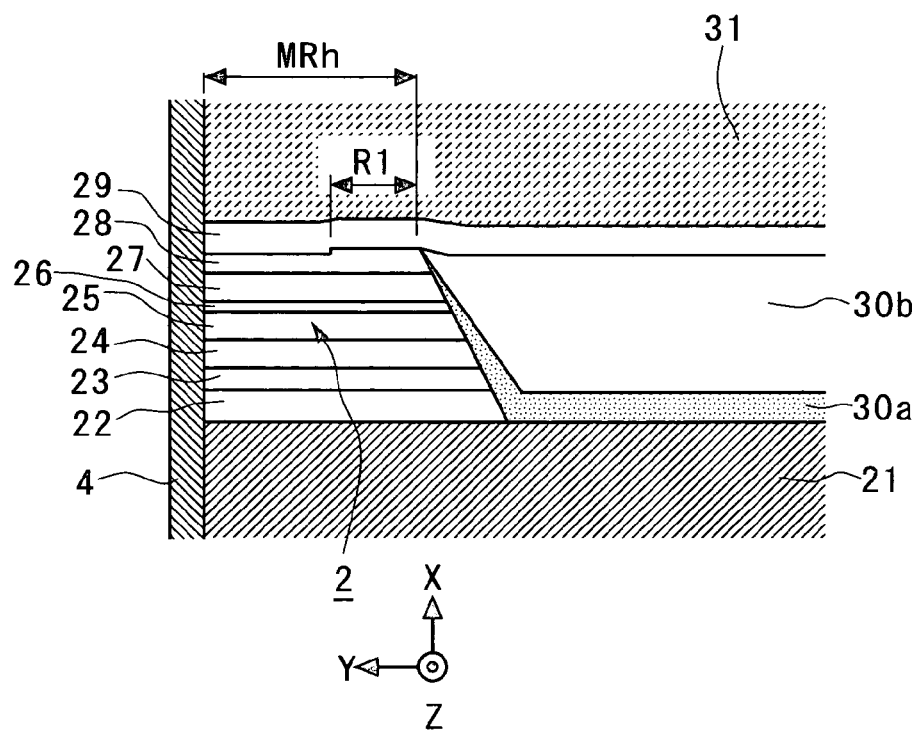
FIG. 26 is a further enlarged view around the TMR device in FIG. 25.
Figure 27:
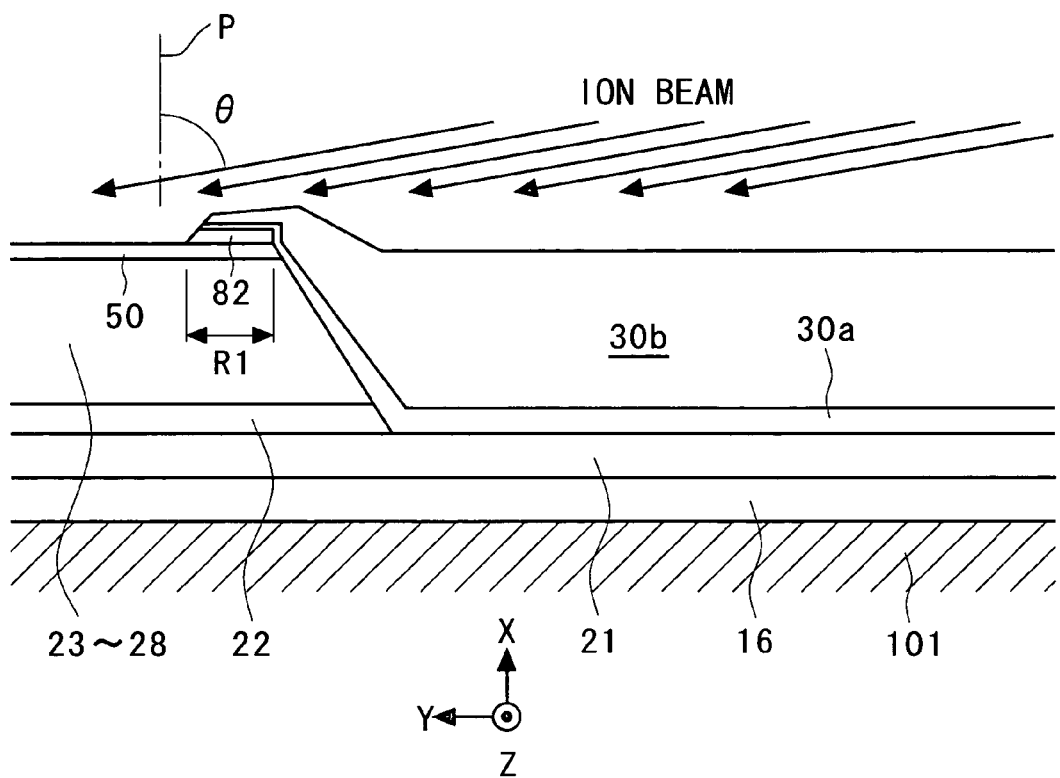
FIG. 27 is a diagram schematically illustrating a step in the magnetic head manufacturing method according to the second embodiment of the present invention.

The, magnetic head illustrated in FIGS. 25 and 26 differs from the magnetic head illustrated in FIGS. 1 to 5 only in that, as illustrated in FIGS. 25 and 27, a lower insulating layer 30a and a layer 30b laminated thereon are provided at the position of the insulating layer 30 in FIGS. 2 and 4. $Al_2O_3$, $SiO_2$ or the like is used as a material for the insulating layer 30a, for example. Also, a material such as metal with a higher degree of ion beam damage reducing effect than $Al_2O_3$ and $SiO_2$ is used as a material of the layer 30b.

Now, description will be made on how to determine whether a material has a high or low ion beam damage reduction effect. Two layers are formed of two materials in the same thickness, respectively. Each of the layers is formed on one side with a layer of interest (for example, a tunnel barrier layer) which can be damaged by ion beams to cause a problem. When the two layers made of the two materials are irradiated with an ion beam having the same energy directly or through the same predetermined layer from the side opposite to the layer of interest, the material on which the layer of interest remains undamaged or which is less susceptible to degradation of characteristics is said to have a higher ion beam damage reduction effect than the other material. Generally, it is thought that a material including an element having larger atomic weight has a higher ion beam damage reduction effect. It is thought that the ion beam damage occurs in the following manner: an ion beam such as Ar passes through the material and directly accesses the layer of interest to destroy the layer of interest, or the energy of the ion beam propagates through a crystal lattice in the form of lattice vibration to destroy the layer of interest, or the atoms in crystals within the material transmit the energy of the ion beams in a pileup fashion to destroy the layer of interest.

The magnetic head manufacturing method according to the second embodiment basically differs from the magnetic head manufacturing method according to the first embodiment only in that the insulating layer 30a and the layer 30b are sequentially formed instead of forming the insulating layer 30 in the first embodiment.

FIG. 27 illustrates a step of the ion beam etching (the same step as the step of the ion beam etching shown in FIG. 17 in the first embodiment) with the incident angle θ set in a rage of 60° to 90°. In the second embodiment, since the insulating layer 30a and the layer 30b are formed instead of the insulating layer 30, a portion of the insulating layer 30a and the layer 30b is piled on the redeposits 82 in a region R1 as shown in FIG. 27. In the second embodiment, the layer 30b made of a material with a higher degree of the ion beam damage reducing effect than the insulating layer 30 intervenes in a path of an ion beam directed to the end surface of −Y-side of a tunnel barrier layer 26. Thus, according to the second embodiment, preferably, a degree of damage of the tunnel barrier layer 26 due to the ion beam directed to the end surface of the −Y-side of the tunnel barrier layer 26 is further reduced.

As to other advantages, the second embodiment can attain the same advantages as the first embodiment. Of course, the modification similar to that of the first embodiment can be applied to the second embodiment.

Next, a magnetic head manufacturing method according to a third embodiment of the present invention will be described with reference to FIGS. 28 to 30.

Figure 28:
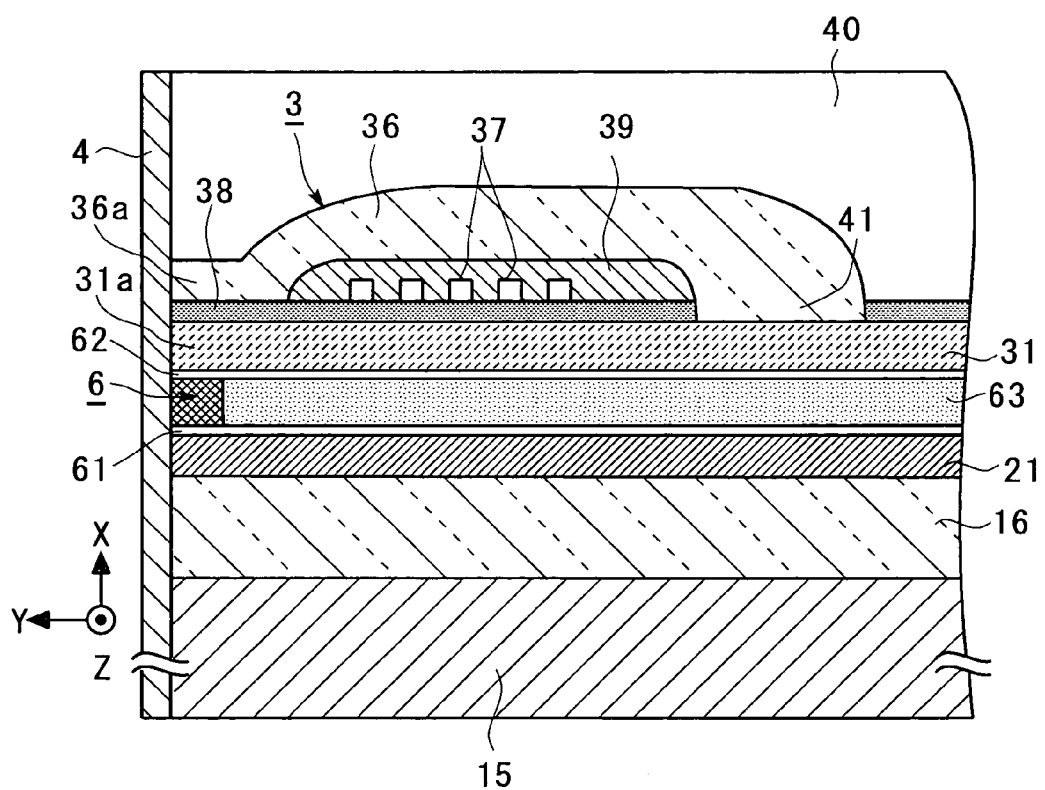
FIG. 28 is an enlarged cross-sectional view schematically illustrating a portion of a GMR device and an inductive magnetic transducing device in a magnetic head manufactured by the magnetic head manufacturing method according to a third embodiment of the present invention.

FIG. 28 is an enlarged cross-sectional view schematically illustrating a portion of a GMR device 6 and an inductive magnetic transducing device 3 in a magnetic head manufactured by the magnetic head manufacturing method according to the third embodiment of the present invention. FIG. 29 is a further enlarged view around the GMR device 6 in FIG. 28. FIG. 30 is a general sectional view taken along a line B–B' indicated by arrows in FIG. 29. FIGS. 28 to 30 correspond to FIGS. 2, 4 and 5, respectively. In FIGS. 28 to 30, elements identical or corresponding to those of FIGS. 1 to 5 are designated by the same reference numerals, and repeated description thereon is omitted.

Figure 29:
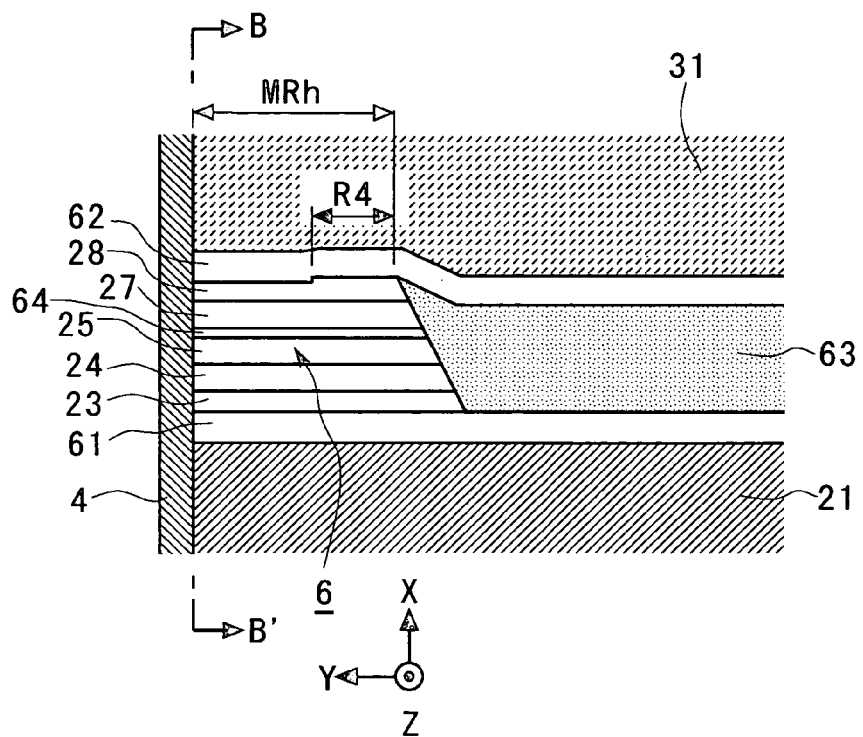
FIG. 29 is a further enlarged view around the GMR device in FIG. 28.
Figure 30:
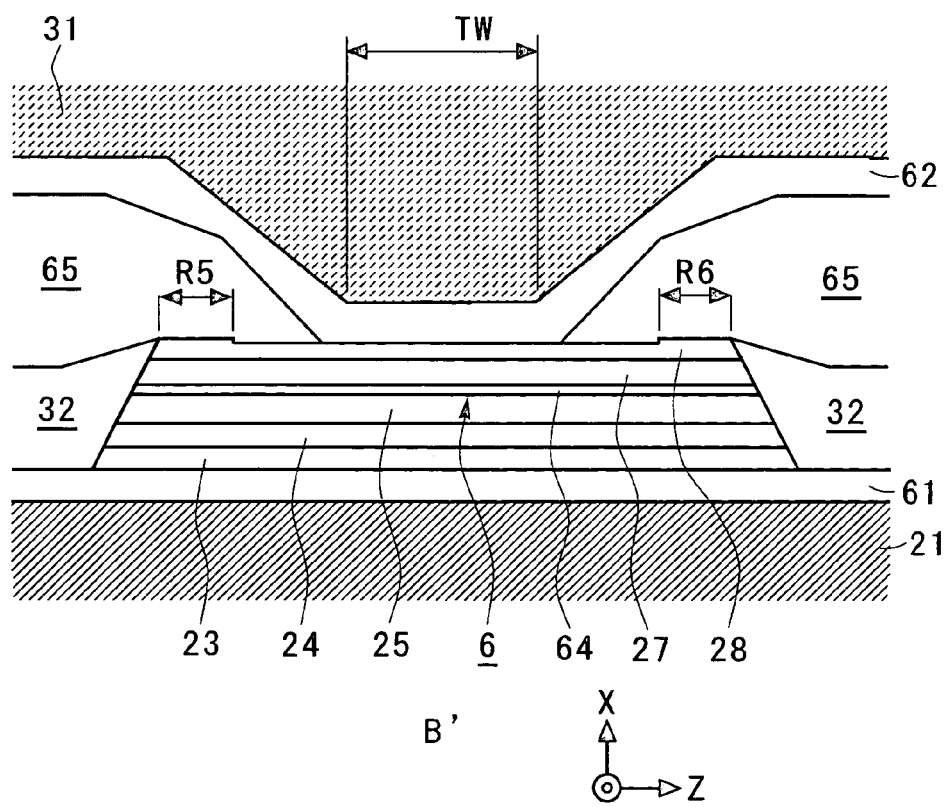
FIG. 30 is a general sectional view taken along a line B–B' indicated by arrows in FIG. 29.

The magnetic head illustrated in FIGS. 28 to 30 is an example of a magnetic head having the LOL structure. The magnetic head illustrated in FIGS. 28 to 30 differs from the magnetic head illustrated in FIGS. 1 to 5 in the structure between the layers 21 and 31 and the function of the layers 21 and 31 due to the structural difference. Each of the layers 21 and 31 serves as a magnetic shield and an electrode in the magnetic head illustrated in FIGS. 1 to 5, while each of the layers 21 and 31 is used only as a magnetic shield but does not act as an electrode in the magnetic head illustrated in FIGS. 28 to 30. Thus, in the magnetic head illustrated in FIGS. 28 to 30, the layers 21 and 31 are referred to as a lower magnetic shield layer and an upper magnetic shield layer, respectively.

In the magnetic head illustrated in FIGS. 28 to 30, a lower shield gap layer 61 and an upper shield gap layer 62 are formed between the lower magnetic shield layer 21 and the upper magnetic shield layer 31. The GMR device 6 provided as a magneto-resistive device instead of the TMR device 2 in the magnetic head illustrated in FIGS. 1 to 5 is formed between the shield gap layers 61 and 62. In FIGS. 28 and 29, a reference numeral 63 denotes a shield gap layer formed between the shield gap layers 61 and 62. Each of the shield gap layers 61, 62 and 63 is an insulating layer formed by a material such as $Al_2O_3$, $SiO_2$ or the like.

The GMR device 6 differs from the TMR device 2 illustrated in FIGS. 1 to 5 in that a non-magnetic metal layer 64 made of Cu, Au, Ag or the like is formed instead of the tunnel barrier layer 26. The pin layer 24, pinned layer 25, non-magnetic metal layer 64 and free layer 27 constitute a magneto-resistive layer. The underlying layer 22 formed in the magnetic head illustrated in FIGS. 1 to 5 is not formed in the magnetic head illustrated in FIGS. 28 to 30.

The magnetic domain control layers 32 is formed on the lower shield gap layer 61 at the both sides in the Z-axis direction of the magneto-resistive layer. The insulating layer 34 formed in the magnetic head illustrated in FIGS. 1 to 5 is not formed in the magnetic head illustrated in FIGS. 28 to 30. A pair of lead layers (electrode layers) 65 are formed on each of the upper metal layer 28 and the magnetic domain control layer 32 so that they have an overlay which is portions overlapping with the both end portions of the magneto-resistive layer through the upper metal layer 28, respectively. The lead layer 65 is formed by a material such as Au, AuCu, AuNi, AuSi, AlTi or the like.

In FIG. 29, MRh indicates an MR height defined by the GMR device 6. In FIG. 30, TW indicates the width of a track defined by the GMR device 6.

Next, description will be made on an example of a magnetic head manufacturing method shown in FIGS. 28 to 30 as a magnetic head manufacturing method according to the third embodiment of the present invention.

First, a wafer process is performed. Specifically, a wafer 101 made of $Al_2O_3$—TiC, SiC or the like is provided for making a base 15. Using the thin film forming technology and the like, the aforementioned layers are formed in a large number of magnetic head forming regions in matrix on the wafer 101 to provide the aforementioned structure.

Figure 42:
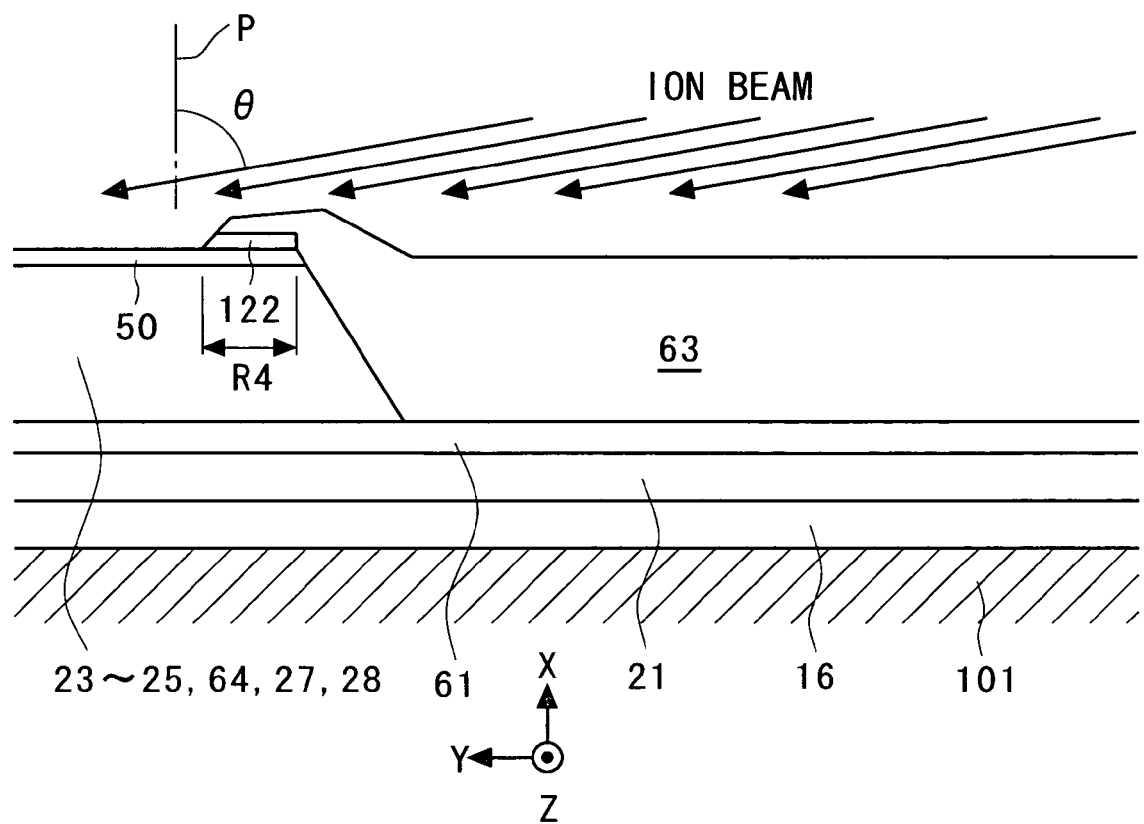
FIG. 42 is a diagram schematically illustrating a further step in the magnetic head manufacturing method according to the third embodiment of the present invention.
Figure 43:
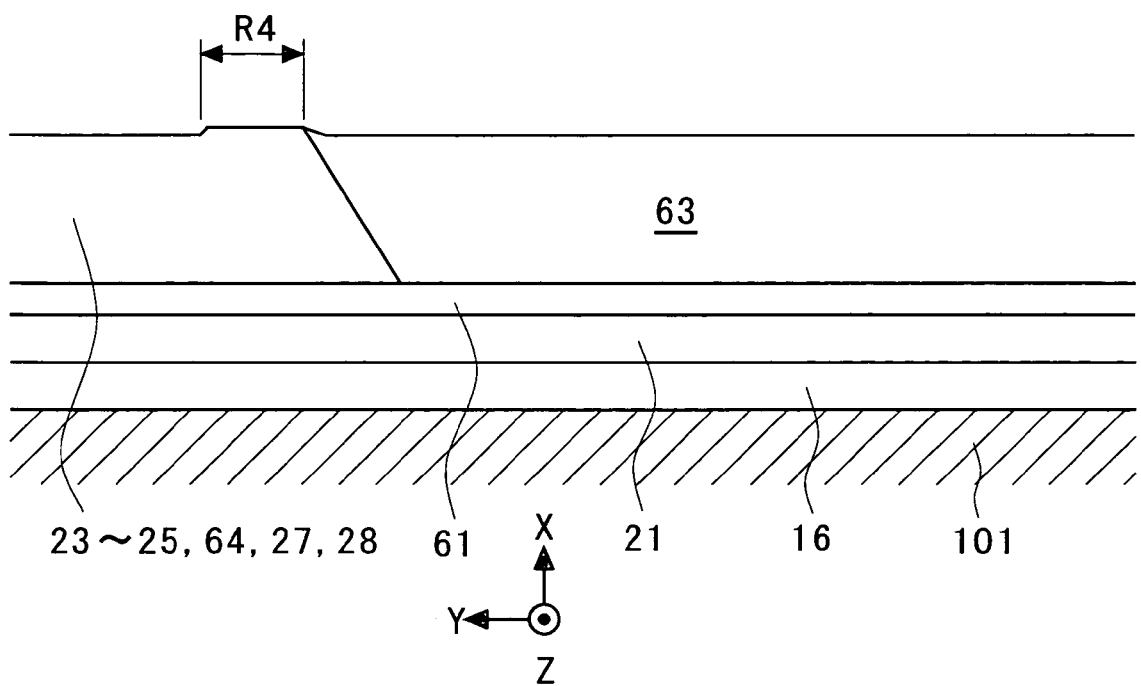
FIG. 43 is a diagram schematically illustrating a further step in the magnetic head manufacturing method according to the third embodiment of the present invention.

The outline of the wafer process will be described with reference to FIGS. 31 to 45. FIGS. 31 to 45 are diagrams schematically illustrating respective steps which make up the wafer process, wherein FIGS. 31A, 32A, 37A, 44A and 45A are general plan views, respectively. In FIG. 32A, TW indicates the width of a track defined by the GMR device 6. FIG. 31B is a general cross-sectional view taken along a line H–J in FIG. 31A; FIG. 32B is a general cross-sectional view taken along a line H–J in FIG. 32A; FIG. 37B is a general cross-sectional view taken along a line L–K in FIG. 37A; FIG. 44B is a general cross-sectional view taken along a line H–J in FIG. 44A; and FIG. 45B is a general cross-sectional view taken along a line H–J in FIG. 45A. FIGS. 33 to 36 are enlarged cross-sectional diagrams schematically illustrating in detail respective steps from a state shown in FIGS. 31A and 31B to a state shown in FIGS. 32A and 32B. FIGS. 38 to 41 are enlarged cross-sectional diagrams schematically illustrating in detail respective steps from a state shown in FIGS. 32A and 32B to a state shown in FIGS. 37A and 37B. FIGS. 42 and 43 are enlarged cross-sectional diagrams schematically illustrating steps after the states shown in FIGS. 37A and 37B and FIG. 41, respectively.

Figure 31A:
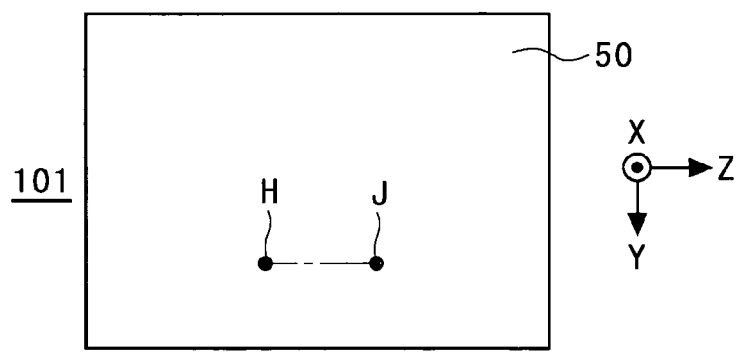
FIGS. 31A and 31B are diagrams schematically illustrating a step in the magnetic head manufacturing method according to the third embodiment of the present invention.
Figure 31B:
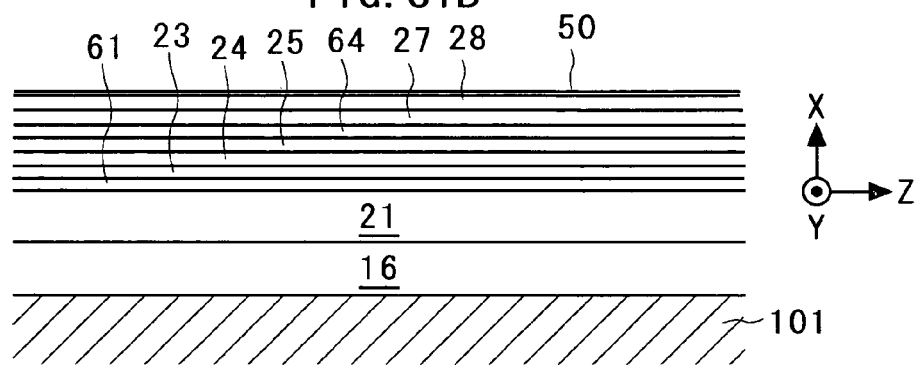
Figure 32A:
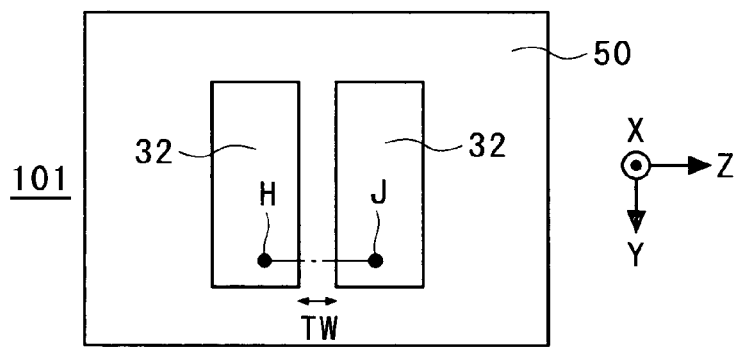
FIGS. 32A and 32B are diagrams schematically illustrating a further step in the magnetic head manufacturing method according to the third embodiment of the present invention.
Figure 32B:
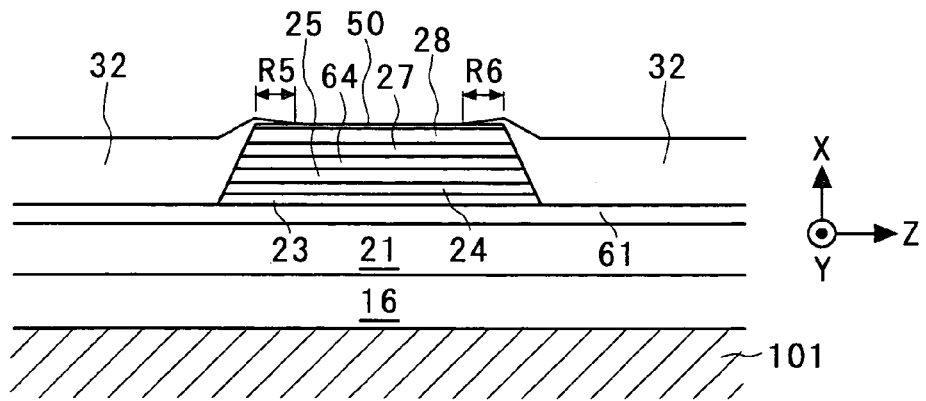

First, in the wafer process, the underlying layer 16, lower magnetic shield layer 21, lower shield gap layer 61, lower metal layer 23, pin layer 24, pinned layer 25, non-magnetic metal layer 64, free layer 27, and upper metal layer 28 are sequentially laminated on the wafer 101 (FIGS. 31A and 31B). In this event, the lower magnetic shield layer 21 is formed, for example, by a plating method, while the other layers are formed, for example, by a sputtering method. Subsequently, the substrate in this state is once left in the atmosphere. In this event, the top surface of the magnetoresistive layer (the top surface of the free layer 27 in the third embodiment) is protected by the upper metal layer 28, so that it is not oxidized. However, an oxide film 50 is formed on the top surface of the upper metal layer 28 (FIGS. 31A and 31B).

Next, the lower metal layer 23, pin layer 24, pinned layer 25, non-magnetic metal layer 64, free layer 27, upper metal layer 28, and the oxide film 50 are partially removed by ion milling for patterning, conducted as first dry etching. Next, the magnetic domain control layer 32 is formed in the removed portions by a lift-off method (FIGS. 32A and 32B).

Figure 33:
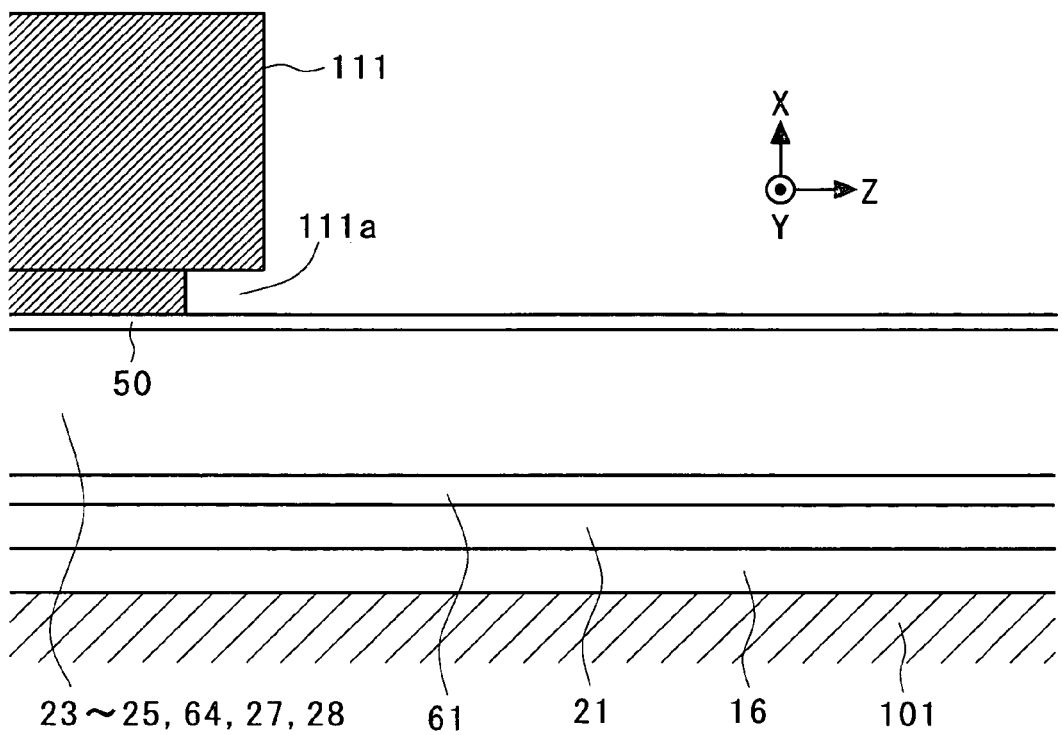
FIG. 33 is a diagram schematically illustrating a further step in the magnetic head manufacturing method according to the third embodiment of the present invention.

This process will be described in greater detail with reference to FIGS. 33 to 36. First, on the substrate as illustrated in FIGS. 32A and 32B (on the surface oxide film 50 in the third embodiment), a resist patter 111 for first lift-off is formed (FIG. 33).

Figure 34:
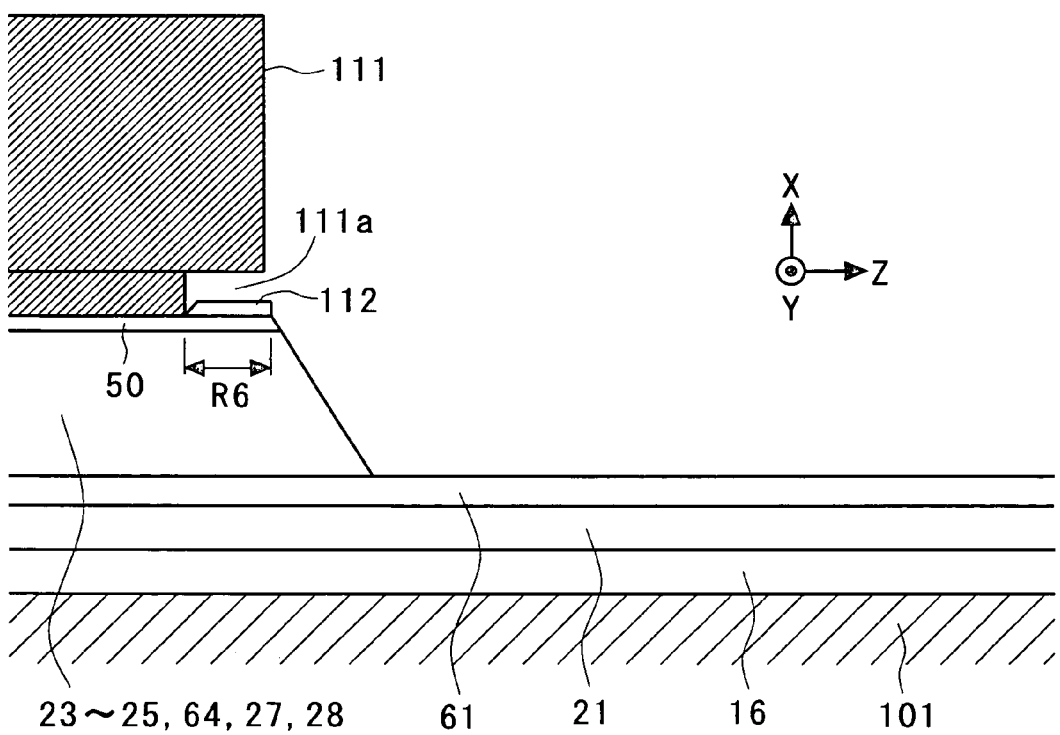
FIG. 34 is a diagram schematically illustrating a further step in the magnetic head manufacturing method according to the third embodiment of the present invention.

Next, with the resist pattern 111 for first lift-off used as a mask, the layers 23 to 25, 64, 27, 28 and 50 are patterned by ion milling (or any other dry etching), conducted as the first dry etching (FIG. 34). This patterning defines ends of the GMR device 6 on the both sides in a track width direction. During the patterning, redeposits 112 resulting from the ion milling of the layers 23 to 25, 64, 27, 28 and 50 are formed in a region on the surface oxide film 50 corresponding to an undercut 111a of the resist pattern 111 for first lift-off, as illustrated in FIG. 34. In FIG. 34, a region R6 represents a region on the +Z-side (one side in the track width direction) of the overall region corresponding to the undercut 111a. This aspect is also applied to FIGS. 30, 32B, 35, 36, 44B and 45B. In FIGS. 30, 32B, 44B and 45B, a region R5 represents a region on the −Z-side (the other side in the track width direction) of the overall region corresponding to the undercut 111a.

Figure 35:
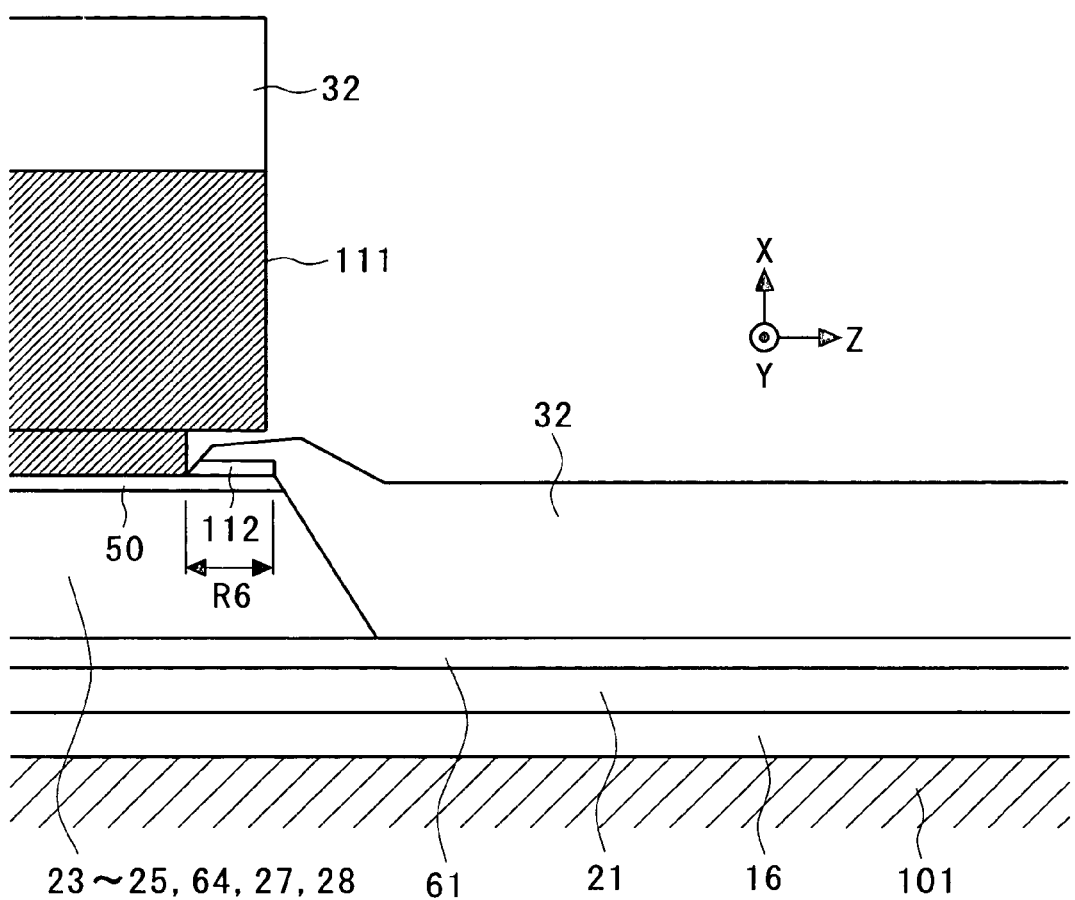
FIG. 35 is a diagram schematically illustrating a further step in the magnetic head manufacturing method according to the third embodiment of the present invention.

Next, with the presence of the resist pattern 111 for first lift-off on the surface oxide film 50, the magnetic domain control layers 32 is deposited on the substrate 101 by sputtering or the like (FIG. 35). In this event, a portion of the magnetic domain control magnetic domain control layer 32 is piled in a region on the surface oxide film 50 corresponding to the undercut 111a (i.e., on redeposits 112), as illustrated in FIG. 35. This portion is hereinafter referred to as a "piled portion".

As described above, products resulting from the redeposits 112 and the piled portion of the magnetic domain control layer 32 are formed in the region on the surface oxide film 50 corresponding to the undercut 111a of the resist pattern 111 for first lift-off.

Figure 36:
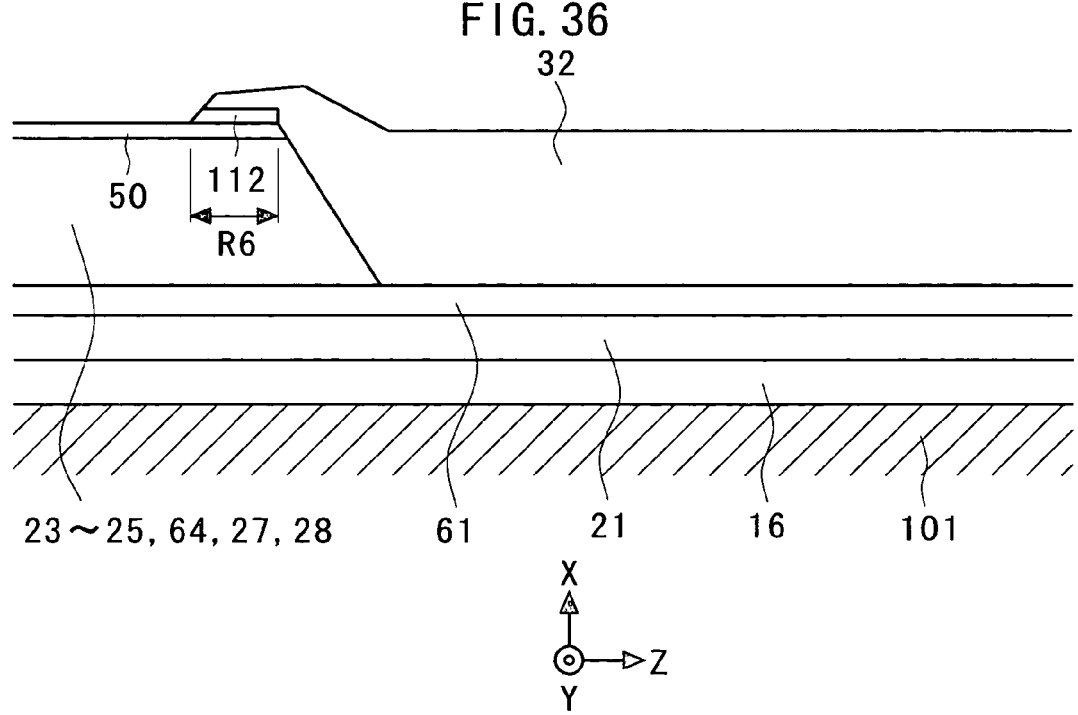
FIG. 36 is a diagram schematically illustrating a further step in the magnetic head manufacturing method according to the third embodiment of the present invention.

Subsequently, the resist pattern 111 for first lift-off is removed to remove a portion of the magnetic domain control layer 32 on the resist pattern 111 for first lift-off (FIG. 36). FIG. 36 represents the same state as that in FIGS. 32A and 32B.

Figure 37A:
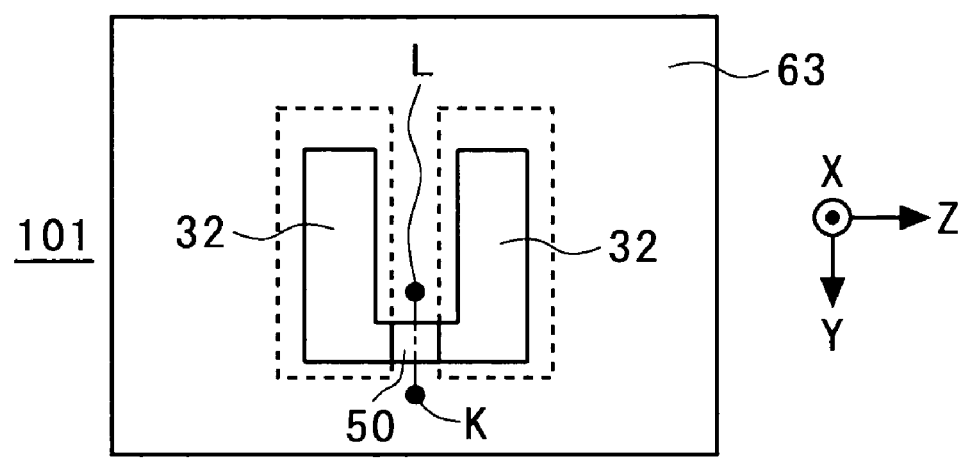
FIGS. 37A and 37B are diagrams schematically illustrating a further step in the magnetic head manufacturing method according to the third embodiment of the present invention.
Figure 37B:
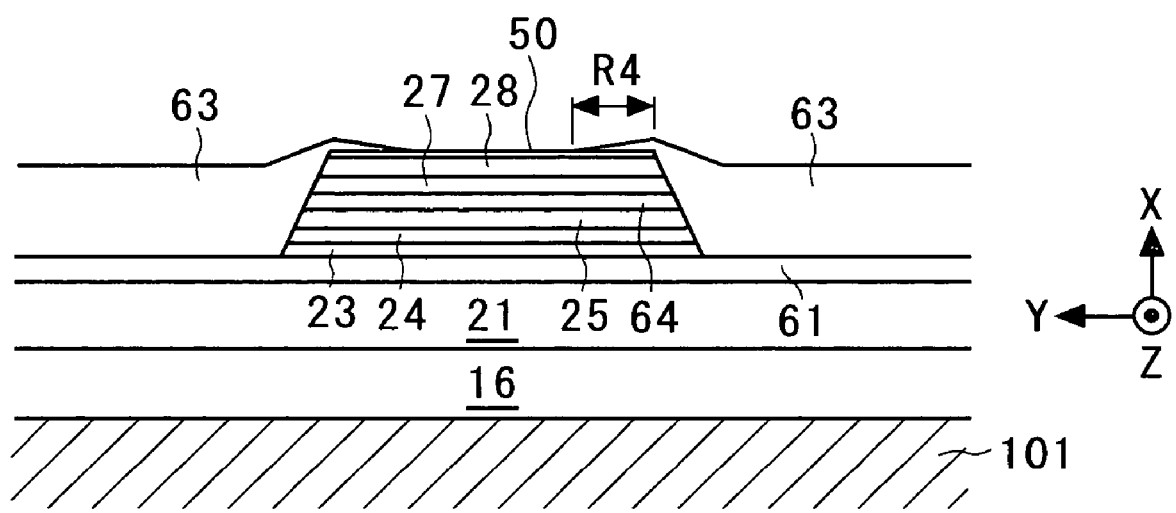

Next, the lower metal layer 23, pin layer 24, pinned layer 25, non-magnetic metal layer 64, free layer 27, upper metal layer 28, surface oxide film 50 and magnetic domain control layers 32 are partially removed for patterning by ion milling, conducted as second dry etching, while leaving a U-shaped portion including a strip portion which has a necessary width (width in the Y-axis direction) with respect to the height direction of the GMR device 6 and extends in the Z-axis direction by a predetermined distance. Subsequently, the shield gap layer (insulating layer) 63 is formed in the removed portions by a lift-off method (FIGS. 37A and 37B).

Figure 38:
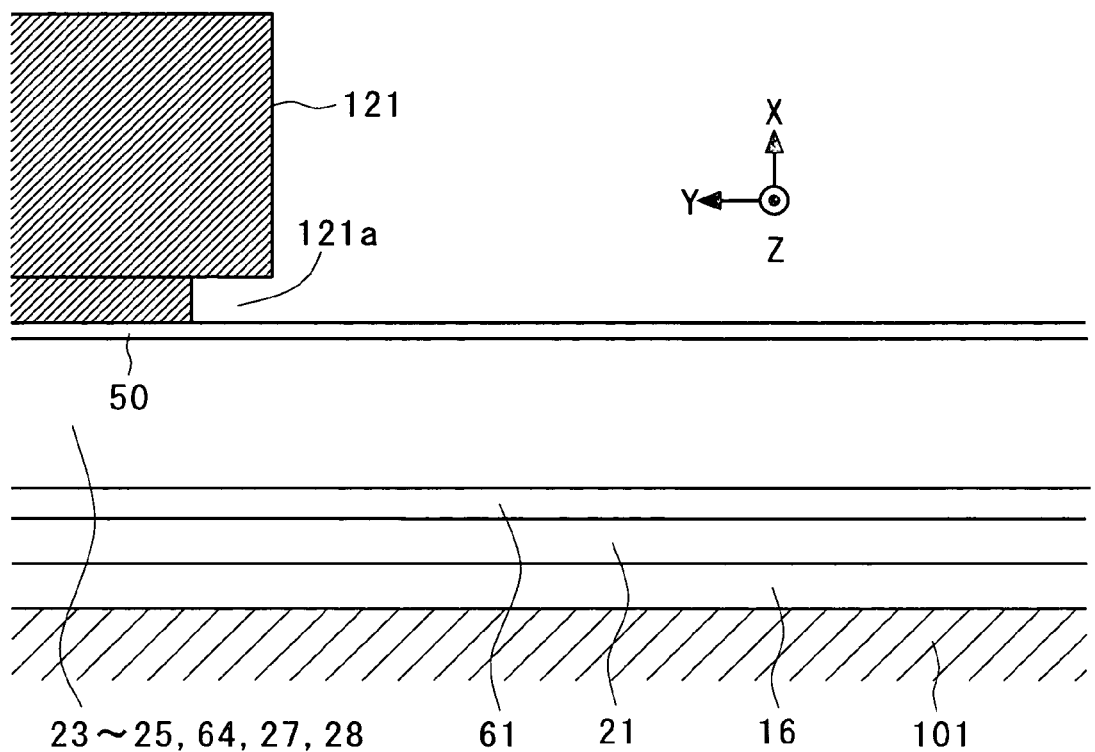
FIG. 38 is a diagram schematically illustrating a further step in the magnetic head manufacturing method according to the third embodiment of the present invention.

This process will be described in greater detail with reference to FIGS. 38 to 41. First, on the substrate as illustrated in FIGS. 32A, 32B and 36, a resist pattern 121 for second lift-off is formed (FIG. 38).

Figure 39:
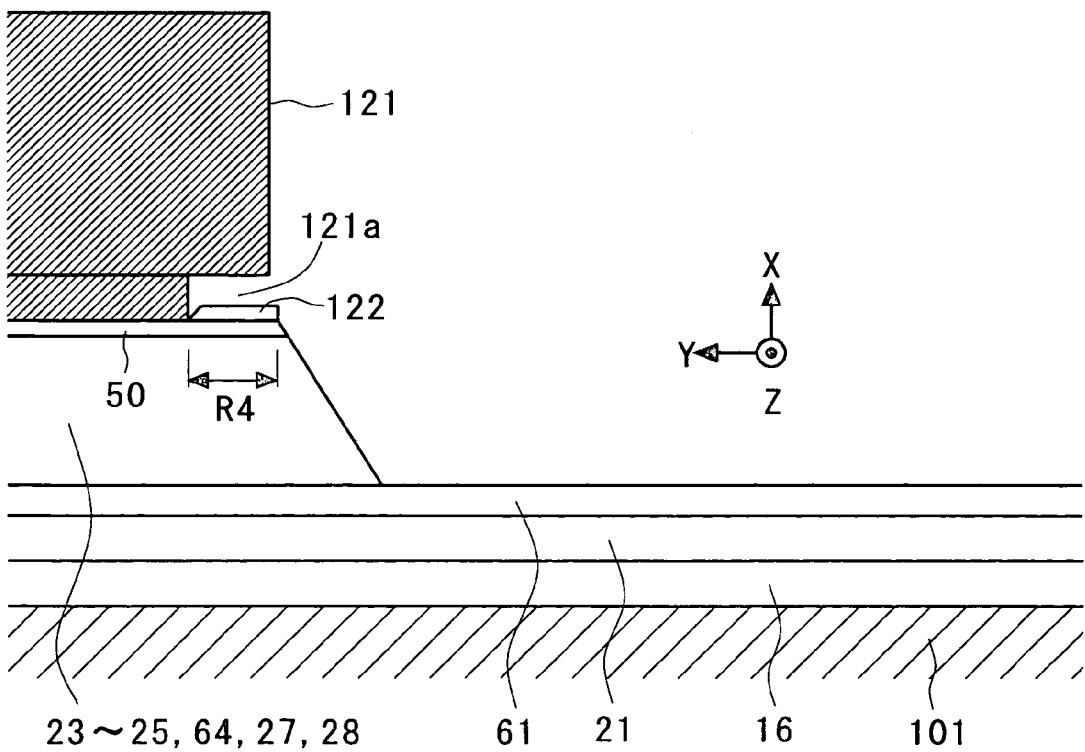
FIG. 39 is a diagram schematically illustrating a further step in the magnetic head manufacturing method according to the third embodiment of the present invention.

Next, with the resist pattern 121 for second lift-off used as a mask, the layers 23 to 25, 64, 27, 28, 50 and 32 are patterned by ion milling (or any other dry etching), conducted as second dry etching (FIG. 39). This patterning defines one end of the GMR device 6 in the height direction (the end on the −Y-side, i.e., the end opposite to the ABS in the third embodiment). During the patterning, redeposits 122 resulting from the ion milling of the layers 23 to 25, 64, 27, 28, 50 and 32 are formed in a region on the surface oxide film 50 and the like corresponding to an undercut 121a of the resist pattern 121 for second lift-off, as illustrated in FIG. 39. In FIG. 39, a region R4 represents a region on the −Y-side (side opposite to the ABS) of the overall region corresponding to the undercut 121a. This aspect is also applied to FIGS. 29, 37B and 40 to 43.

Figure 40:
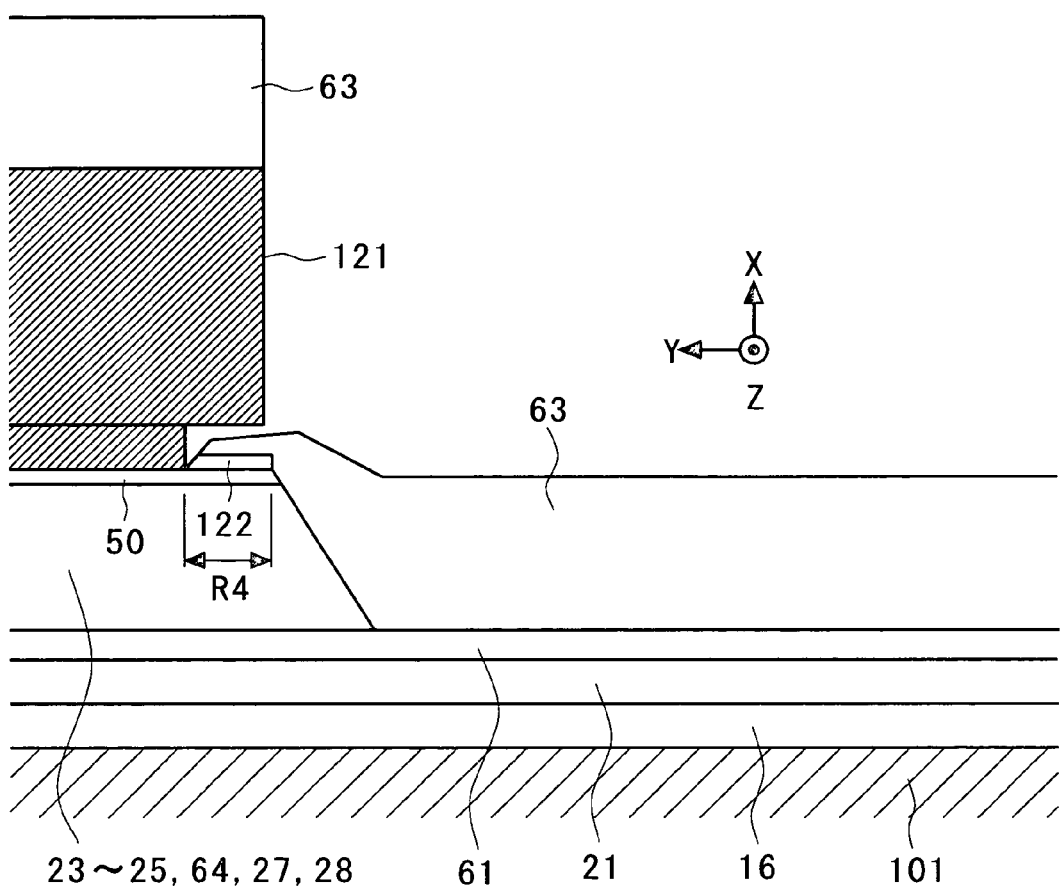
FIG. 40 is a diagram schematically illustrating a further step in the magnetic head manufacturing method according to the third embodiment of the present invention.

Next, with the presence of the resist pattern 121 for second lift-off on the substrate 101, the shield gap layer (insulating layer) 63 is deposited on the substrate 101 by sputtering or the like (FIG. 40). In this event, a portion of the shield gap layer 63 is piled in a region on the surface oxide film 50 and the like corresponding to the undercut 121a (i.e., on redeposits 122), as illustrated in FIG. 40. This portion is hereinafter referred to as a "piled portion".

As described above, products resulting from the redeposits 122 and the piled portion of the shield gap layer 63 are formed in the region on the surface oxide film 50 and the like corresponding to the undercut 121a of the resist pattern 121 for second lift-off.

Figure 41:
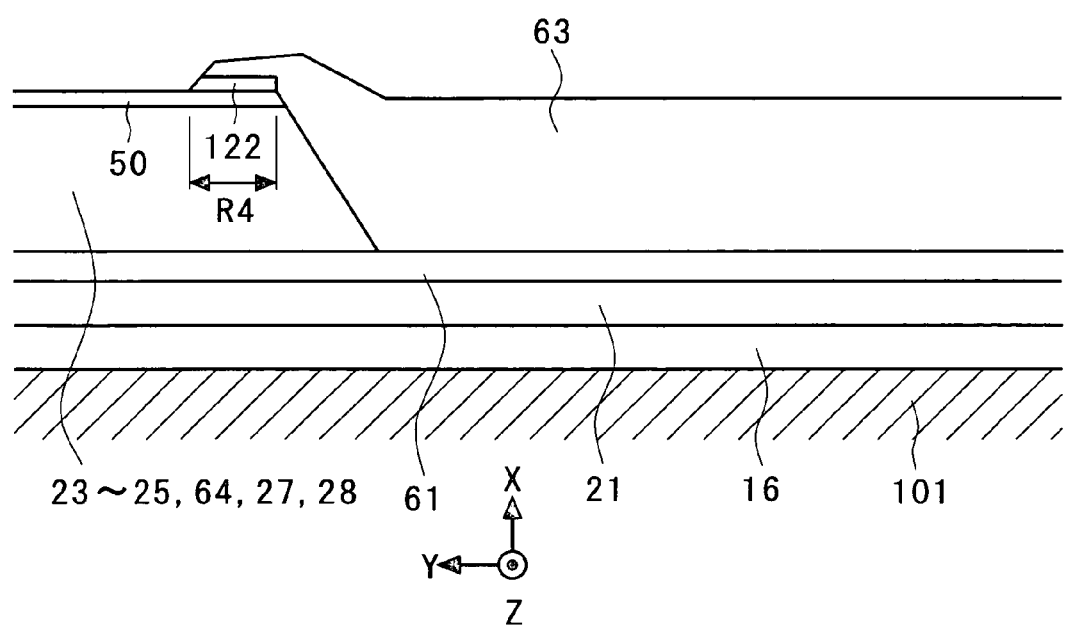
FIG. 41 is a diagram schematically illustrating a further step in the magnetic head manufacturing method according to the third embodiment of the present invention.

Subsequently, the resist pattern 121 for second lift-off is removed to remove a portion of the shield gap layer 63 on the resist pattern 121 for second lift-off (FIG. 41). FIG. 41 represents the same state as that in FIGS. 37A and 37B.

Next, an etching process is performed for etching the top surface side of the substrate 101 as illustrated in FIGS. 37A, 37B and 41. Like the dry etching shown in FIG. 17 in the first embodiment, the etching process involves dry etching using etching particles which do not substantially form clusters, with a main incident angle $\theta$ of the etching particles to the top surface side of the substrate 101 being set in a range of 60° to 90° relative to the direction of the normal line P on the top surface of the substrate 101 as illustrated in FIG. 42. The matters described in connection with FIG. 17 in the first embodiment are basically applied to this dry etching performed in the third embodiment.

In the third embodiment, the ion beam etching with the incident angle $\theta$ set in a range of 60° to 90° removes the products (redeposits 112, 122, piled portion of magnetic domain control layer 32, and piled portion of shield gap layer 63) as well as the surface oxide film 50 present below the products and in other regions, as illustrated in FIG. 43. In this event, the incident angle $\theta$ set in a range of 60° to 90° as mentioned above results in higher selectivity for the removal or reduction of the products. It should be noted that since FIG. 43 illustrates a cross-sectional view taken along a plane parallel with the XY-plane, it cannot be seen from FIG. 43 how the device appears after the removal of the products (the redeposits 112 and piled portion of magnetic domain control layer 32) on the regions R5, R6. However, the appearance after the removal can be seen in FIGS. 44A and 44B and the like, later described.

Figure 44A:
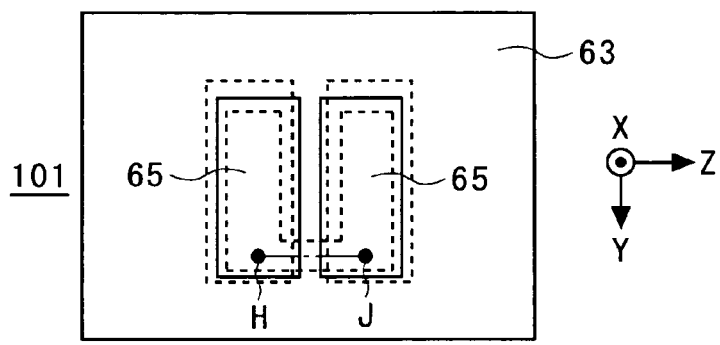
FIGS. 44A and 44B are diagrams schematically illustrating a further step in the magnetic head manufacturing method according to the third embodiment of the present invention.
Figure 44B:
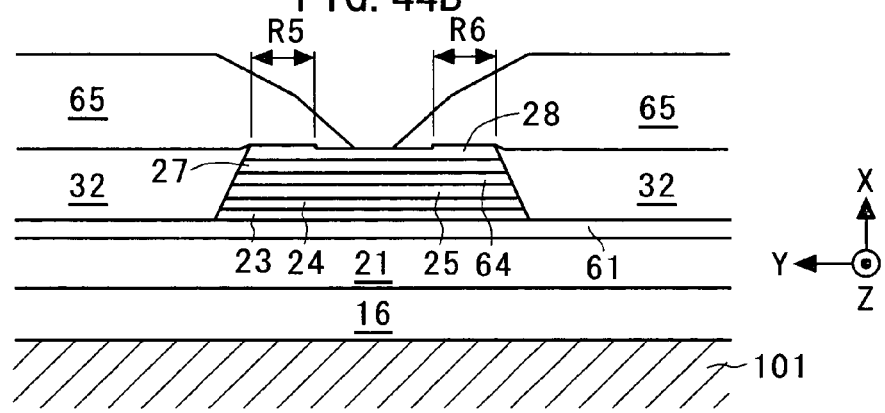
Figure 45A:
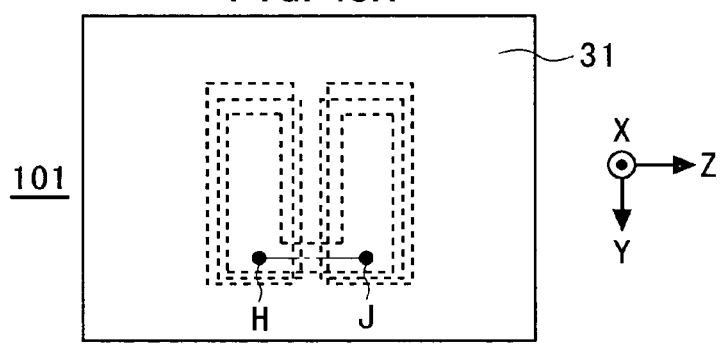
FIGS. 45A and 45B are diagrams schematically illustrating a further step in the magnetic head manufacturing method according to the third embodiment of the present invention.
Figure 45B:
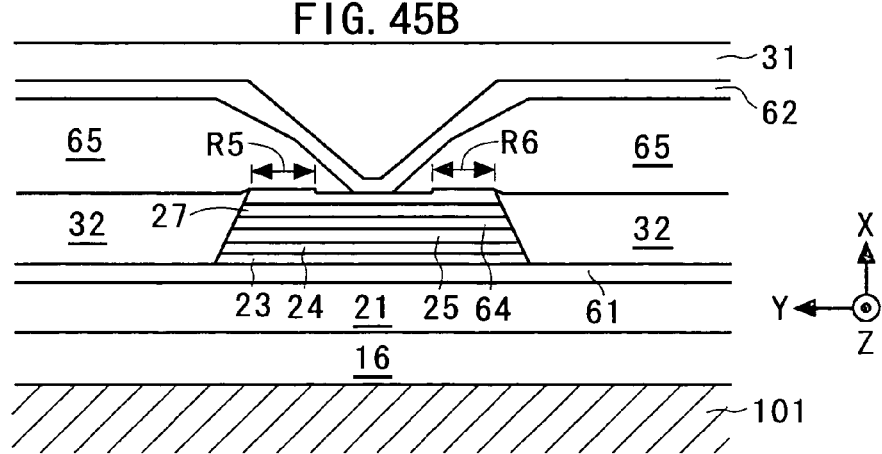

Thereafter, the lead layer 65 is formed on the substrate 101 as illustrated in FIG. 43 (FIGS. 44A and 44B). Subsequently, an upper shield gap layer 62 is formed by a sputtering method or the like, and the upper magnetic shield layer 31 is formed by a plating method or the like (FIGS. 45A and 45B).

Finally, the gap layer 38, coil layer 37, insulating layer 39, upper magnetic layer 36, and protection layer 40 are formed, and the electrodes 5a–5d and the like are formed. By now, the wafer process is completed.

Next, magnetic heads are completed through a known process for the wafer which has undergone the wafer process in the same manner as the first embodiment.

Figure 46:
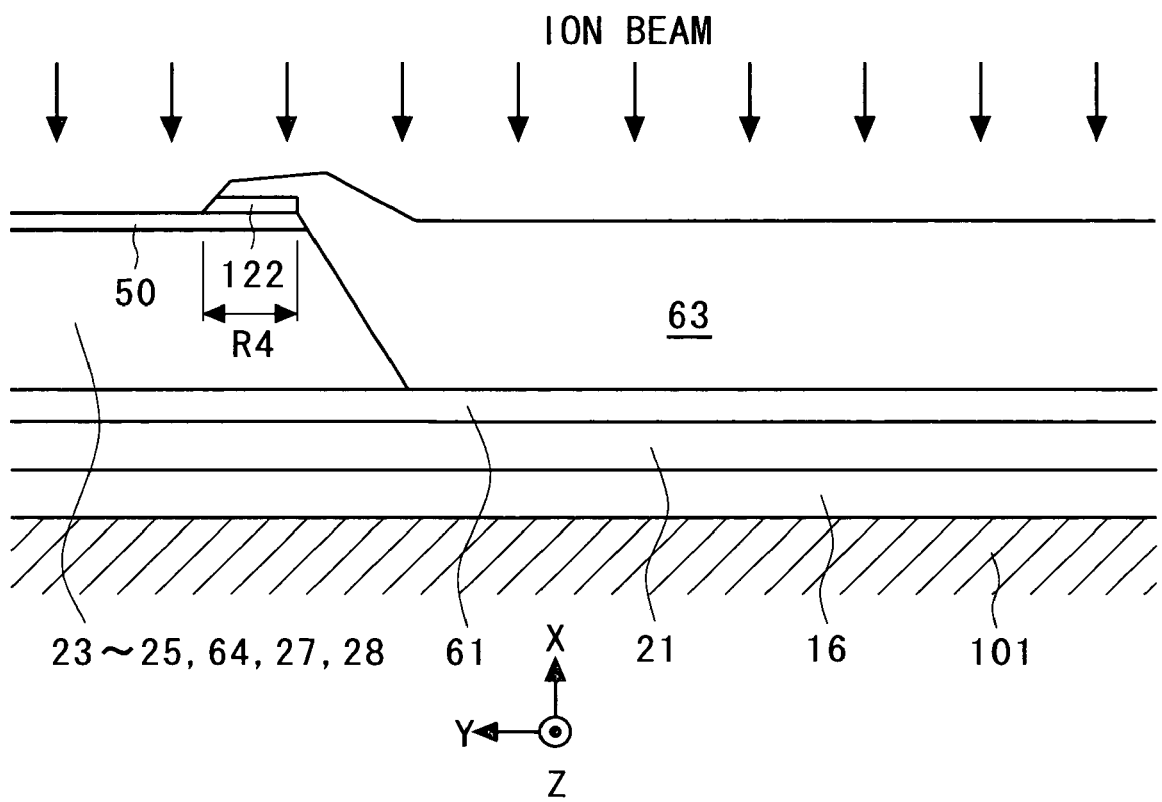
FIG. 46 is a diagram schematically illustrating a step in a magnetic head manufacturing method according to a second comparative example.
Figure 47:
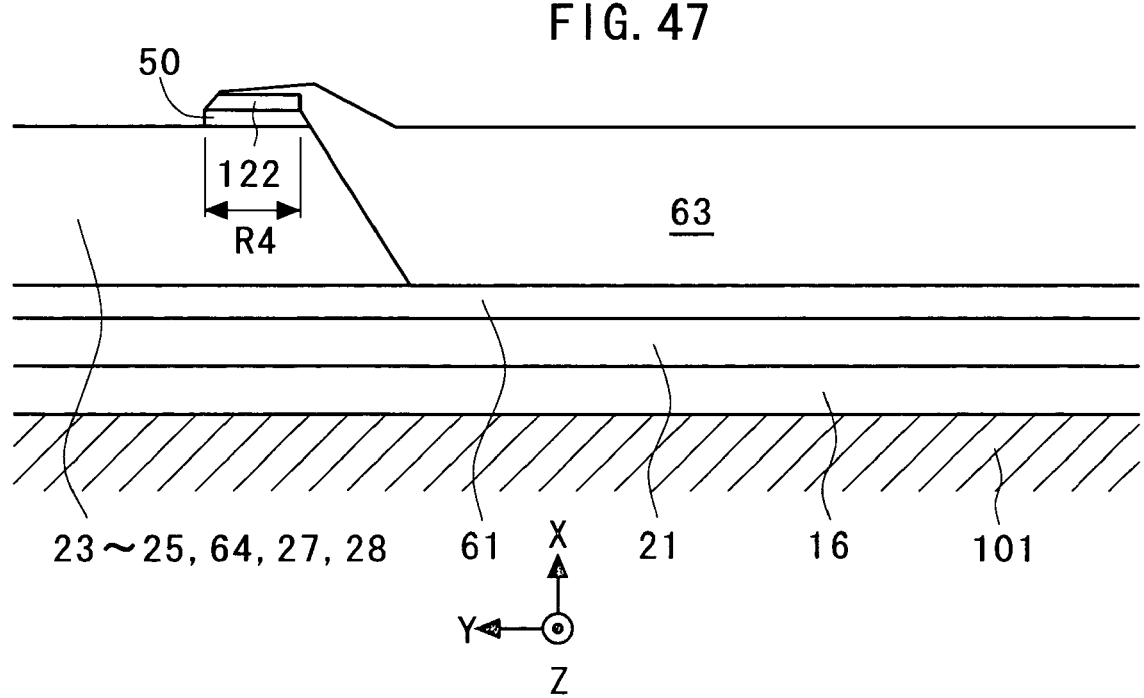
FIG. 47 is a diagram schematically illustrating a further step in the magnetic head manufacturing method according to the second comparative example.
Figure 48A:
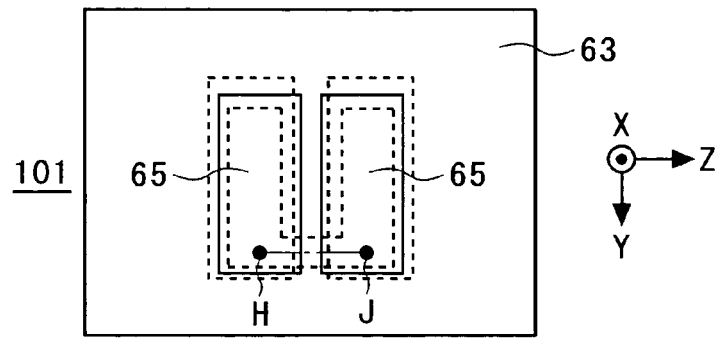
FIGS. 48A and 48B are diagrams schematically illustrating a further step in the magnetic head manufacturing method according to the second comparative example.
Figure 48B:
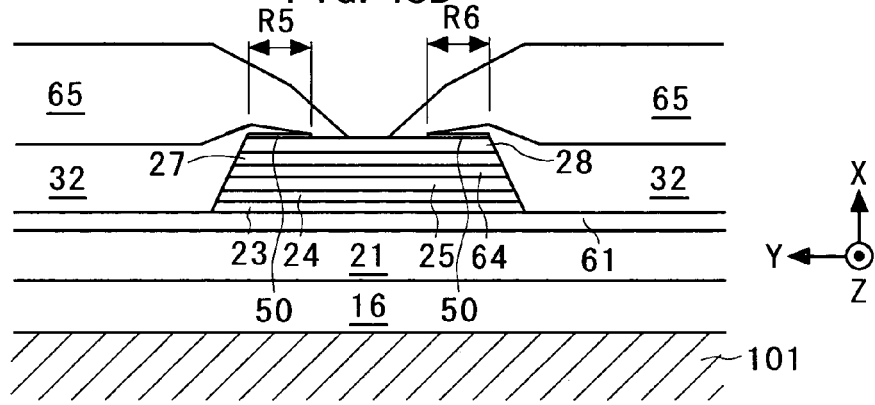
Figure 49A:
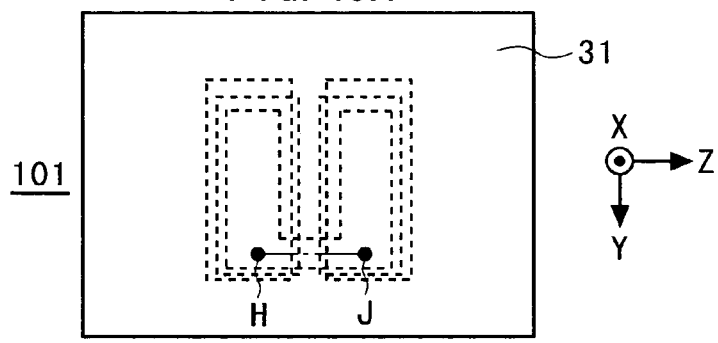
FIGS. 49A and 49B are diagrams schematically illustrating a further step in the magnetic head manufacturing method according to the second comparative example.
Figure 49B:
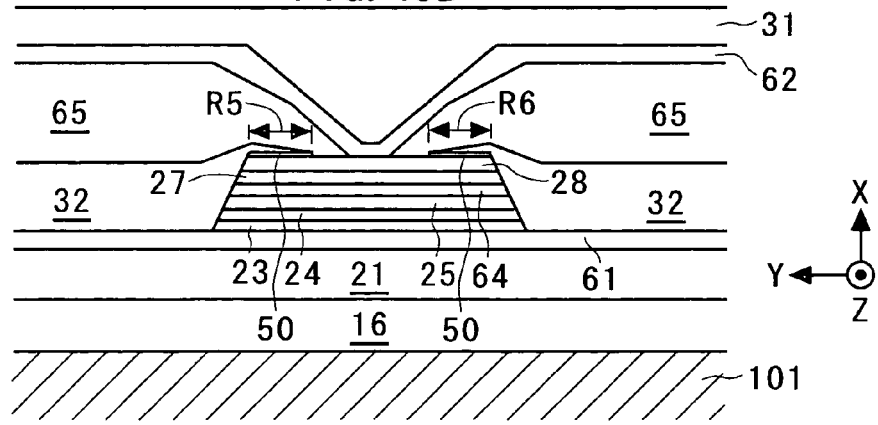
Figure 50:
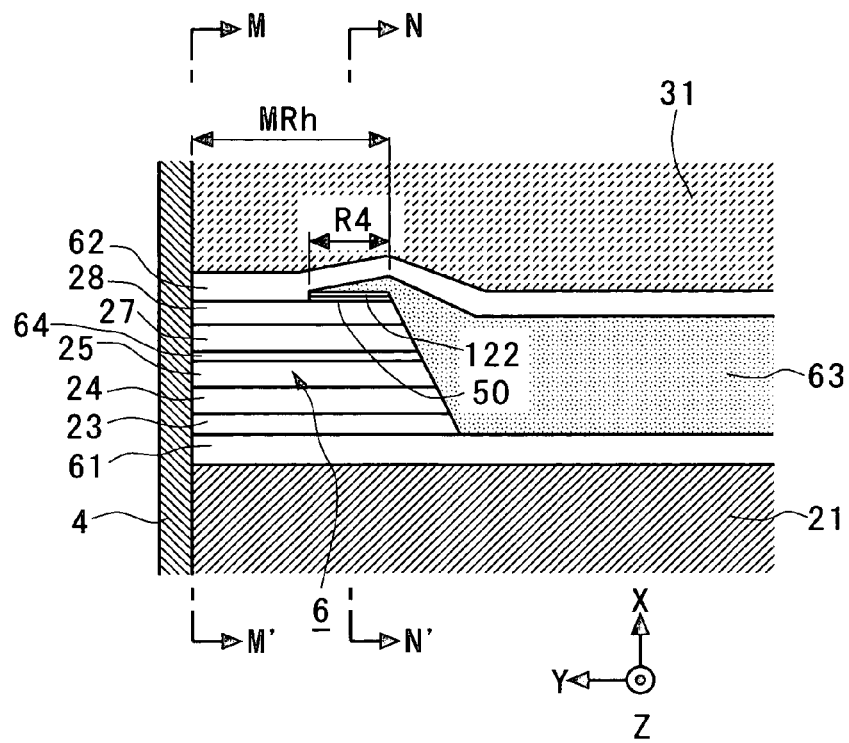
FIG. 50 is an enlarged cross-sectional view schematically illustrating a portion of a GMR device in a magnetic head manufactured by the magnetic head manufacturing method according to the second comparative example.
Figure 51:
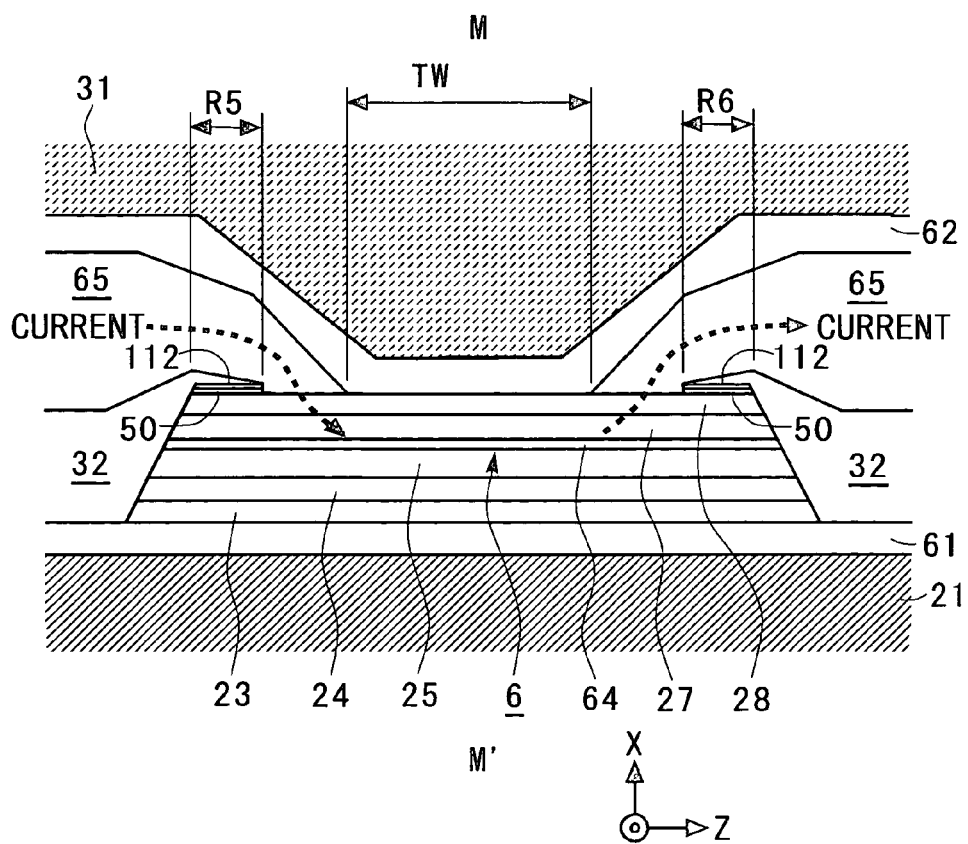
FIG. 51 is a general sectional view taken along a line M–M' indicated by arrows in FIG. 50.
Figure 52:
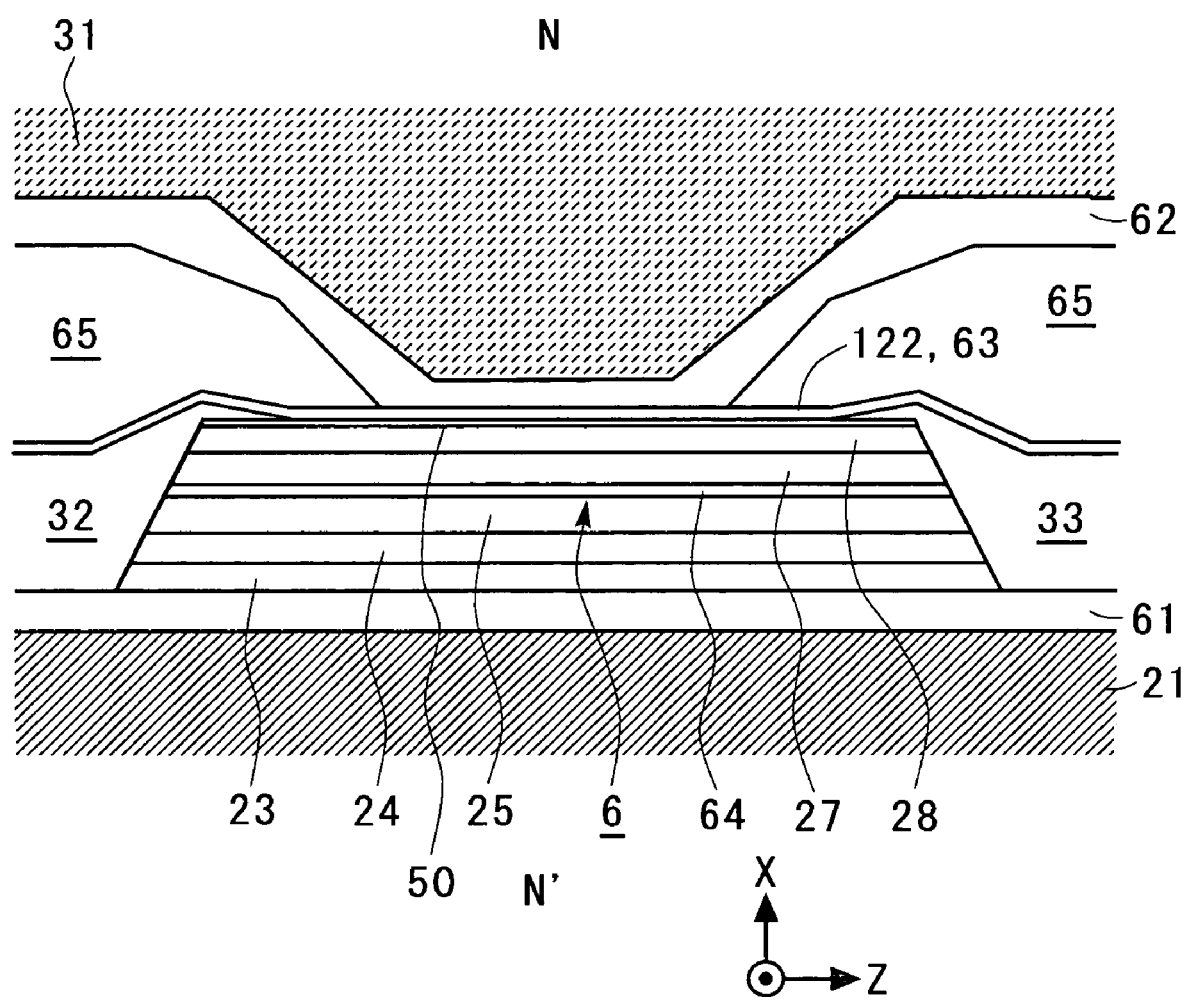
FIG. 52 is a general sectional view taken along a line N–N' indicated by arrows in FIG. 50.

Now, a second comparative example will be described with reference to FIGS. 46 to 52 for comparison with the manufacturing method according to the third embodiment. FIGS. 46 to 49 are diagrams schematically illustrating respective steps which make up a manufacturing method according to the second comparative example. FIGS. 46 and 47 are general enlarged cross-sectional views corresponding to FIGS. 42 and 43, respectively. FIGS. 48A and 49A are general plan views, FIG. 48B is a general cross-sectional view taken along a line H–J in FIG. 48A, and FIG. 49B is a general cross-sectional view taken along a line H–J in FIG. 49A. FIGS. 48A, 48B and 49A, 49B correspond to FIGS. 44A, 44B and 45A, 45B, respectively. FIGS. 50 to 52 are enlarged cross-sectional views schematically illustrating a portion of a GMR device 6 in a magnetic head manufactured by the manufacturing method according to the second comparative example. FIG. 50 corresponds to FIG. 29. FIG. 51 is a general cross-sectional view taken along a line M–M' in FIG. 50 and corresponds to FIG. 30. FIG. 52 is a general cross-sectional view taken along a line N–N' in FIG. 50. In FIGS. 46 to 52, elements identical or corresponding to those in FIGS. 29 to 45 are designated by the same reference numerals, and repeated description thereon is omitted.

The manufacturing method according to the second comparative example modifies the manufacturing method according to the third embodiment described above in the following manner in accordance with the prior art. Specifically, the manufacturing method according to the second comparative example differs from the manufacturing method according to the third embodiment of the present invention only in that normal ion beam etching with the incident angle $\theta$ set at 0° as illustrated in FIG. 46 is substituted for the normal ion beam etching with the incident angle $\theta$ set in a range of 60° to 90° as illustrated in FIG. 42 in the aforementioned etching process.

When the ion beam etching is performed with the incident angle $\theta$ set at 0° to the extent that the surface oxide film 50 is exactly remove in a region which is not formed with the aforementioned products (the redeposits 112, 122, piled portion of magnetic domain control layer 32, and piled portion of shield gap layer 63), the ion beam etching does remove some of the products, but fails to remove the rest of the products and the surface oxide film 50 below the products, as illustrated in FIG. 47. Presumably, this is because the selectivity for the removal or reduction is low since the etching particles hit the products from above. It is also thought that the incident angle $\theta$ of an ion beam set at approximately 0° causes a lower etching rate for insulating films made of $Al_2O_3$, $SiO_2$ or the like than for metal, resulting in a lower selectivity for the removal or reduction of the products as well.

Therefore, when the lead layer 65 is formed on the substrate 101 as illustrated in FIG. 47, the resulting device is as illustrated in FIGS. 48A and 48B. Further, when the upper shield gap layer 62 and upper magnetic shield layer 31 are formed, the resulting device is as illustrated in FIGS. 49A and 49B. Consequently, in a magnetic head manufactured by the manufacturing method according to the second comparative example, the surface oxide film 50, redeposits 112, 122, shield gap layer (insulating layer) 63, and the like remain in the aforementioned regions R4–R6 to limit a path for a current which flows into the magneto-resistive layer, thereby reducing an area which makes a good electrical contact. This results in a problem of the inability to provide an essential output from the GMR device 6. The widths of the regions R4–R6 are determined by the dimensions of the undercuts 111a, 121a of the resist patterns 111, 121 for lift-off. It is therefore difficult to reduce the widths of the regions R4–R6 to predetermined dimensions (for example, several tens of nanometers) or less in order to avoid producing burrs during the lift-off. Thus, when the GMR device 6 is reduced in size (for example, the MR height MRh is reduced to 100 nm or less) for increasing a recording density, the resulting GMR device 6 has a significantly reduced area which makes an electrically good contact, thereby notably presenting the problem of the inability to provide an essential output from the GMR device 6.

Also, as illustrated in FIG. 51, a portion of the magnetic domain control layers 32 is piled in the regions R5, R6 in the magnetic head manufactured by the manufacturing method according to the second comparative example. Therefore, part of a biasing magnetic field from the magnetic domain control layers 32 passes through the piled portions of the magnetic control layers 32 on both sides to bypass the free layer 27 without entering the free layer 27, as is the case in the aforementioned first comparative example. This results in a lower vertical biasing effect to the free layer 27 by the magnetic domain control layers 32, thereby failing to sufficiently control the magnetic domains of the free layer 27. Since it is difficult to reduce the widths of the regions R5, R6 to predetermined dimensions or less as mentioned above, a reduction in the dimensions of the GMR device 6 for a higher recording density would significantly narrow down the distance between the piled portions of the magnetic domain control layers 32 on both sides, thereby notably affecting the control for the magnetic domains of the free layer 27.

In contrast, the manufacturing method according to the third embodiment involves the ion beam etching with the incident angle $\theta$ set in a range of 60° to 90° as illustrated in FIG. 42 in the aforementioned etching process. This ion beam etching removes the products (the redeposits 112, 122, piled portion of magnetic domain control layer 32, and piled portion of shield gap layer 63) as well as the surface oxide film 50 present below the products and in other regions, as illustrated in FIG. 43. Therefore, the magnetic head illustrated in FIGS. 28 to 30, manufactured by the manufacturing method according to the third embodiment, is free from the limitation to a path for a current which flows into the magneto-resistive layer, and a reduction of the area which makes a good electrical connection. Thus, even with a reduction in the dimensions of the GMR device 6 for a higher recording density, it is possible to prevent the degradation of the output and the like. Also, since the piled portion of the magnetic domain control layers 32 are removed, a more biasing magnetic field enters from the magnetic domain control layers 32 into the free layer 27. Thus, even if the GMR device 6 is reduced in dimensions for a higher recording density, the vertical bias can be effectively applied to the free layer 27 to improve the vertical biasing effect to the free layer 27 by the magnetic domain control layer 32.

In the second comparative example, even the ion beam etching with the incident angle $\theta$ set at 0° as illustrated in FIG. 46 can remove the products as well as the surface oxide film 50 present below the products if it is performed for a sufficiently long duration. In this event, however, the low selectivity for the removal or reduction of the products, and the absence of the flattening effect cause a largely increased amount of etched upper metal layer 28. This would cause a problematic etching distribution, and an increased damage to the magneto-resistive layer by the ion beam to reduce the MR ratio (i.e., inhibiting the essential function of the magneto-resistive layer). In contrast, since the manufacturing method according to the third embodiment increases the selectivity for the removal or reduction of the products, the resulting device is free from the problems as mentioned above.

Of course, the modification similar to that of the first embodiment can be applied to the third embodiment.

Now, a magnetic disk apparatus according to a fourth embodiment of the present invention will be described with reference to FIG. 53.

Figure 53:
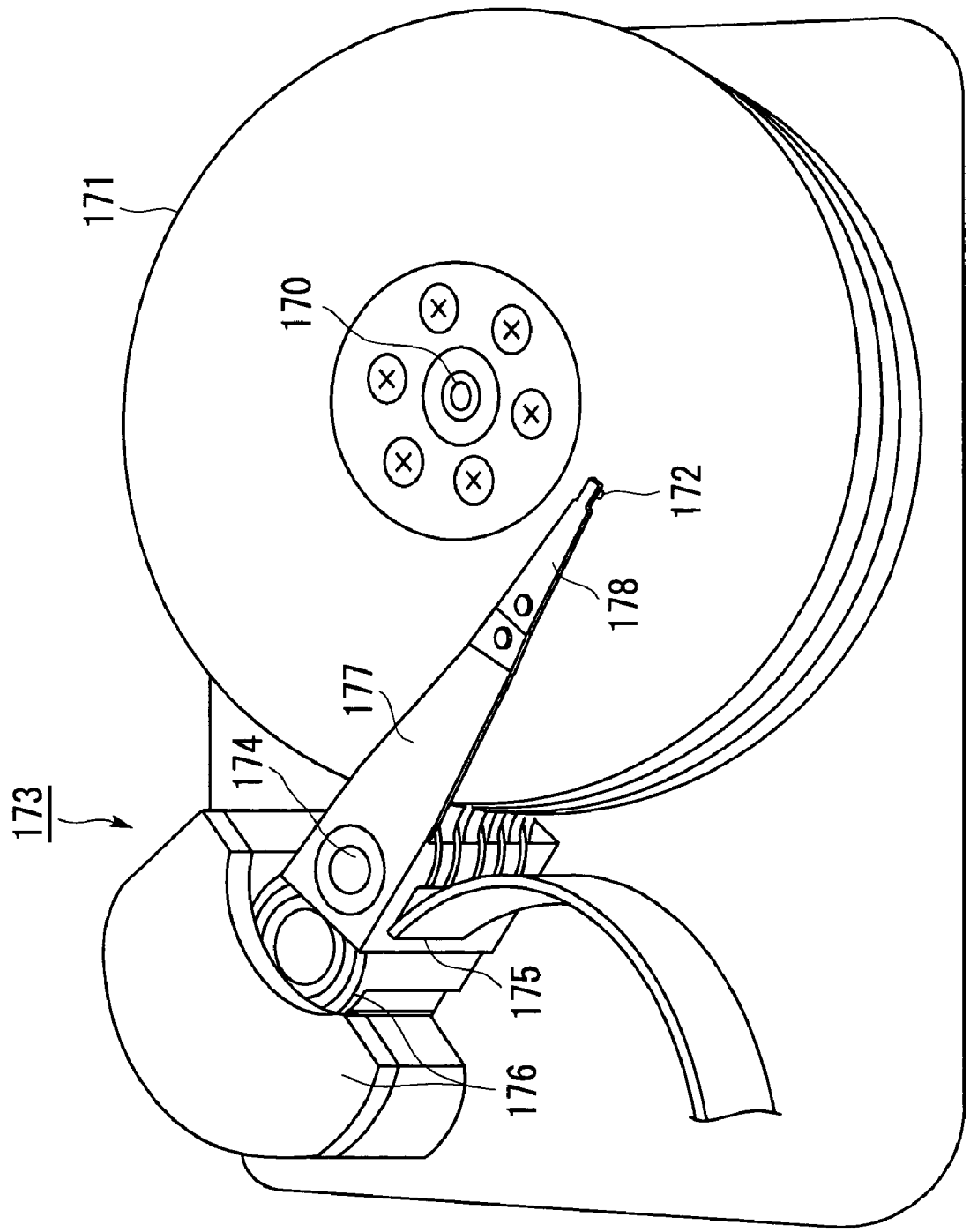
FIG. 53 is a perspective view schematically illustrating the configuration of a main portion of a magnetic disk apparatus according to a fourth embodiment of the present invention.

FIG. 53 is a perspective view schematically illustrating the configuration of a main portion of a magnetic disk apparatus according to the fourth embodiment of the present invention.

The magnetic disk apparatus according to the fourth embodiment comprises magnetic disks 171 rotatably mounted about a shaft 170; magnetic heads 172 each for recording and reproducing information to or from associated one of the magnetic disks 171; and an assembly carriage device 173 for positioning the magnetic head 172 on a track of the magnetic disk 171.

The assembly carriage device 173 mainly comprises a carriage 175 mounted for pivotal movements about a shaft 174; and an actuator 176 comprised, for example, of a voice coil motor (VCM) for rotating the carriage 175.

The carriage 175 is mounted with bases of a plurality of driving arms 177 which are stacked in the direction of the shaft 174. A head suspension assembly 178 is secured at the leading end of each driving arm 177. Each head suspension assembly 178 has the magnetic head 172 mounted on the leading end thereof. Each head suspension assembly 178 is attached to the leading end of the driving arm 177 such that the associated magnetic head 172 opposes the surface of the associated magnetic disk 171.

In the fourth embodiment, magnetic heads manufactured by one of the magnetic head manufacturing methods according to the first to third embodiments are mounted as the magnetic heads 172. Therefore, the magnetic disk apparatus according to the fourth embodiment can advantageously increase the recording density.

A magnetic head similar to the magnetic head shown in FIGS. 1 to 5 was manufactured as a sample of Example 1 by the magnetic head manufacturing method according to the first embodiment. Further, a magnetic head similar to the magnetic head shown in FIGS. 23 and 24 was manufactured as a sample of Comparative Example 1 by the magnetic head manufacturing method according to the first comparative example explained in relation to the first embodiment.

The composition of the respective layers of the sample of Example 1 was the same as that of the sample of Comparative Example 1. The composition of main layers of these samples is shown in Table 1 below. These samples were fabricated under the same method and condition except for the condition of the ion beam etching corresponding to the ion beam etching illustrated in FIGS. 17 and 20.

TABLE 1

| Name of Layer and Reference Numeral in Drawings | Composition and Thickness of Layer (When composed of two layers or more, a layer more to the left is positioned lower (near the substrate) |
|---|---|
| Upper Electrode 31 (serving also as Upper Magnetic Shield) | NiFe(2 μm) |
| Upper Metal Layer 29 | Ta(5 nm) |
| Insulating layer 30 | $Al_2O_3$(60 nm) |
| Magnetic Domain Control Layer 32 | TiW(10 nm)/CoPt(30 nm)/Ta(20 nm) |
| Insulating layer 34 | $Al_2O_3$(5 nm) |
| Upper Metal Layer 28 (Cap Layer) | Ta(25 nm) |
| Free Layer 27 | CoFe (1 nm)/NiFe(3 nm) |
| Tunnel Barrier Layer 26 | $Al_2O_3$ (0.6 nm) |
| Pinned Layer 25 | CoFe (2 nm)/Ru (0.8 nm)/CoFe(3 nm) |
| Pin layer 24 | PtMn(15 nm) |
| Lower Metal Layer 23 | NiFe(2 nm) |
| Lower Metal Layer 22 | Ta(5 nm) |
| Lower Electrode 21 (serving also as Lower Magnetic Shield) | NiFe(2 μm) |

In the sample of Example 1, the ion beam etching was performed under the condition that Ar gas was used, an acceleration voltage was set to 250 V, a beam current to 0.1 mA/cm$^2$, Ar gas pressure to $2\times10^{-4}$ Torr, a substrate temperature to 50° C., an etching time to 20 minutes, and an incident angle θ of an ion beam (an angle relative to the direction of the normal line on the surface of the substrate) to 80°. It was confirmed by the experiment that the etching rate of Ta constituting the upper metal layer 28 was 0.35 nm/min under this etching condition.

On the other hand, in the sample of Comparative Example 1, the ion beam etching was performed under the condition that Ar gas was used, an acceleration voltage was set to 250 V, a beam current to 0.1 mA/cm$^2$, Ar gas pressure to $2\times10^{-4}$ Torr, a substrate temperature to 50° C., an etching time to 5.4 minutes, and an incident angle θ of an ion beam (an angle relative to the direction of the normal line on the surface of the substrate) to 0°. It was confirmed by the experiment that the etching rate of Ta constituting the upper metal layer 28 was 1.3 nm/min under this etching condition.

In this manner, between the sample of Example 1 and the sample of Comparative Example 1, the condition of the ion beam etching was made differ only as to the incident angle θ of an ion beam and the etching time but the other condition were made same. The etching times for the sample of Example 1 and the sample of Comparative Example 1 were set so that an etching amount (a calculation value based on an etching rate) of Ta is 7 nm.

Each of the sample of Example 1 and the sample of Comparative Example 1 was formed as a floating type magnetic head in which the track width TW of the TMR device 2 was set to 0.13 μm, the MR height MRh of the TMR device 2 was set to 0.1 μm, and the protection film 4 was set as a DLC film with a thickness of 3 nm.

The reproduction output of each of these samples was measured under the condition that a flying height is set to 10 nm, a medium protection film to 3 nm and a bias voltage to a constant value of 150 mV.

According to the measurement result of the sample of Example 1, a resistance value was 250 Ω and the output was 5.25 mV. According to the measurement result of the sample of Comparative Example 1, a resistance value was 700 Ω and the output was 1.90 mV. In this manner, measurement result of the sample of Example 1 was more preferable than that of the sample of Comparative Example 1.

The reason of such results is considered that in the sample of Comparative Example 1, the aforementioned products (the redeposits 72, 82, piled portion of insulating layer 34 and magnetic domain control layer 32, and piled portion of insulating layer 30) as well as the surface oxide film 50 present in the regions R1–R3 as shown in FIGS. 23 and 24, so that the contact resistance value was increased, causing the reduction of the output due to the increase of the resistance value and the degradation of the MR ratio. In contrast, in the sample of Example 1, none of the aforementioned products and the surface oxide film 50 present in the regions R1 to R3 as shown in FIGS. 4 and 5, so that the contact resistance value was decreased, causing the increase of the output due to the improvement of the MR ratio.

Wafers were fabricated as samples 1 to 5, each of which had the same composition of respective layers (the composition of main respective layers are same as Table 1) as the aforementioned samples of Example 1 and Comparative Example 1. The samples 1 to 5 were fabricated in a manner that the processes up to the ion beam etching were performed in the same method and conditions as the aforementioned samples of Example 1 and Comparative Example 1 except for the condition of the ion beam etching corresponding to the ion beam etching shown in FIGS. 17 and 20.

As for the conditions of the ion beam etching in the samples 1 to 5, only the incident angle θ of ion beam and the etching time were changed as shown in Table 2 but the remaining condition was made same as those of the aforementioned samples of Example 1 and Comparative Example 1. Table 2 further shows etching rates (experimental values) of Ta (the material of the upper metal layer 28) and etching rates (experimental values) of Al$_2$O$_3$ at respective incident angles θ of ion beam. As clear from Table 2, the etching times for the samples 1 to 5 were set so that an etching amount (a calculation value based on an etching rate) of Ta is 5 nm.

TABLE 2

|  | incident angles θ [deg] | etching rate of Ta [nm/min] | etching rate of Al$_2$O$_3$ [nm/min] | etching time [m:s] | Etching amount (calculation value) of Ta [nm] |
|---|---|---|---|---|---|
| sample 1 | 0 | 1.20 | 0.56 | 4:10 | 5.0 |
| sample 2 | 45 | 1.32 | 1.33 | 3:48 | 5.0 |
| sample 3 | 60 | 1.01 | 1.38 | 4:56 | 5.0 |
| sample 4 | 75 | 0.39 | 0.84 | 12:52 | 5.0 |
| sample 5 | 85 | 0.16 | 0.37 | 32:15 | 5.0 |

Figure 54:
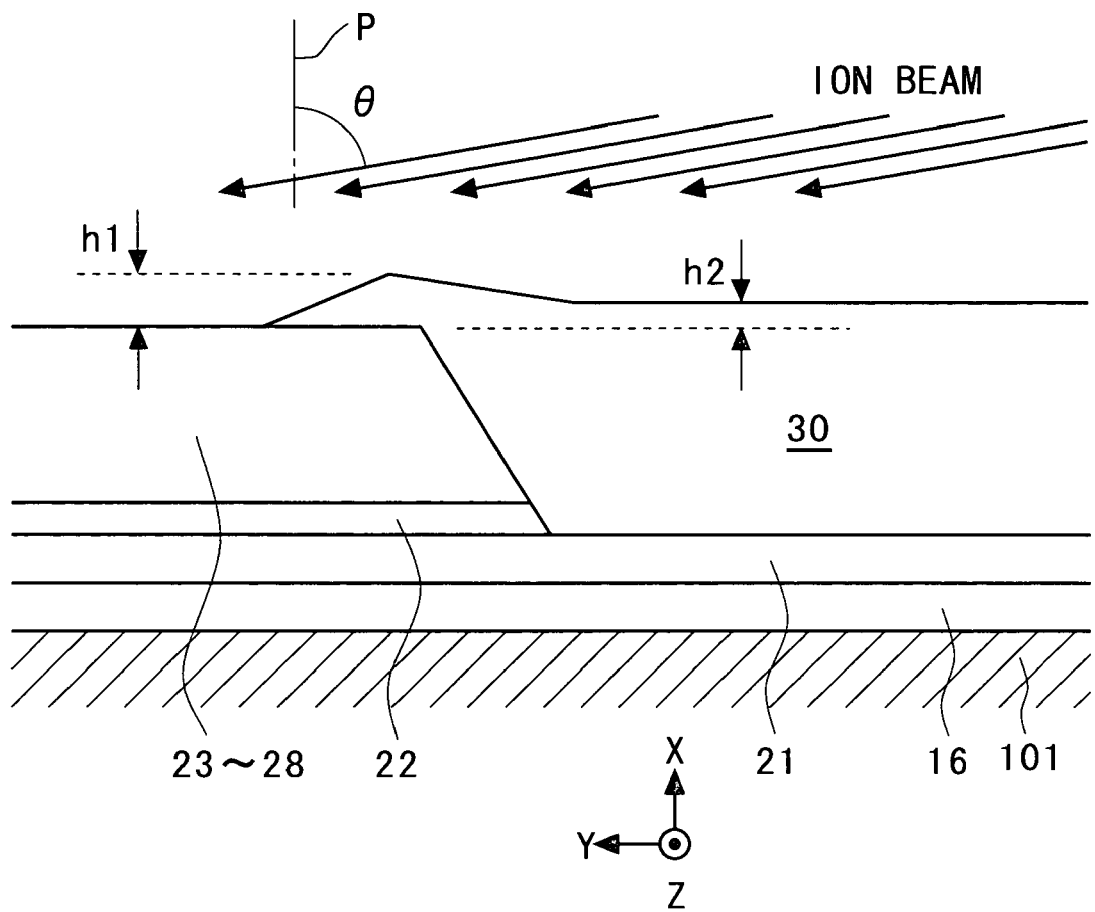
FIG. 54 is a diagram schematically illustrating a surface height before and after ion beam etching.

As for each of the samples 1 to 5, a profile was obtained by using an atomic force microscope (AFM) before and after the ion beam etching to measure a height h1 of the piled portion and a step difference h2 shown in FIG. 54. FIG. 54 is a sectional diagram schematically illustrating measuring portions of the samples 1 to 5, and corresponds to FIGS. 17, 18 and FIGS. 20, 21. FIG. 54 schematically shows a state of a surface height before and after the ion beam etching, but does not show the surface oxide film 50 nor the redeposits 82 or the like. The height h1 is a height of the piled portion (height of the highest portion around the −Y-side end surface of the layers 23 to 28) with reference to a surface height (of course, this height changes before and after the ion beam etching) at the position sufficiently away from the piled portion in the +Y direction. The step difference h2 is a surface height at the position sufficiently away from the piled portion in the −Y direction with reference to a surface height at the position sufficiently away from the piled portion in the +Y direction.

Figure 55:
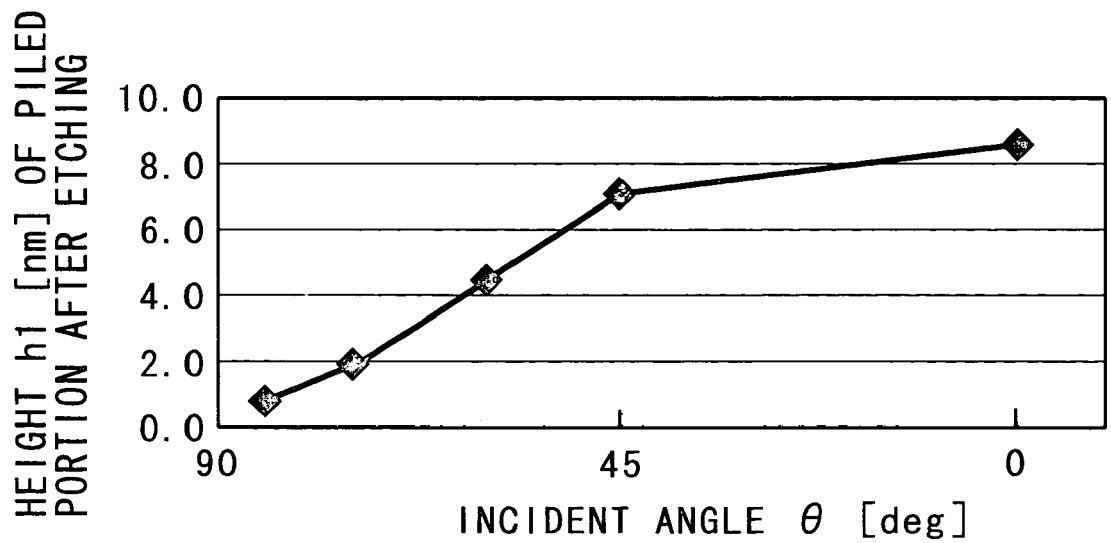
FIG. 55 is a diagram illustrating a relation between incident angles θ of an ion beam and heights of a piled portion after an ion beam etching.

Table 3 shows the measured results of the height is h1 of the piled portion and the step difference h2 of the samples 1 to 5 before and after the ion beam etching. FIG. 55 is a diagram illustrating a relation between the incident angles θ of an ion beam and the heights h1 of the piled portion after the ion beam etching, as a part of the measured results.

TABLE 3

|  | height h1 [nm] of piled portion (before etching) | height h1 [nm] of piled portion (after etching) | step difference h2 [nm] (before etching) | step difference h2 [nm] (after etching) |
|---|---|---|---|---|
| sample 1 | 8.4 | 8.6 | 9.8 | 13.1 |
| sample 2 | 8.2 | 7.1 | 10.1 | 10.4 |
| sample 3 | 7.8 | 4.5 | 10.7 | 8.6 |
| sample 4 | 8.1 | 1.9 | 10.3 | 4.6 |
| sample 5 | 8.2 | 0.8 | 9.9 | 3.5 |

As to each of the samples 1 to 5, as described above, the upper metal layer 28 made of Ta is etched by 5 nm according to the calculation by the ion beam etching. As clear from Tables 2, 3 and FIG. 55, the height h1 of the piled portion is 5 nm or less when the incident angle θ of the ion beam is set in a range of 60° to 90°. Thus, when the incident angle θ of the ion beam is set in a range of 60° to 90°, it is considered that the Ta surface is exposed entirely at the piled portion according to the calculation and so the piled portion of the insulating layer, the piled portion of the redeposits during milling and the surface oxide film 50 are completely removed.

Further, as clear from Tables 2 and 3, when the incident angle θ of the ion beam is set in a range of 60° to 90°, the height h1 of the piled portion after the ion beam etching is 60% or less of the height h1 of the piled portion before the ion beam etching. When the incident angle θ of the ion beam is set in a range of 75° to 90°, the height h1 of the piled portion after the ion beam etching is 30% or less of that before the ion beam etching, while when the incident angle θ of the ion beam is set in a range of 85° to 90°, the height h1 of the piled portion after the-ion beam etching is 10% or less of that before the ion beam etching. Thus, the larger the incident angle θ is with respect to the same etching amount of the upper metal layer 28 made of Ta, the degree of flatness of the piled portion is considered to be made larger and so the piled portion of the insulating layer, the redeposits during milling and the surface oxide film 50 can be further removed.

According to the aforementioned reasons, the ion beam incident angle θ is preferably set to be in a range of 60° to 90°, more preferably in a range of 75° to 90° further preferably in a range of 80° to 90°, and more further preferably in a range of 85° to 90°.

As described above, Table 2 further shows etching rates (experimental values) of Ta and etching rates (experimental values) of $Al_2O_3$ at respective incident angles θ of ion beam. The inventors of the present invention experimentally obtained etching rates at respective incident angles θ of ion beam as to representative metal materials (concretely, Ru, Rh, Au) capable of being used as the upper metal layer 28 other than Ta and as to representative insulating materials (concretely, $SiO_2$) capable of being used as the insulating layer other than $Al_2O_3$. The results of the experiment are shown in Table 4. The condition of the ion beam etching at the time of obtaining these etching rates was set to be same as that at the time of obtaining the etching rates of Ta and $Al_2O_3$.

TABLE 4

| incident angles θ [deg] | etching rate of Ru [nm/min] | etching rate of Rh [nm/min] | etching rate of Au [nm/min] | etching rate of $SiO_2$ [nm/min] |
|---|---|---|---|---|
| 0 | 1.53 | 2.17 | 5.11 | 1.77 |
| 45 | 1.63 | 2.10 | 3.70 | 2.59 |
| 60 | 1.13 | 1.49 | 2.09 | 2.76 |
| 75 | 0.61 | 0.72 | 0.93 | 1.99 |
| 85 | 0.28 | 0.26 | 0.21 | 0.97 |

Ratios of the etching rates of Ta, Ru, Rh and Au with respect to the etching rate of $Al_2O_3$ were calculated from the etching rates of the respective materials shown in Tables 2 and 4. The calculation result is shown in Table 5 and FIG. 56.

TABLE 5

| | ratio of etching rate with respect to $Al_2O_3$ | | | |
|---|---|---|---|---|
| incident angles θ [deg] | ratio of etching rate of Ta | ratio of etching rate of Ru | ratio of etching rate of Rh | ratio of etching rate of Au |
| 0 | 2.13 | 2.72 | 3.85 | 9.07 |
| 45 | 0.99 | 1.23 | 1.58 | 2.79 |
| 60 | 0.74 | 0.82 | 1.08 | 1.52 |
| 75 | 0.46 | 0.73 | 0.86 | 1.11 |
| 85 | 0.42 | 0.75 | 0.69 | 0.57 |

Ratios of the etching rates of Ta, Ru, Rh and Au with respect to the etching rate of $SiO_2$ were calculated from the etching rates of the respective materials shown in Tables 2 and 4. The calculation result is shown in Table 6 and FIG. 57.

TABLE 6

| | ratio of etching rate with respect to $SiO_2$ | | | |
|---|---|---|---|---|
| incident angles θ [deg] | ratio of etching rate of Ta | ratio of etching rate of Ru | ratio of etching rate of Rh | ratio of etching rate of Au |
| 0 | 0.68 | 0.87 | 1.23 | 2.89 |
| 45 | 0.51 | 0.63 | 0.81 | 1.43 |
| 60 | 0.37 | 0.41 | 0.54 | 0.76 |
| 75 | 0.20 | 0.31 | 0.36 | 0.47 |
| 85 | 0.16 | 0.28 | 0.26 | 0.22 |

Figure 56:
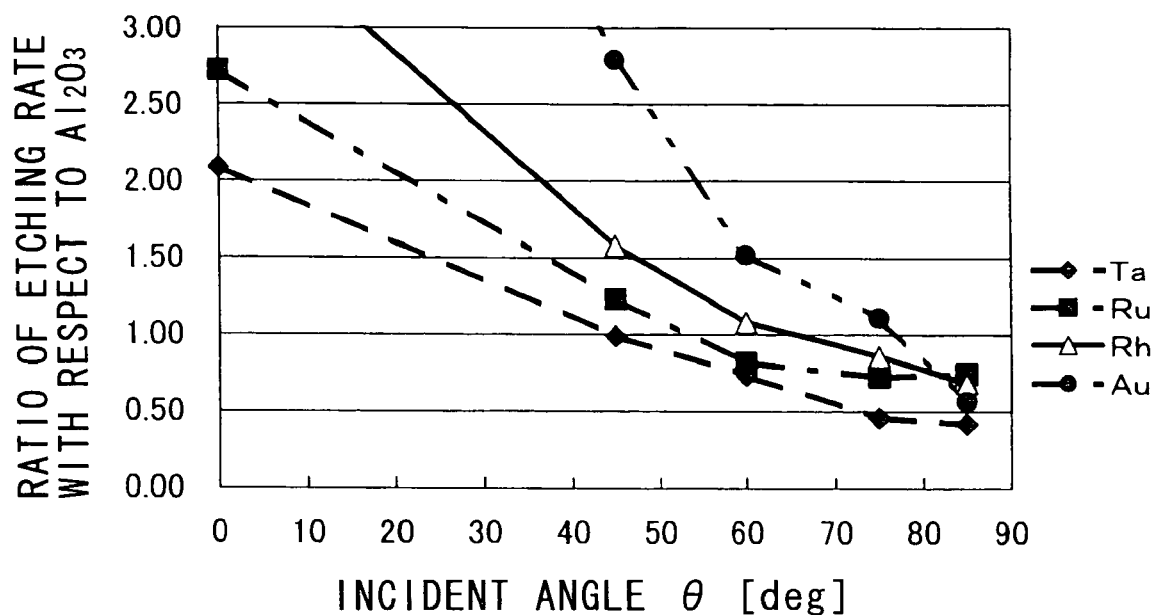
FIG. 56 is a diagram illustrating a relation between incident angles θ of an ion beam and ratios of etching rates of respective metals with respect to $Al_2O_3$.
Figure 57:
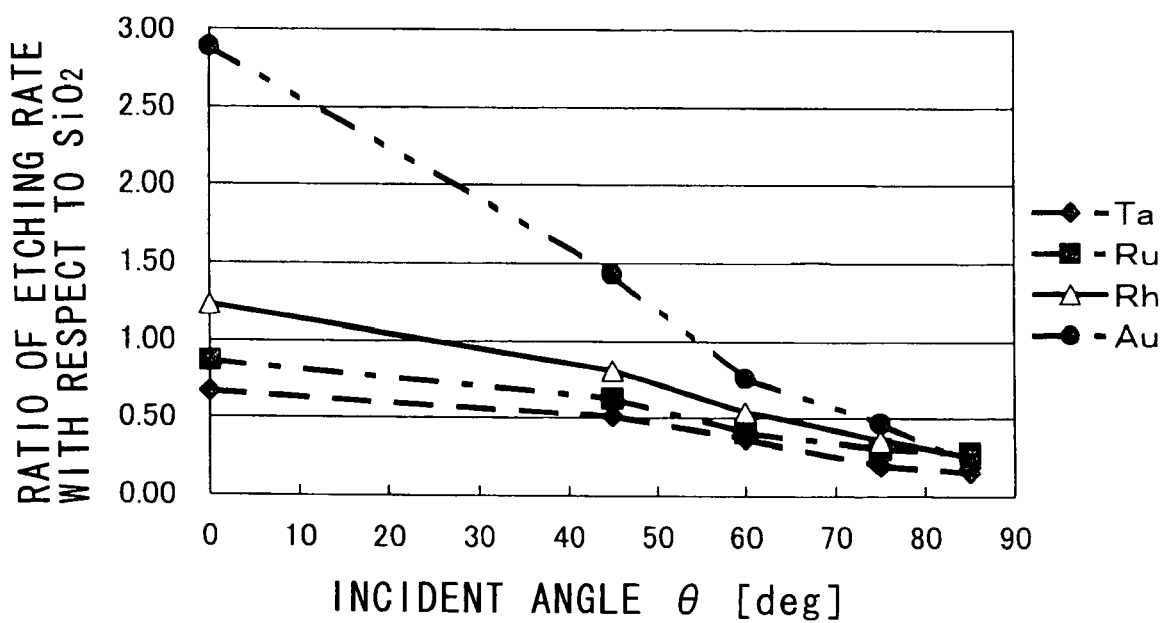
FIG. 57 is a diagram illustrating a relation between incident angles θ of an ion beam and ratios of etching rates of respective metals with respect to $SiO_2$.

The metal materials raised in Tables 5, 6 and FIGS. 56, 57 are representative ones as the upper metal layer (cap layer) 28. As understood from Table 5 and FIG. 56, the ratios of etching rate with respect to $Al_2O_3$ were smaller than 1 as to almost all the metal materials in the ion beam incident angle θ of 60° or more. Further, as understood from Table 6 and FIG. 57, the ratios of etching rate with respect to $SiO_2$ were smaller than 1 as to all the metal materials in the ion beam incident angle θ of 60° or more. The ratios of etching rate less than 1 means that $Al_2O_3$ or $SiO_2$ is likely etched as compared with the metal materials formed as the upper metal layer (cap layer) 28 and so the aforementioned products at the periphery of the magneto-resistive layer is apt to be selectively removed.

Thus, also as clear from the results shown in Tables 5, 6 and FIGS. 56, 57, it would be understood that the incident angle θ of ion beam is preferably set in a range of 60° to 90°. Further, the ratio of the etching rate with respect to $Al_2O_3$ or $SiO_2$ is preferably as small as possible. Thus, also as clear from the results shown in Tables 5, 6 and FIGS. 56, 57, the ion beam incident angle θ is preferably set to be in a range of 75° to 90°, more preferably in a range of 80° to 90°, and more further preferably in a range of 85° to 90°.

The inventors of the present invention confirmed the flattening effect of a protrusion by the following experimenst as to the normal ion beam etching with the ion beam incident angle θ made close to 90° and the etching using the gas cluster ion beam etching.

Figure 58:
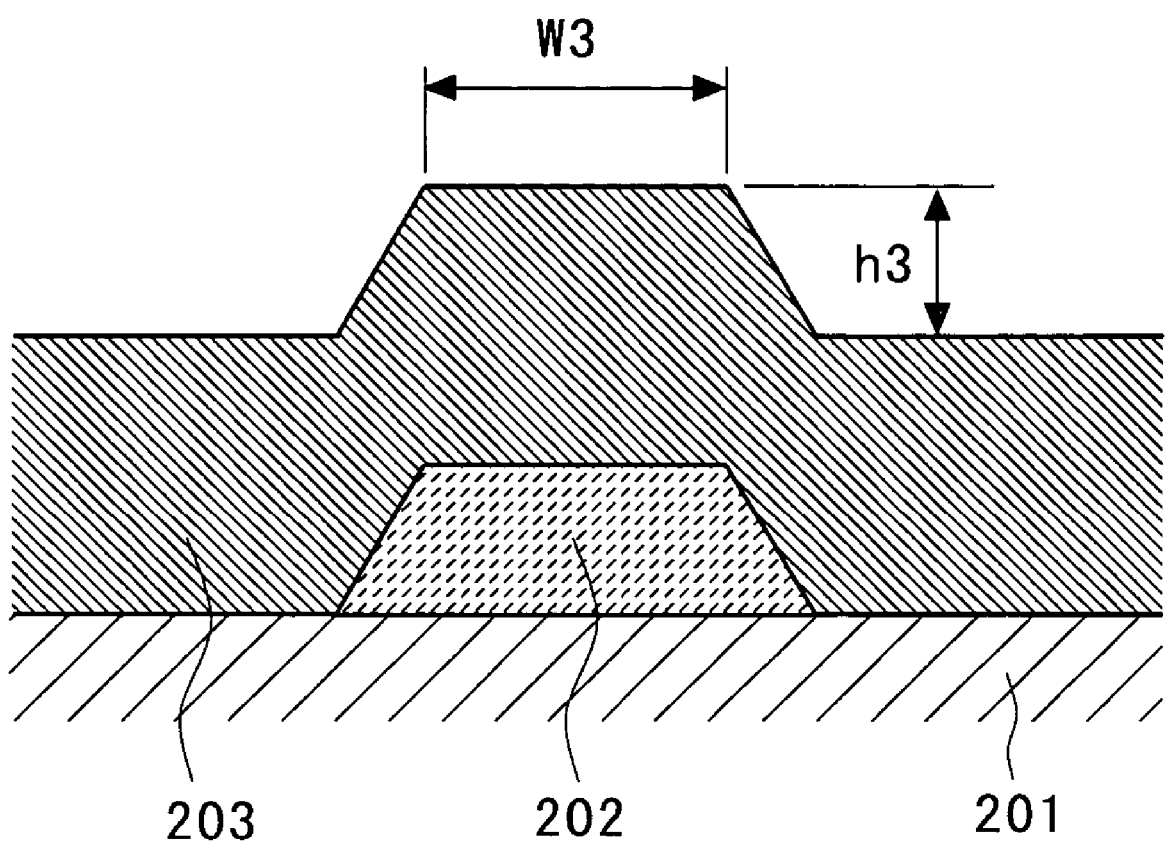
FIG. 58 is a cross-sectional view schematically illustrating the structure of a predetermined sample.

Samples 6 to 17 with the structure as shown in FIG. 58 were fabricated in the following processes. First, a Ta layer 202 with a thickness of 50 nm was formed on a silicon substrate 201 by spattering. Next, a resist pattern (not shown) with a predetermined width W3 was formed by electron beam lithography (EB lithography), and then the Ta layer 202 was patterned by an ion milling using the resist pattern as a mask. Then, the resist was removed and an SiO$_2$ layer 202 with a thickness of 100 nm was formed on the silicon substrate 201 and the Ta layer to obtain the samples 6 to 17.

The width W3 was set to 80 nm for the samples 6, 10 and 14, to 120 nm for the samples 7, 11 and 15, to 160 nm for the samples 8, 12 and 16, and to 200 nm for the samples 9, 13, and 17. The structure of the samples 6 to 17 was set to be same expect for the width W3.

Each of the samples 6 to 13 was etched by the normal ion beam etching corresponding to the ion beam etching shown in FIGS. 17 and 20.

In the samples 6 to 9, the ion beam etching was performed under the condition that Ar gas was used, an acceleration voltage was set to 500 V, a beam current to 0.32 mA/cm$^2$, Ar gas pressure to $4.1 \times 10^{-4}$ Torr, a substrate temperature to 50° C., an etching time to 18.2 minutes, and an incident angle $\theta$ of an ion beam (an angle relative to the direction of the normal line on the surface of the substrate) to 80°. It was confirmed by the experiment that the etching rate of SiO$_2$ was 1.1 nm/min under this etching condition.

In the samples 10 to 13, the ion beam etching was performed under the condition that an etching time was set to 23.5 minutes, and an incident angle $\theta$ of an ion beam (an angle relative to the direction of the normal line on the surface of the substrate) to 85° and the remaining conditions were set to be same as the samples 6 to 9. It was confirmed by the experiment that the etching rate of SiO$_2$ was 0.85 nm/min under this etching condition.

Each of the etching time of the samples 6 to 9 and that of the samples 10 to 13 was set so that an etching amount (a calculation value based on an etching rate) of SiO$_2$ is 20 nm.

Each of the samples 14 to 17 was etched by using a gas cluster ion beam. The etching condition was same as that of the samples 14 to 17 and the gas cluster ion beam etching was performed under the condition that Ar gas was used, an acceleration voltage was set to 20 kV, a total dose amount to $5 \times 10^{15}$ ions/cm$^2$, and an incident angle $\theta$ of a gas cluster ion beam (an angle relative to the direction of the normal line on the surface of the substrate) to 0°.

As for each of the samples 6 to 17, a profile was obtained by using an AFM before and after the etching to measure a step difference h3 shown in FIG. 58. The measurement results are shown in the following Tables 7 to 9.

TABLE 7

Normal ion beam etching
(incident angle $\theta$ = 80 degrees, etching time = 18.2 min)

| | width W3 [nm] (before etching) | step difference h3 [nm] (before etching) | step difference h3 [nm] (after etching) |
|---|---|---|---|
| sample 6 | 80 | 34.6 | 5.3 |
| sample 7 | 120 | 44.3 | 9.7 |
| sample 8 | 160 | 46.9 | 21.2 |
| sample 9 | 200 | 46.5 | 32.6 |

TABLE 8

Normal ion beam etching
(incident angle $\theta$ = 85 degrees, etching time = 23.5 min)

| | width W3 [nm] (before etching) | step difference h3 [nm] (before etching) | step difference h3 [nm] (after etching) |
|---|---|---|---|
| sample 10 | 80 | 34.6 | 4.6 |
| sample 11 | 120 | 44.3 | 7.0 |
| sample 12 | 160 | 46.9 | 7.9 |
| sample 13 | 200 | 46.5 | 10.2 |

TABLE 9 gas cluster ion beam etching

| | width W3 [nm] (before etching) | step difference h3 [nm] (before etching) | step difference h3 [nm] (after etching) |
|---|---|---|---|
| sample 14 | 80 | 34.6 | 1.9 |
| sample 15 | 120 | 44.3 | 9.6 |
| sample 16 | 160 | 46.9 | 18.1 |
| sample 17 | 200 | 46.5 | 25.8 |

As clear from Tables 7 to 9, the values of the step differences h3 became smaller after any of the etching and so the flattening effects obtained. This fact means that the aforementioned product (protrusion) at the periphery of the magneto-resistive layer can be removed by performing the normal ion beam etching with a larger incident angle $\theta$ or the etching using a gas cluster ion beam, like the first to third embodiments and the modifications thereof.

As understood by comparing Table 9 with Tables 7 and 8, the flattening effect like the normal ion beam etching with a larger incident angle $\theta$ can be obtained even by the etching using a gas cluster ion beam. Thus, it was proved that the etching using a gas cluster ion beam can be used effectively in place of using the normal ion beam etching with a larger incident angle $\theta$ in order to remove the aforementioned product at the periphery of the magneto-resistive layer.

As described above, although the explanation has been made as to the respective embodiments according to the present invention and the modifications thereof, the present invention is not limited thereto.

For example, in the first to third embodiments, the pattern forming method according to the present invention is applied to the magneto-resistive device manufacturing method in the magnetic head manufacturing method. However, the pattern forming method according to the present invention may be applied to the magneto-resistive device manufacturing method in a method of manufacturing a magnetic detector or a MRAM (magnetic random access memory) or the like and may be applied to other various kinds of usage.

As described above, according to the present invention, it is possible to provide a pattern forming method which is capable of removing or reducing unwanted products remaining on a peripheral region of a film which is patterned by dry etching using a resist pattern for lift-off as a mask.

Further, according to the present invention, it is possible to provide a method of manufacturing a magneto-resistive device, which is capable of reducing unwanted products remaining on a peripheral region of a film which is patterned by dry etching using a resist pattern for lift-off as a mask, to advantageously reduce a series resistance component and/or more effectively apply a vertical bias to a free layer.

Furthermore, according to the present invention, it is possible to provide a magnetic disk apparatus which is capable of increasing a recording density, and a head suspension assembly which can use in the magnetic disk apparatus.

What is claimed is:

1. A pattern forming method comprising the steps of:
    forming a resist pattern for lift-off on a first film composed of one or more layers deposited on one surface side of a base;
    patterning said first film by dry etching said first film using said resist pattern for lift-off as a mask;
    depositing a second film composed of one or more layers on the one surface side of said base after said step of patterning with presence of said resist pattern for lift-off on said first film;
    removing said resist pattern for lift-off to remove a portion of said second film on said resist pattern for lift-off; and
    etching the one surface side of said base after said step of removing, said step of etching including dry-etching the one surface side of said base using etching particles which do not substantially form clusters, with a main incident angle of said etching particles to the one surface side of said base being set in a range of 60° to 90° relative to a normal direction of the one surface of said base,
    wherein said dry etching in said step of etching is performed while rotating said base about an axis substantially parallel with the normal direction.

2. A pattern forming method according to claim 1, wherein said dry etching in said step of etching is ion beam etching using a simple gas or a mixed gas composed of one or more selected from a group consisting of He, Ne, Ar, Kr, and Xe.

3. A pattern forming method according to claim 1, wherein said resist pattern for lift-off has a shape at cross section including an undercut or an inverse tapered shape at cross section.

4. A pattern forming method according to claim 1, wherein said first film includes a metal layer positioned furthest away from said base.

5. A pattern forming method comprising the steps of:
    forming a resist pattern for lift-off on a first film composed of one or more layers deposited on one surface side of a base;
    patterning said first film by dry etching said first film using said resist pattern for lift-off as a mask;
    depositing a second film composed of one or more layers on the one surface side of said base after said step of patterning with presence of said resist pattern for lift-off on said first film;
    removing said resist pattern for lift-off to remove a portion of said second film on said resist pattern for lift-off; and
    etching the one surface side of said base after said step of removing, said step of etching including dry-etching the one surface side of said base using etching particles which do not substantially form clusters, with a main incident angle of said etching particles to the one surface side of said base being set in a range of 60° to 90° relative to a normal direction of the one surface of said base,
    wherein said second film includes an insulating layer.

6. A pattern forming method according to claim 5, wherein said dry etching in said step of etching is ion beam etching using a simple gas or a mixed gas composed of one or more selected from a group consisting of He, Ne, Ar, Kr, and Xe.

7. A pattern forming method according to claim 5, wherein said resist pattern for lift-off has a shape at cross section including an undercut or an inverse tapered shape at cross section.

8. A pattern forming method according to claim 5, wherein said dry etching in said step of etching is performed while rotating said base about an axis substantially parallel with the normal.

9. A pattern forming method according to claim 5, wherein said first film includes a metal layer positioned furthest away from said base.

* * * * *